(12) United States Patent
Fowler et al.

(10) Patent No.: US 7,741,808 B2
(45) Date of Patent: Jun. 22, 2010

(54) BI-DIRECTIONAL CHARGING/INTEGRATED POWER MANAGEMENT UNIT

(75) Inventors: Doug Fowler, Plano, TX (US); Dan McQuitty, Plano, TX (US); Chris Hartwell, Plano, TX (US); James E. Gibbons, Jr., Plano, TX (US)

(73) Assignee: Media Cart Holdings, Inc., Plano, TX (US)

( * ) Notice: Subject to any disclaimer, the term of this patent is extended or adjusted under 35 U.S.C. 154(b) by 587 days.

(21) Appl. No.: 11/690,839

(22) Filed: Mar. 25, 2007

(65) Prior Publication Data

US 2008/0231228 A1    Sep. 25, 2008

(51) Int. Cl.
*H02J 7/00*    (2006.01)
(52) U.S. Cl. .................................................. 320/107
(58) Field of Classification Search ................ 320/107, 320/109, 113, 115
See application file for complete search history.

(56) References Cited

U.S. PATENT DOCUMENTS

| | | |
|---|---|---|
| 3,614,133 A | 10/1971 | Ganci, et al. |
| 4,882,724 A | 11/1989 | Vela et al. |
| 4,929,819 A | 5/1990 | Collins, Jr. |
| 4,973,952 A | 11/1990 | Malec et al. |
| 4,988,025 A | 1/1991 | Lipton et al. |
| 5,055,660 A | 10/1991 | Bertagna et al. |
| 5,158,310 A | 10/1992 | Tannehill et al. |
| 5,250,789 A | 10/1993 | Johnsen |
| 5,287,266 A | 2/1994 | Malec et al. |
| 5,294,781 A | 3/1994 | Takahashi et al. |
| 5,294,782 A | 3/1994 | Kumar |
| 5,295,064 A | 3/1994 | Malec et al. |
| 5,323,098 A * | 6/1994 | Hamaguchi et al. ......... 320/109 |
| 5,334,821 A | 8/1994 | Campo et al. |

(Continued)

FOREIGN PATENT DOCUMENTS

DE    20107971 U    7/2001

(Continued)

OTHER PUBLICATIONS

Office Action (Final) dated Dec. 18, 2008 (18 pages), U.S. Appl. No. 11/291,451, filed Dec. 1, 2005.

(Continued)

*Primary Examiner*—Edward Tso
*Assistant Examiner*—M'Baye Diao
(74) *Attorney, Agent, or Firm*—Conley Rose, P.C.; Rodney B. Carroll

(57) ABSTRACT

A media enhanced shopping cart system comprises a shopping cart comprising a frame, a basket, a handle, a base tray, a plurality of wheels, a read component for performing a proximity scan of the shopping cart, a locationing component for determining a location of the shopping cart within a store based on the scan, and a display component for displaying at least one advertisement for a product based on the location of the shopping cart within the store, wherein the locationing component is further operable to determine a location of the product within the store relative to the shopping cart based on the scan, and wherein the display component is further operable to display an indication of the location of the advertised product relative to the location of the shopping cart.

18 Claims, 50 Drawing Sheets

U.S. PATENT DOCUMENTS

| | | | |
|---|---|---|---|
| 5,345,071 A | 9/1994 | Dumont | |
| 5,361,871 A | 11/1994 | Gupta et al. | |
| 5,386,106 A | 1/1995 | Kumar | |
| 5,406,271 A | 4/1995 | Sonnendorfer et al. | |
| 5,420,606 A | 5/1995 | Begum et al. | |
| 5,426,423 A | 6/1995 | Raimbault et al. | |
| 5,489,773 A | 2/1996 | Kumar | |
| 5,540,301 A | 7/1996 | Dumont | |
| 5,557,088 A | 9/1996 | Shimizu et al. | |
| 5,630,068 A | 5/1997 | Vela et al. | |
| 5,630,071 A | 5/1997 | Sakai et al. | |
| 5,637,847 A | 6/1997 | Watanabe | |
| 5,640,002 A | 6/1997 | Ruppert et al. | |
| 5,646,616 A | 7/1997 | Komatsu | |
| 5,689,101 A | 11/1997 | Kikuchi et al. | |
| 5,729,697 A | 3/1998 | Schkolnick et al. | |
| 5,734,839 A | 3/1998 | Enoki et al. | |
| 5,739,513 A | 4/1998 | Watanabe | |
| 5,773,954 A * | 6/1998 | VanHorn | 320/137 |
| 5,804,807 A | 9/1998 | Murrah et al. | |
| 5,816,725 A | 10/1998 | Sherman et al. | |
| 5,821,512 A | 10/1998 | O'Hagan et al. | |
| 5,821,513 A | 10/1998 | O'Hagan et al. | |
| 5,825,002 A | 10/1998 | Roslak | |
| 5,918,211 A | 6/1999 | Sloane | |
| 5,923,735 A | 7/1999 | Swartz et al. | |
| 6,012,244 A | 1/2000 | Begum et al. | |
| 6,032,127 A | 2/2000 | Schkolnick et al. | |
| 6,032,128 A | 2/2000 | Morrison et al. | |
| 6,101,483 A | 8/2000 | Petrovich et al. | |
| 6,119,935 A | 9/2000 | Jelen et al. | |
| 6,168,079 B1 | 1/2001 | Becker et al. | |
| 6,177,880 B1 | 1/2001 | Begum | |
| 6,189,788 B1 | 2/2001 | Sherman et al. | |
| 6,189,789 B1 | 2/2001 | Levine et al. | |
| 6,314,406 B1 | 11/2001 | O'Hagan et al. | |
| 6,323,753 B2 | 11/2001 | Begum | |
| 6,405,049 B2 | 6/2002 | Herrod et al. | |
| 6,409,086 B1 | 6/2002 | Pellaumail et al. | |
| 6,435,407 B1 | 8/2002 | Fiordelisi | |
| 6,484,939 B1 | 11/2002 | Blaeuer | |
| 6,533,173 B2 | 3/2003 | Benyak | |
| 6,659,344 B2 | 12/2003 | Otto et al. | |
| 6,659,346 B1 | 12/2003 | Williams | |
| 6,725,206 B1 | 4/2004 | Coveley | |
| 6,796,505 B2 | 9/2004 | Pellaumail et al. | |
| 6,820,062 B1 | 11/2004 | Gupta et al. | |
| 6,837,436 B2 | 1/2005 | Swartz et al. | |
| 6,910,697 B2 | 6/2005 | Varatharajah et al. | |
| 6,928,343 B2 | 8/2005 | Cato | |
| 6,959,862 B2 | 11/2005 | Neumark | |
| 7,036,725 B2 | 5/2006 | Blaeuer | |
| 7,047,502 B2 | 5/2006 | Petropoulos et al. | |
| 7,063,263 B2 | 6/2006 | Swartz et al. | |
| 7,084,765 B2 | 8/2006 | Clapper | |
| D527,604 S | 9/2006 | Kempker et al. | |
| 7,100,824 B2 | 9/2006 | Ostrowski et al. | |
| 7,107,221 B1 | 9/2006 | Tracy et al. | |
| 7,120,462 B2 | 10/2006 | Kumar | |
| 7,124,940 B2 | 10/2006 | Som | |
| 7,127,414 B1 | 10/2006 | Awadallah et al. | |
| 7,147,154 B2 | 12/2006 | Myers et al. | |
| 7,149,543 B2 | 12/2006 | Kumar | |
| 7,152,789 B2 | 12/2006 | Hasegawa et al. | |
| 7,156,303 B1 | 1/2007 | Holzman | |
| 7,158,035 B2 | 1/2007 | Sakamoto et al. | |
| 7,168,618 B2 | 1/2007 | Schwartz | |
| 7,171,378 B2 | 1/2007 | Petrovich et al. | |
| 7,195,157 B2 | 3/2007 | Swartz et al. | |
| 7,199,709 B2 | 4/2007 | Parsons | |
| 7,213,743 B2 | 5/2007 | Carlson et al. | |
| 7,225,980 B2 | 6/2007 | Ku et al. | |
| 7,295,132 B2 | 11/2007 | Steiner | |
| 7,309,009 B2 | 12/2007 | Singer-Harter | |
| 7,364,070 B2 | 4/2008 | Chang | |
| 7,372,360 B2 | 5/2008 | Joseph | |
| 7,375,634 B2 | 5/2008 | Sprague | |
| 7,389,934 B2 | 6/2008 | Do et al. | |
| 7,443,295 B2 | 10/2008 | Brice et al. | |
| 7,481,368 B2 | 1/2009 | Wang et al. | |
| 2001/0028301 A1 | 10/2001 | Geiger et al. | |
| 2001/0054012 A1 | 12/2001 | Nayyar | |
| 2002/0143637 A1 | 10/2002 | Shmueli et al. | |
| 2002/0167916 A1 | 11/2002 | Clapper | |
| 2002/0174025 A1 | 11/2002 | Hind et al. | |
| 2003/0015585 A1 | 1/2003 | Wike, Jr. et al. | |
| 2003/0040969 A1 | 2/2003 | O'Hagan et al. | |
| 2004/0065732 A1 | 4/2004 | Bernds et al. | |
| 2004/0103034 A1 | 5/2004 | Reade et al. | |
| 2004/0111320 A1 * | 6/2004 | Schlieffers et al. | 705/16 |
| 2004/0249717 A1 | 12/2004 | Shirasaki | |
| 2005/0027443 A1 | 2/2005 | Cato | |
| 2005/0119899 A1 | 6/2005 | Palmquist | |
| 2005/0125320 A1 | 6/2005 | Boesen | |
| 2005/0149226 A1 | 7/2005 | Stevens et al. | |
| 2005/0149391 A1 | 7/2005 | O'Shea et al. | |
| 2005/0187819 A1 | 8/2005 | Johnson | |
| 2005/0234778 A1 | 10/2005 | Sperduti et al. | |
| 2006/0010027 A1 | 1/2006 | Redman | |
| 2006/0163350 A1 | 7/2006 | Melton et al. | |
| 2006/0200378 A1 | 9/2006 | Sorensen | |
| 2006/0202027 A1 | 9/2006 | Demere | |
| 2006/0206435 A1 | 9/2006 | Hoblit et al. | |
| 2006/0208073 A1 | 9/2006 | Blaeuer | |
| 2006/0218152 A1 | 9/2006 | Coveley et al. | |
| 2006/0229930 A9 | 10/2006 | Gottfurcht | |
| 2006/0229946 A1 | 10/2006 | Scroggie et al. | |
| 2006/0230064 A1 | 10/2006 | Perkowski | |
| 2006/0235806 A1 | 10/2006 | Nakamura | |
| 2006/0242011 A1 | 10/2006 | Bell et al. | |
| 2006/0244588 A1 | 11/2006 | Hannah et al. | |
| 2006/0247847 A1 | 11/2006 | Carter et al. | |
| 2006/0247978 A1 | 11/2006 | Davis | |
| 2006/0248022 A1 | 11/2006 | Nakamura | |
| 2006/0255951 A1 | 11/2006 | Roeder et al. | |
| 2006/0256700 A1 | 11/2006 | Ishibashi et al. | |
| 2006/0259346 A1 | 11/2006 | Williamson | |
| 2006/0259358 A1 | 11/2006 | Robinson et al. | |
| 2006/0259369 A1 | 11/2006 | Bongrazio et al. | |
| 2006/0259373 A1 | 11/2006 | Perrier et al. | |
| 2006/0264120 A1 * | 11/2006 | Perrier et al. | 439/752 |
| 2006/0265281 A1 | 11/2006 | Sprovieri et al. | |
| 2006/0265290 A1 | 11/2006 | Perrier et al. | |
| 2006/0266904 A1 | 11/2006 | Crum | |
| 2006/0271437 A1 | 11/2006 | Maggio | |
| 2006/0271445 A1 | 11/2006 | Lee et al. | |
| 2006/0271449 A1 | 11/2006 | Oliver et al. | |
| 2006/0277107 A1 | 12/2006 | Beal et al. | |
| 2006/0282311 A1 | 12/2006 | Jiang | |
| 2006/0282334 A1 | 12/2006 | Kao et al. | |
| 2006/0283943 A1 | 12/2006 | Ostrowski et al. | |
| 2006/0287927 A1 | 12/2006 | True et al. | |
| 2006/0289635 A1 | 12/2006 | Lin | |
| 2006/0289637 A1 * | 12/2006 | Brice et al. | 235/385 |
| 2006/0293968 A1 | 12/2006 | Brice et al. | |
| 2006/0293975 A1 | 12/2006 | Hansson | |
| 2007/0005444 A1 | 1/2007 | Fuisz et al. | |
| 2007/0007337 A1 | 1/2007 | Clark et al. | |
| 2007/0013479 A1 | 1/2007 | Goel et al. | |
| 2007/0085682 A1 | 4/2007 | Murofushi et al. | |
| 2008/0011836 A1 | 1/2008 | Adema et al. | |
| 2008/0059297 A1 | 3/2008 | Vallier et al. | |
| 2008/0141165 A1 | 6/2008 | Feig et al. | |
| 2008/0230603 A1 | 9/2008 | Stawar et al. | |

| | | | |
|---|---|---|---|
| 2008/0231431 | A1 | 9/2008 | Stawar et al. |
| 2008/0231432 | A1 | 9/2008 | Stawar et al. |
| 2008/0231448 | A1 | 9/2008 | Fowler et al. |
| 2008/0237339 | A1 | 10/2008 | Stawar et al. |
| 2008/0238009 | A1 | 10/2008 | Carpenter |
| 2008/0238615 | A1 | 10/2008 | Carpenter |
| 2008/0243626 | A1 | 10/2008 | Stawar et al. |

FOREIGN PATENT DOCUMENTS

| | | |
|---|---|---|
| DE | 10020544 A1 | 10/2001 |
| WO | 0173710 A1 | 10/2001 |

OTHER PUBLICATIONS

Office Action dated Jan. 28, 2009 (41 pages), U.S. Appl. No. 11/291,353, filed Dec. 1, 2005.
Advisory Action dated Mar. 10, 2009 (8 pages), U.S. Appl. No. 11/291,451, filed Dec. 1, 2005.
Office Action (Final) dated Mar. 23, 2009 (37 pages), U.S. Appl. No. 11/690,850, filed Mar. 26, 2007.
Office Action dated Apr. 17, 2009 (22 pages), U.S. Appl. No. 11/291,451, filed Dec. 1, 2005.
Office Action dated May 6, 2009 (35 pages), U.S. Appl. No. 11/690,840, filed Mar. 25, 2007.
Advisory Action dated Jun. 5, 2009 (3 pages), U.S. Appl. No. 11/690,850, filed Mar. 26, 2007.
Office Action (Final) dated Jun. 9, 2009, (15 pages), U.S. Appl. No. 11/291,353, filed Dec. 1, 2005.
Foreign communication from a related counterpart application—International Search Report and Written Opinion, PCT/US2008/058123, Oct. 23, 2008, 12 pages.
Foreign communication from a related counterpart application—International Search Report and Written Opinion, PCT/US2006/025949, Mar. 21, 2007, 24 pages.
Office Action dated Nov. 1, 2007 (15 pages), U.S. Appl. No. 11/690,838, filed Mar. 25, 2007.
Office Action dated May 14, 2008 (33 pages), U.S. Appl. No. 11/291,451, filed Dec. 1, 2005.
Office Action dated Jan. 16, 2008 (10 pages), U.S. Appl. No. 11/690,852, filed Mar. 26, 2007.
Office Action (Final) dated Jun. 9, 2008 (18 pages), U.S. Appl. No. 11/690,838, filed Mar. 25, 2007.
Office Action (Final) dated Jul. 22, 2008 (12 pages), U.S. Appl. No. 11/690,852, filed Mar. 26, 2007.
Office Action dated Sep. 12, 2008 (13 pages), U.S. Appl. No. 11/690,850, filed Mar. 26, 2007.
Provisional Patent Application entitled "Voice Activation, Speech to Text for Use in Supermarkets or Stores on Shopping Carts," by David George Brice, filed Jun. 28, 2005, as U.S. Appl. No. 60/694,575.
Provisional Patent Application entitled "Basket Mounting Display for Shopping Cart," by David George Brice, filed Jul. 27, 2005, as U.S. Appl. No. 60/702,831.
Provisional Patent Application entitled "Integrated Multi-Media Shopping System," by David George Brice, et al., filed Aug. 5, 2005, as U.S. Appl. No. 60/705,776.
Provisional Patent Application entitled "Media Enabled Shopping Cart," by David George Brice, et al., filed Sep. 1, 2005, as U.S. Appl. No. 60/713,320.
Advisory Action dated Aug. 19, 2009, (3 pages), U.S. Appl. No. 11/291,353, filed Dec. 1, 2005.
Author unknown, "Fijitsu, Klever marketing announce alliance for personalized shopping; integrated, intelligent shopping cart will put friendly face on self-service shopping," AMR Research, Inc., Feb. 4, 2004, 3 pages, Business Wire, ProQuest LLC.
Foreign communication from a related counterpart application—International Preliminary Report on Patentability, PCT/US2008/058123, Oct. 8, 2009, 7 pages.
Notice of Allowance dated Sep. 29, 2009, (23 pages), U.S. Appl. No. 11/291,353, filed Dec. 1, 2005.
Notice of Allowance Dated Sep. 29, 2009 (5 pages), U.S. Appl. No. 11/291,353, filed Dec. 1, 2005.
Notice of Allowance dated Oct. 22, 2009 (36 pages), U.S. Appl. No. 11/690,849, filed Mar. 26, 2007.
Notice of Allowance dated Dec. 29, 2009 (11 pages), U.S. Appl. No. 11/690,840, filed Mar. 25, 2007.
Office Action dated Jul. 21, 2009 (35 pages), U.S. Appl. No. 11/690,841, filed Mar. 25, 2007.
Office Action dated Jul. 21, 2009 (37 pages), U.S. Appl. No. 11/690,848, filed Mar. 25, 2007.
Office Action (Final) dated Oct. 14, 2009 (24 pages), U.S. Appl. No. 11/291,451, filed Dec. 1, 2005.
Office Action dated Nov. 3, 2009, (14 pages), U.S. Appl. No. 11/690,838, filed Mar. 25, 2007.

* cited by examiner

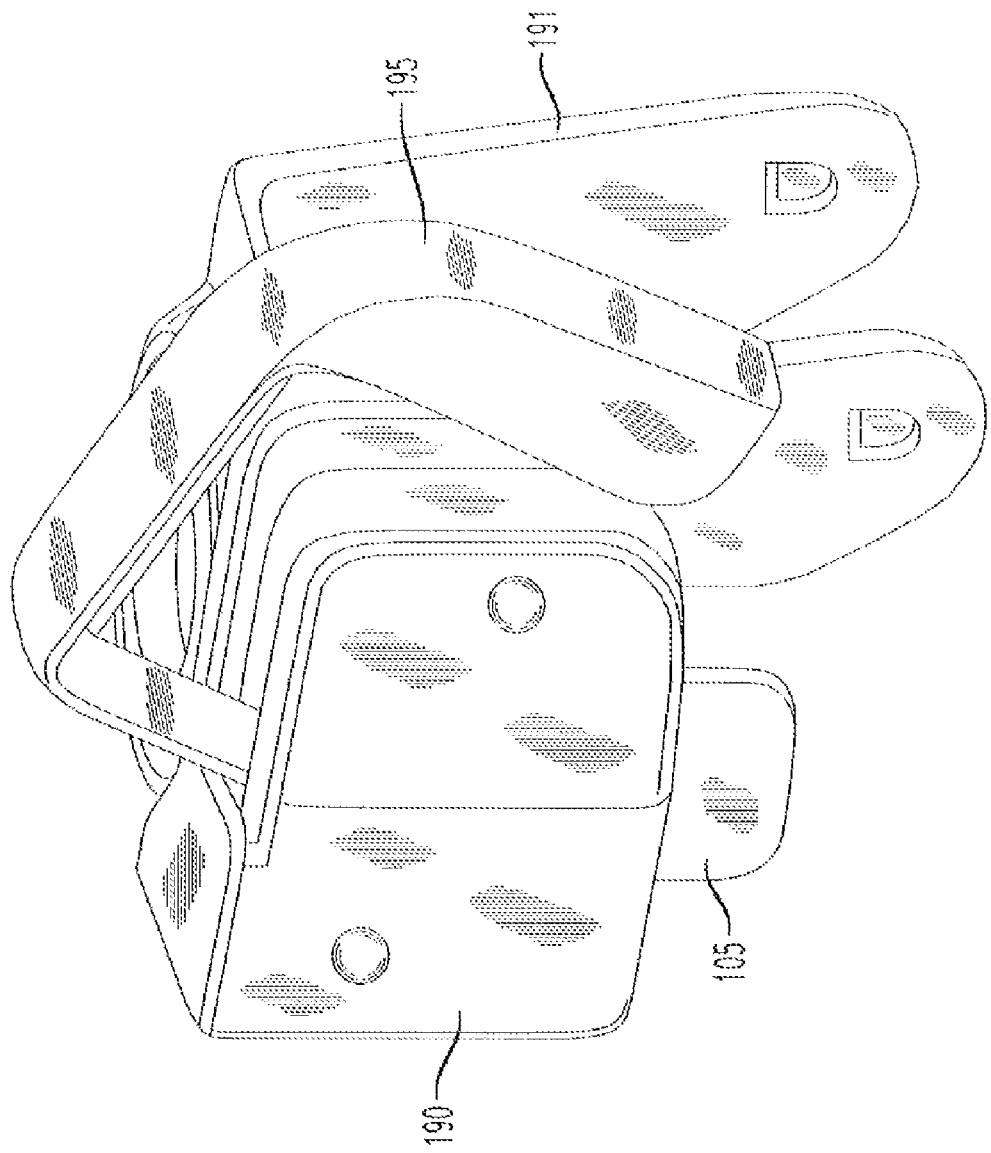

BI-DIRECTIONAL CHARGING/INTEGRATED POWER MANAGEMENT UNIT

FIELD OF THE INVENTION

The present disclosure is directed to a media enhanced shopping cart system, and more particularly, but not by way of limitation, to a system and method for providing information such as advertising to a consumer as a shopping cart is navigated within a store.

BACKGROUND OF THE INVENTION

In today's media market, measuring efficacy of advertising is difficult. Advertisers are spending billions of dollars on television, radio, and print with little return on investment, and they have little assurance that consumers will actually see advertisements, much less make purchasing decisions impacted by them. Thus, advertisers and stores are constantly searching for new and related advertising venues, and in particular those positioned at, or in close proximity to, the point of purchase location. To wit, the traditional shopping cart is an underutilized advertising medium. The shopping cart is the one venue that continually moves with the consumer as they navigate the store. Thus, the shopping cart provides an advertising venue with opportunity to improve the shopping experience of the consumer.

The present disclosure is aimed to address needs of advertisers, retailers, and consumers. Advertisers wish to 1) display ads at the most effective location and time, at the consumer's point of purchase, 2) specifically measure the effectiveness of advertising campaigns, and 3) improve return on advertisement investment dollars. Retailers wish to 1) increase sales, 2) share in advertising revenue, 3) reduce labor costs, 4) create a consumer friendly environment with less advertisement clutter, 5) enhance their store image and 6) make improvements that are compatible with existing solutions. Consumers wish to 1) have a pleasant and efficient shopping experience, and 2) save money on items that they need or want.

SUMMARY OF THE INVENTION

According to one embodiment, a media enhanced shopping cart system is provided. The media enhanced shopping cart system comprises a shopping cart comprising a frame, a basket, a handle, a base tray, a plurality of wheels, a read component for performing a proximity scan of the shopping cart, a locationing component for determining a location of the shopping cart within a store based on the scan, and a display component for displaying at least one advertisement for a product based on the location of the shopping cart within the store, wherein the locationing component is further operable to determine a location of the product within the store relative to the shopping cart based on the scan, and wherein the display component is further operable to display an indication of the location of the advertised product relative to the location of the shopping cart.

In another embodiment, a method is provided. The method comprises performing a proximity scan from a shopping cart, determining a location of the cart within a store based on the scan; displaying at least one product advertisement based on the location of the cart, correlating a location of an advertised product with the location of the cart, and displaying an indication of the location of the advertised product with respect to the location of the shopping cart.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIGS. 8D and 8E show a perspective view of a contact plate cover in a closed and open position, respectively.

DETAILED DESCRIPTION OF THE PREFERRED EMBODIMENTS

It should be understood at the outset that although certain exemplary implementations of embodiments of the present disclosure is illustrated below, the present system may be implemented using any number of techniques, whether currently known or in existence. The present disclosure should in no way be limited to the exemplary implementations, drawings, and techniques illustrated below, including the exemplary designs and implementations illustrated and described herein.

DETAILED DESCRIPTION OF INVENTION

Figure 1:
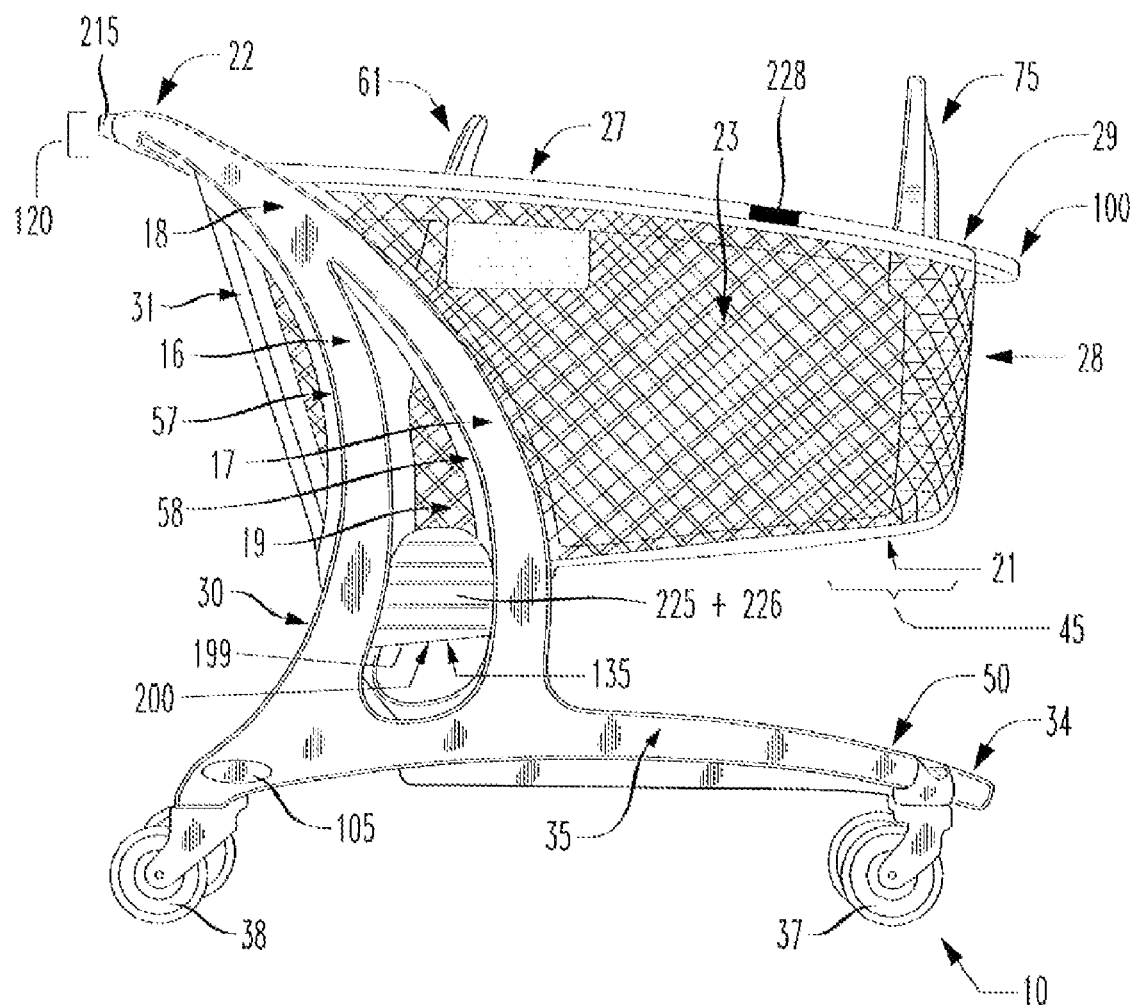
FIG. 1 is a side view of a media enabled shopping cart according to an embodiment of the present disclosure.
Figure 2:
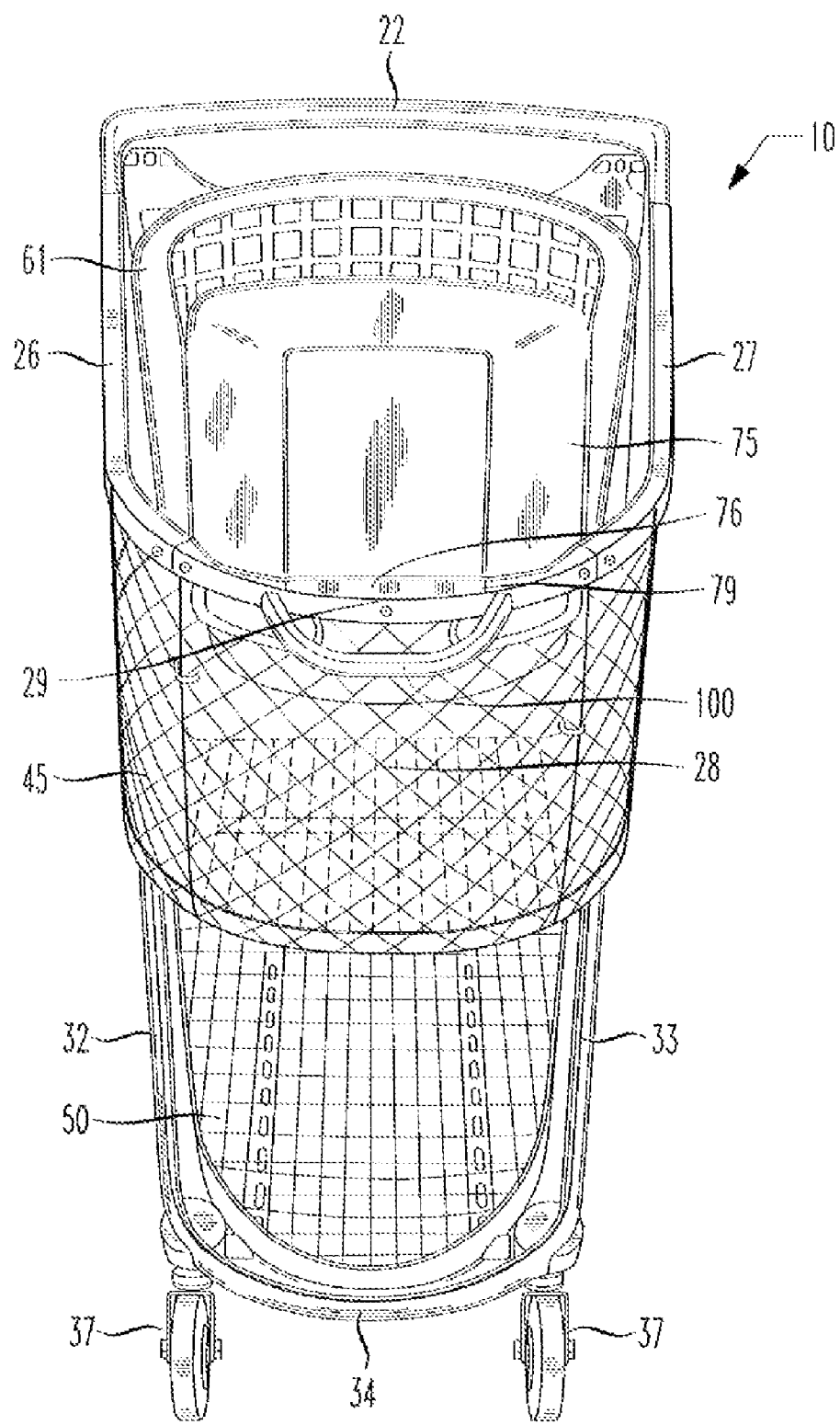
FIG. 2 shows a view from the nose of a media enabled shopping cart according to an embodiment of the present disclosure.
Figure 3A:
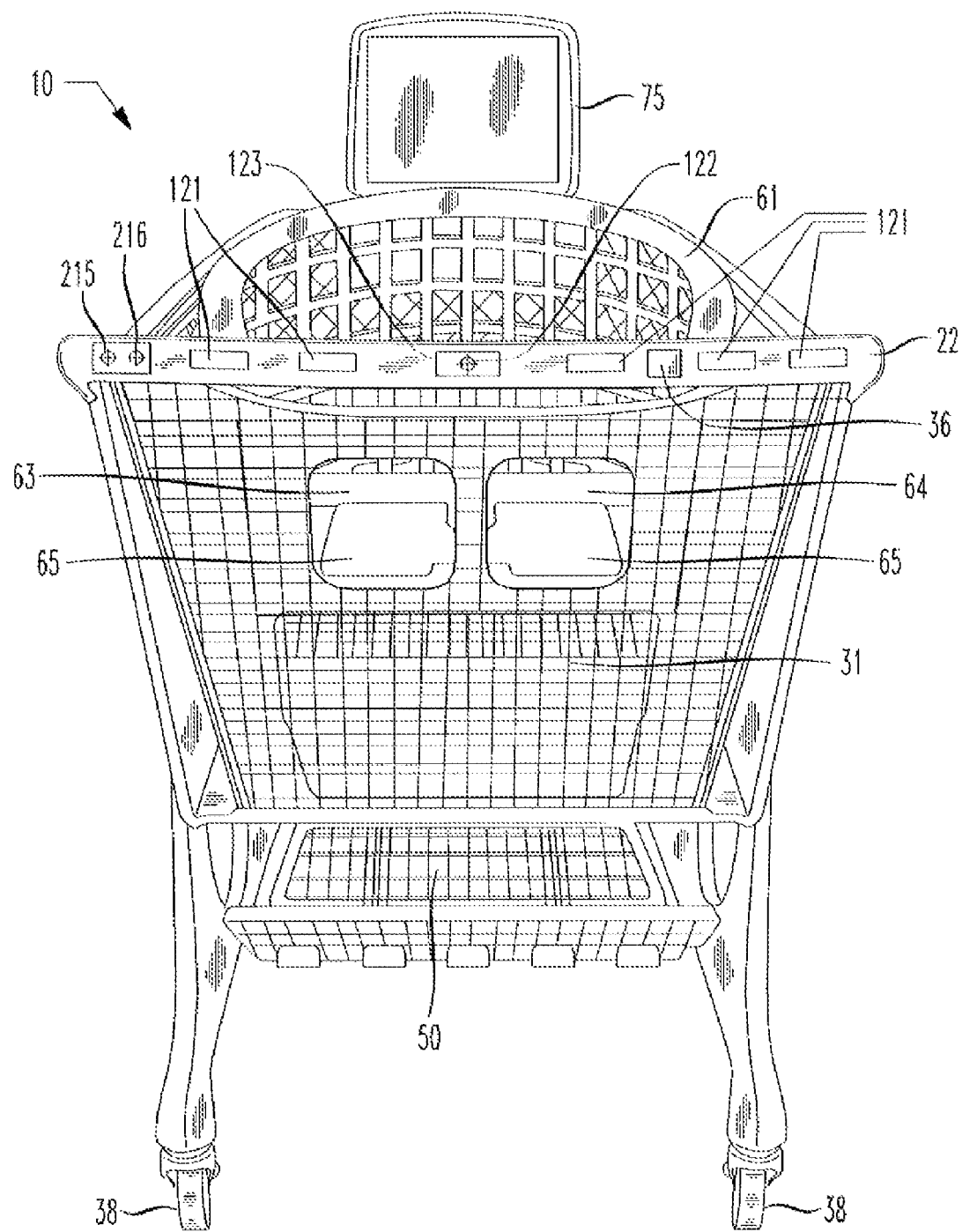
FIG. 3A illustrates a rear view of a media enabled shopping cart according to an embodiment of the present disclosure.

FIG. 1 is a side view, FIG. 2 is a front view, and FIG. 3A is a rear view of a shopping cart 10 having a basket 20 attached to a frame 30. The frame 30 further comprises a base 35 having base side members 32, 33 and front base member 34 extending between the base side members 32, 33 at the front or nose 45 of the cart. The frame 30 further comprises side members 16, 17 extending upward from the base 35 on each side of the shopping cart 10. At the rear 25 of the cart, a handle 22 extends between the side members 16, 17 at the upper end 18 of the side members. The basket 20 may, but need not necessarily, have channels or grooves 57, 58 configured for receipt of the side members 16, 17. Side members 16, 17 are shown as separate members having an opening 19 there between, but in alternative embodiments a single or solid member may be used in place of separate members 16, 17. In an embodiment, the frame, including base 35, side members 16, 17, and handle 22, is formed as a single, unified member, for example by molding the entire frame from plastic.

In an embodiment, substantially the entire cart 10 is made of plastic, also referred to herein as a plastic cart, and in particular the basket 20 consists essentially of plastic, along with the frame 30 and base tray 50. Various carts in the related art have a plastic basket supported by a metal frame, however, a plastic cart 10 of the present disclosure substantially comprises plastic in that the basket 20, frame 30 and base tray 50 are all made of plastic, and minor components, such as screws or other connectors, the wheels 37 and 38, and the like may be made of plastic or a metal. In an embodiment, the plastic used in the cart 10 comprises a high-density polyethylene ("HDPE"). The plastic is flame retardant and, in an embodiment, includes MICROBAN™, a product to inhibit the growth of bacteria, which aids in keeping the cart 10 cleaner. The substantially all plastic composition of the cart 10 additionally reduces or eliminates RFID interference as will be discussed in more detail herein.

In an embodiment, substantially the entire cart 10 is made of metal or a combination of plastic and metal, and in particular the basket 20 consists essentially of metal or a combination of plastic and metal, along with the frame 30 and base tray 50. In an embodiment, the cart 10 may have a plastic basket supported by a metal frame, and minor components, such as screws or other connectors, the wheels 37 and 38, and the like may be made of plastic or a metal. Such a cart is in usage, however may be retrofitted with the media enhancements, as will be discussed in more detail below.

A lower or base tray 50 is attached to the base 35 and may be supported by a front cross member 56 and a rear cross member 53 extending between the base side members 32, 33. Front wheels 37 are attached to the front of the base 35, for example at or near the intersection of the base side members 32, 33 and the front base member 34. Rear wheels 38 are attached to the rear of the base 35, for example at or near the rearward end of base side members 32, 33. The front wheels, the rear wheels, or both may be casters comprised of metal and/or plastic.

Figure 12:
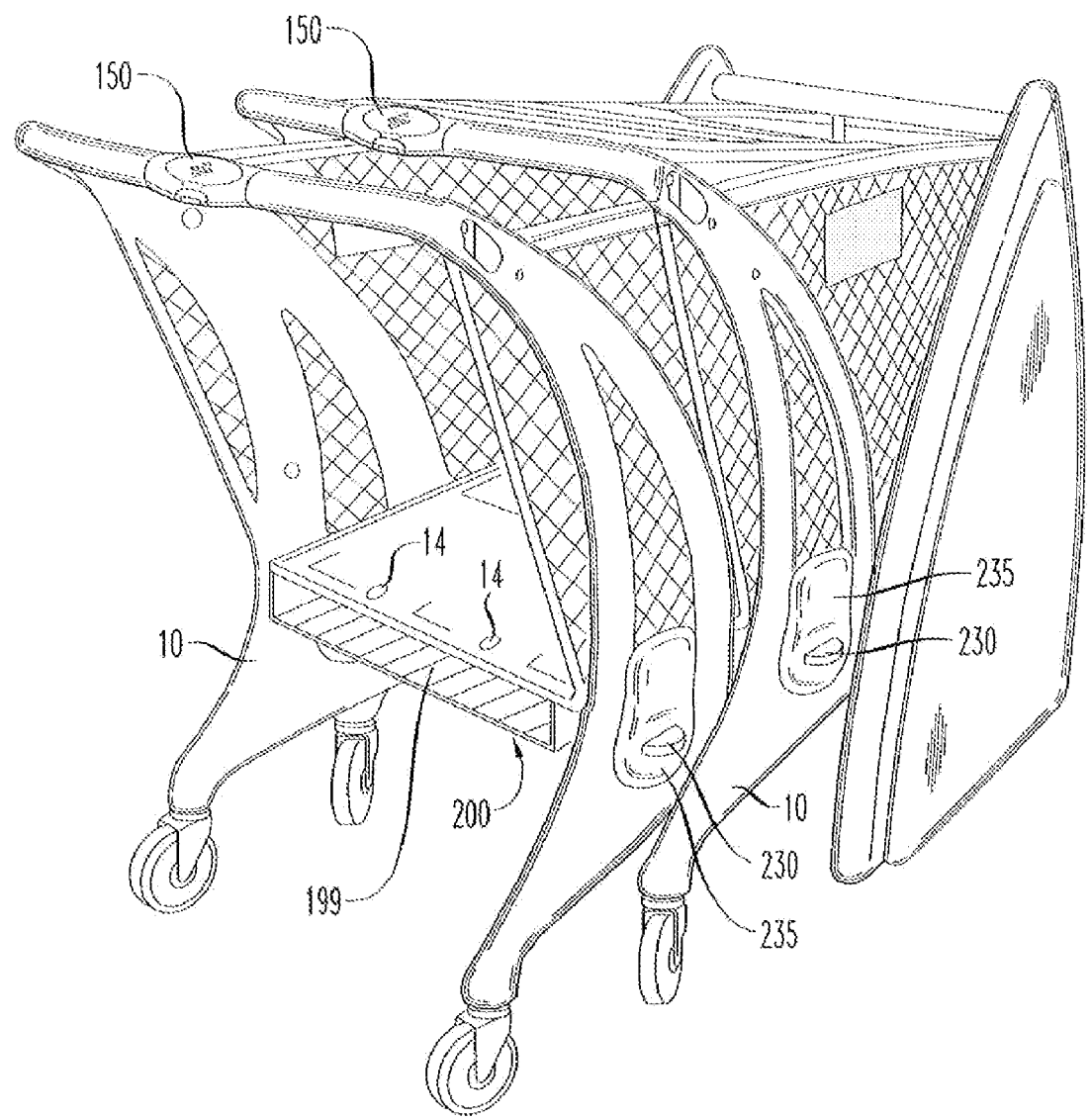
FIG. 12 is an exemplary view of a plurality of carts nested together for storage according to an embodiment of the present disclosure.

The basket 20 further comprises a bottom 21; side walls 23, 24; side upper edges 26, 27; a front wall 28; a front edge 29; and a rear wall 31. The bottom 21 and walls 23 and 24, front side wall 28, and rear side wall 31 define an interior 54 of the basket 20, and the edges 26 and 27 and front edge 29 define an upper boundary for the interior 54 of the basket 20. The exterior of the basket 20 refers to areas beyond the interior of the basket as previously defined. In an embodiment, a plane containing the upper edges 26 and 27 and front edge 29 defines the upper boundary for the interior 54 of the basket 20. The rear side wall 31 may be hinged via hinges 51, 52 such that the lower edge 55 of rear side wall 31 may swing upward into the interior 54 of the basket to receive the front side wall 28 of another cart, thereby allowing the carts to be nested for storage as shown in FIG. 12.

The basket 20 may further comprise a child seat 60 having a seat back 61 and a seat bottom 62. The rear side wall 31 may have openings 63, 64 to accommodate a child's legs when seated in seat 60. The seat bottom 62 may include a hinged panel 65 that may be flipped up to close openings 63, 64 when the seat 60 is not occupied. The seat back 61 may be hinged at or near the interior bottom of rear side wall 31 such that when unneeded the seat 60 may fold about flush with the rear side wall 31 to increase storage area in the interior 54 of the basket 20.

In an embodiment, the cart 10 further comprises a bumper handle 100. The bumper handle 100 may comprise a plastic coated with neoprene, rubber or a similar coating product, or may comprise an uncoated plastic similar to that of which the basket 20 and/or frame 30 is comprised. The bumper handle 100 may comprise an integrated portion of the basket 20, or alternatively, may be coupled to the basket 20 or frame 30. In an embodiment, the bumper handle 100 is coupled to an upper edge 26 or 27, or front edge 29 of the basket 20. Various means for attaching the bumper handle 100 may be used in the present disclosure and include but are not limited to clamping, fastening, screwing, gluing, clasping, welding, adhering, and the like. Various attachment devices may be used in the present disclosure and include but are not limited to clamps, fasteners, screws, bolts, glues, clasps, adhesives, and the like. In another embodiment, the bumper handle 100 may comprise an integrated portion of the 28 front side wall 28 of the basket 20 or may comprise an integrated portion of the front edge 29 of the front side wall 28 of the basket 20.

In an embodiment, the bumper handle 100 may provide the consumer 85 an option for pulling the cart 10 from a nested position with one or more other carts, without pulling the cart 10 from a nested position by way of pulling on the video display 75. The bumper handle 100 may also be used by the consumer 85 to pull the cart 10 at various times while shopping. In an embodiment, the bumper handle 100 may cushion the cart 10 and the video display 75 when a consumer 85 or other individual places the cart 10 into a nested position with one or more other carts. The bumper handle 100 may also act as a bumper to cushion impact of the cart 10 with other objects such as walls, shelves, product displays, vehicles, etc.

The cart 10 may be enhanced with several additional features, though there is a market for the substantially all plastic cart without media enabling capabilities. The cart 10 may comprise a traditional cart retrofitted with the enhancements described below. A cart 10 having a video display 75 is described by copending U.S. Provisional Application filed Jul. 27, 2005, entitled "Basket Mounted Display for Shopping Cart," incorporated by reference in its entirety. Added media enhancing capabilities may include displaying visual images such as advertising to the consumer 85 based upon the location of the cart 10 within the store, navigating menu options on the video display 75 using either the voice activated interface 120 or a five-position navigation device 123, scanning products for purchase according to bar codes or RFID tags, enhanced check out at a point of sale, media enhanced shopping cart shopping lists, a product "find" function, and data mining of information pertaining to advertisements displayed to the consumer 85 and which products were actually purchased, and the like, as will be discussed in greater detail herein.

Figure 4:
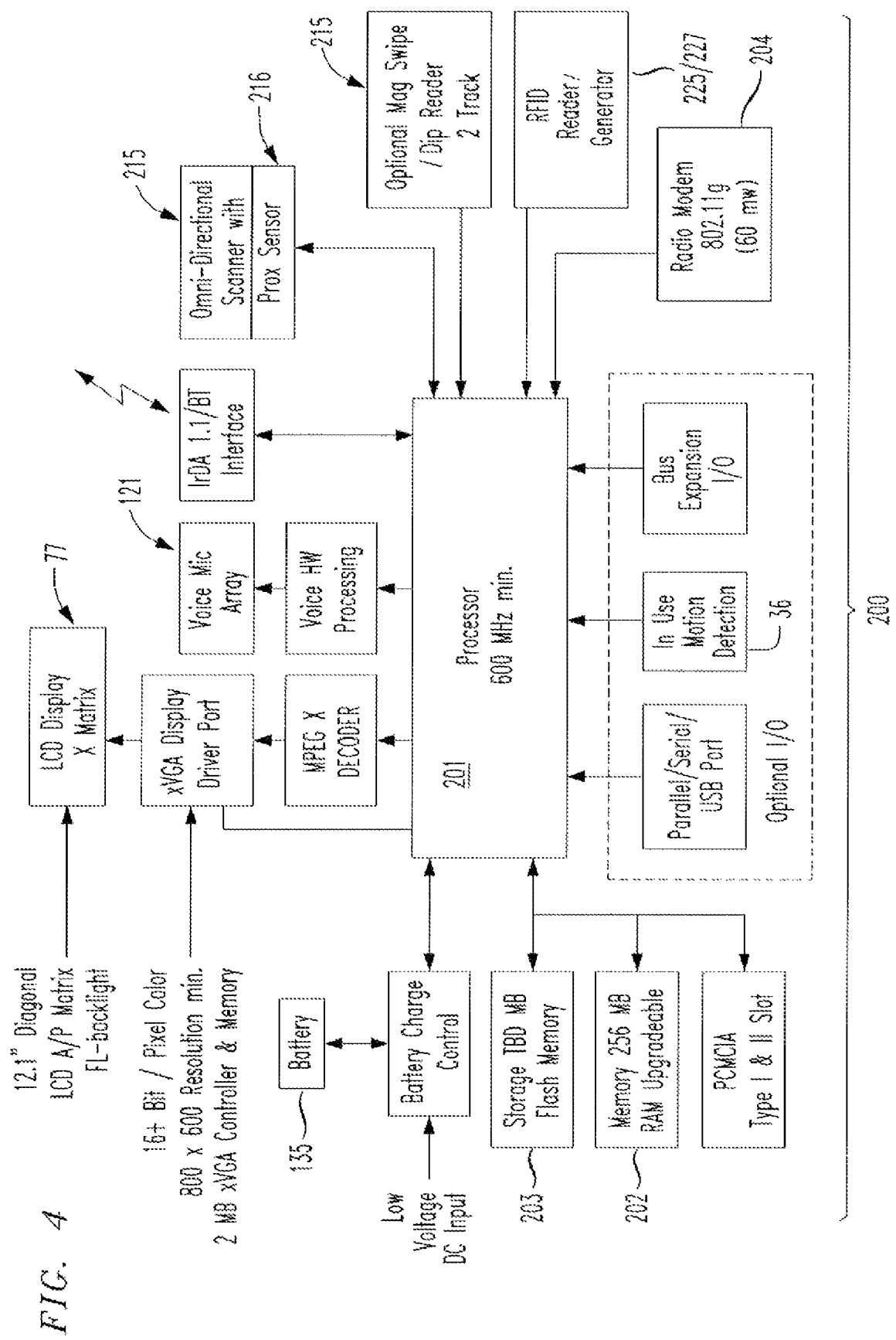
FIG. 4 is a block diagram of a modular device of a media enabled shopping cart according to an embodiment of the present disclosure.

In various embodiments, the shopping cart system may further comprise an embedded computer module ("ECM") 200, also referred to as a modular onboard device (MOD), comprising a central processing unit ("CPU") 201, a local memory 202, a non-volatile memory 203, and a network transceiver 204 as shown in the block diagram of FIG. 4. In an embodiment, the ECM 200 may comprise a chipset further comprising, for example, a microprocessor and a graphics accelerator. In an embodiment, the chipset may comprise an Intel pxa270/2700g xScale chipset or an equivalent or improvement thereof. In an embodiment, the non-volatile memory 203 comprises flash memory, as is well known in the art. In an embodiment, the network transceiver 204 comprises a Wireless Local Area Network ("WLAN") transceiver operable to enable the ECM 200 to communicate with various network components as will be described in greater detail herein. In an embodiment, the network transceiver or a component thereof such as the antenna may be located on the ECM 200, for example near a front wall of the ECM facing the nose of the cart. In referring to various wireless communications herein, including but not limited to the network transceiver 204, any suitable wireless communications protocol may be used including but not limited to IEEE 802.11 "wi-fi" standards such as 802.11a/b/g, IEEE 802.15 "Bluetooth," IEEE 802.16 "WiMAX," HomeRF, or combinations thereof. In an embodiment, the network transceiver 204 may be located in video display 75, for example in the screen housing 92, 93, and may be operably coupled to the ECM 200. The ECM 200 may further comprise a housing 199 comprising a protective, hermetically sealed plastic or other appropriate protective computer packaging. The ECM 200 may be attached to the frame 30 (for example, via connectors 14 as shown in FIG. 12), the bottom of basket 20, the base tray 50, or combinations thereof by various attachment means and devices as described herein. In an embodiment, the housing 199 may be integrally molded as part of a plastic cart 10, for example integrally molded to the bottom of basket 20, as part of the frame 30, as part of the base tray 50, or combinations thereof. In alternative embodiments, the ECM 200 or components thereof may be attached to or integrated with the video display 75, for example as part of the screen 77 or the base 76.

In an embodiment, in local memory 202 or non-volatile memory 203, the ECM 200 stores various programs and data, such as an operating system, voice recognition software, database software and populated database files, files pertaining to advertising, and an operating system. In an embodiment, the operating system software may be the same as, equivalent to, or an improvement over the Microsoft WinCE.net (5.0) Operating System utilizing the .NET Compact Framework and SQL Server embedded edition for WinCE along with standard Win com objects, drivers, and networking tool sets. In an alternative embodiment, the operating system may be Windows XP, Windows XP Embedded, or an equivalent thereof. It should be understood that specific computing equipment and software are disclosed herein as non-limiting examples, and that equivalent or improved components may be substituted as such become available. In an embodiment, the ECM 200 may incorporate the following types of programming: an embedded database engine, a business object layer, a graphic user interface presentation layer (GUI), one or more media display engines, automatic speech recognition engine, a bar code device driver, and an RFID reader driver.

The Cart Coordinator is an application running on the ECM 200 of the cart 10 that is responsible for keeping the cart's 10 electronic functionalities up-to-date, including all the content (such as advertising) as well as the software (i.e. applications and operating system). One of the many functions of the Cart Coordinator is to allow the cart 10 to communicate with a store's in-store server ("ISS") 330. In various embodiments, the Cart Coordinator performs some or all of the functionality while the cart 10 is in the cart corral 110. The Cart Coordinator also maintains communication with the ISS 330 while the cart 10 is out of the cart corral 110, e.g. during a shopping session. The Cart Coordinator checks the status and version of content and software, and upon finding an item (i.e. content or a piece of software) that needs to be updated, the Cart Coordinator starts a download via the wireless connection.

The Deployment Manager is another application running on the ECM 200 of the cart 10 that is responsible for installing the software downloaded by the Cart Coordinator on the cart 10. The Deployment Manager includes the ability to determine whether a change is a minor change such that a simple update may be installed, or a more significant change requiring installation and restart, or a major change, calling for installation of the software followed by rebooting the cart 10.

In various embodiments, the Cart Coordinator and the Deployment Manager are functional for synchronizing and updating only when the cart 10 is present in the corral 110, while in other embodiments, the Cart Coordinator and the Deployment Manager are functional for synchronizing and updating while the cart 10 is not in use but not necessarily present in the corral 110.

In various embodiments, the Deployment Manager functions when the cart 10 is located in the cart corral 110, because it is desirable to make major changes to the cart when the cart 10 is located within the best network coverage, which in some embodiments may be in the cart corral 110. Additionally, it is undesirable to encumber the cart's 10 assets by downloading while the cart is in use for shopping. Furthermore, the cart 10 has unlimited power when located in the corral 110, making the corral 110 the preferable location for synchronizing because synchronizing uses a significant amount of power.

In various embodiments, the Cart Coordinator is additionally responsible for uploads from the cart 10 to the ISS 330. For example, shop events such as time spent with a certain ad displayed, the path of the cart 10, items purchased, and the like may be scheduled for upload from the cart 10 to the ISS 330 by the Cart Coordinator.

In various embodiments, the Cart Coordinator may additionally provide periodic real time updates for items such as new product prices, store specials, and the like that are displayed and/or used by the cart 10.

In an embodiment, the ECM 200 may enter a hibernation or sleep mode when the cart 10 is nested with one or more other cart 10, when the cart 10 is stored, or when the cart 10 is not in motion for a predetermined period of time. In an embodiment, the hibernation or sleep mode may involve powering the ECM 200 down entirely, or partially. In an embodiment, the cart 10 may further comprise one or more motion sensors 36 operable to detect when the cart 10 is in motion. The motion sensor(s) 36 may be located anywhere on the cart 10. The motion sensor(s) 36 may be located in or on the handle 22 (for example in pod 150) as shown in FIG. 3A, the base 35, or the base tray 50. Alternatively, the motion sensor(s) 36 may be coupled to wheels 37, 38 and detect motion of the cart from turning of one or more wheels. Alternatively, the motion sensor(s) 36 may be integrated with a scanner 215, wherein the motion sensor may serve as a proximity sensor 216 for the scanner and/or a proximity sensor 216 for the scanner may serve as a motion sensor for activating components of the cart. Alternatively, the motion sensors(s) may be located in the ECM 200, for example a mercury switch or equivalent that detects movement of the cart. The motion sensor(s) activate the ECM 200, bringing it out of hibernation, when the cart 10 is selected by a consumer 85 from a nested position with one or more other carts, from a cart corral 110, or when a consumer 85 begins to move an abandoned cart 10 that has not moved for a predetermined length of time. Each of the components operably coupled to or comprising components of the ECM 200, as described below, may also be re-activated or hibernated along with the ECM 200 when the motion sensor(s) 36 detects that the cart 10 is in motion.

In an embodiment, the motion sensor(s) 36 may comprise mercury switches placed on the cart 10, such as in a location on a wheel 38 or caster, or on the basket 20 of the cart 10, such that when the cart 10 is in motion, the mercury in the switch tilts with the motion of the cart 10 to connect and disconnect the control of the ECM 200 or the various other components.

Figure 3B:
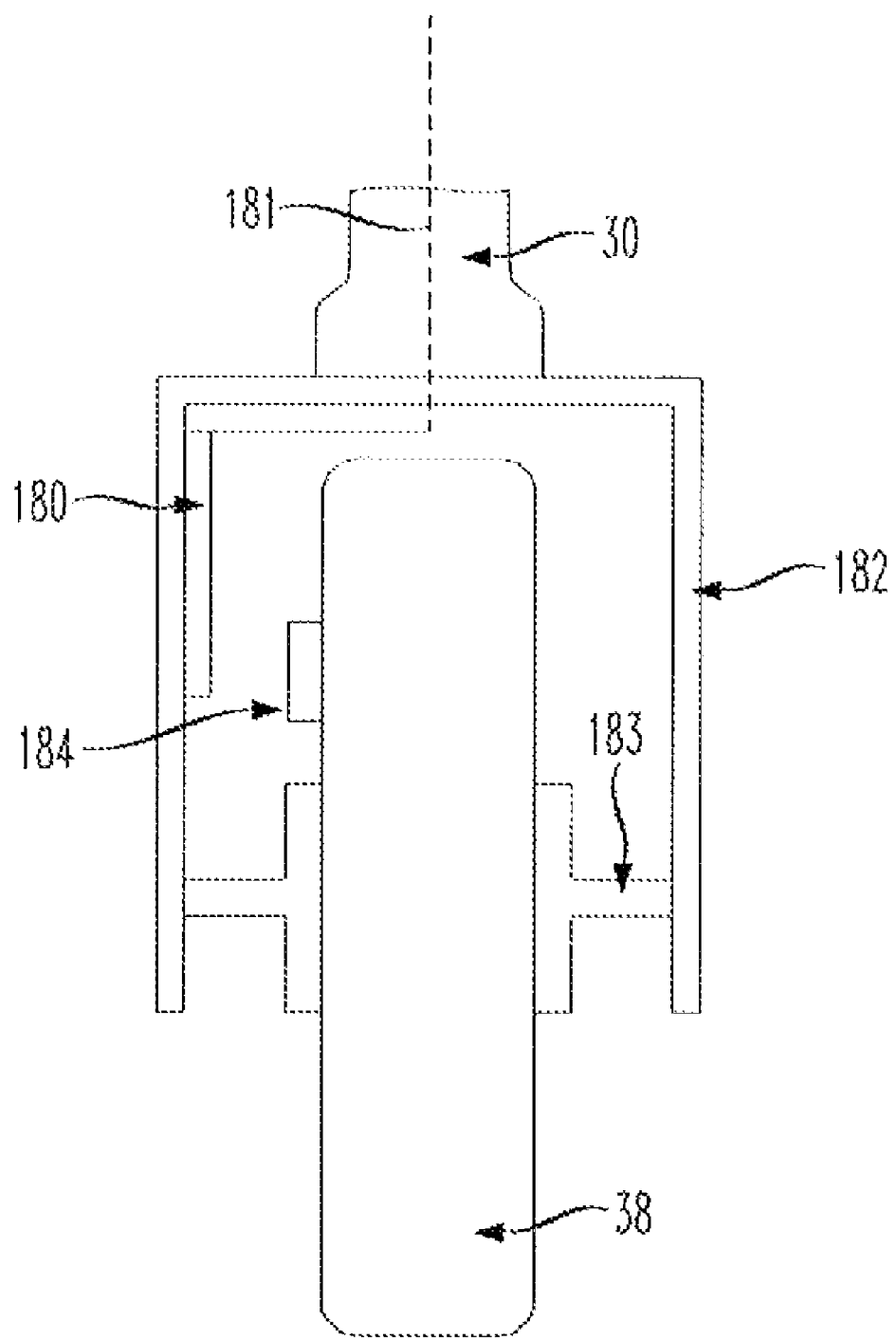
FIG. 3B is a close up, rear view of a rear caster wheel for a media enabled shopping cart.

In still another embodiment, the motion sensor(s) 36 may comprise one or more magnetic reed switches in addition to or in lieu of mercury switches. In such an embodiment as shown in FIG. 3B, a magnetic reed switch 180 is located in the frame or caster 182 above each wheel 38, and an associated magnet 184 is located on the wheel 38 hub, allowing sensing of tire rotation about axle 183 for motion detection. As is well understood in the art, by placing a magnet on a rotating wheel, a "heartbeat" reflecting the rotational speed of the wheel may be determined, with one "beat" each time the magnet rotates past the reed switch, opening or closing it. By placing a pair of these switch and magnet groupings, one at each wheel, the ECM 200 may receive a signal from the magnetic reed switch via cable or wire 181 running through frame 30 and determine the rotation speed of each wheel when in motion. By comparing rotational speed of adjacent wheels (for example, the two back wheels having a fixed, known position relative to each other), the ECM 200 may additionally determine when the cart turns as well as the speed and direction of turns, providing additional data for use in accurate determination of the location of the cart within the store. Further discussion of the use of magnetic reed switches in locating the cart 10 within the store is included below.

In an embodiment, the shopping cart system further comprises a correlation component comprising software, hardware or a combination of hardware and software operable to take various data gathered by components of the cart, and correlate one or more of the different types of data. The correlation component may, in an embodiment comprise hardware affixed to the cart with software incorporated therein, or may, in an embodiment, comprise hardware affixed to the cart with software stored in and/or executed from the ECM 200. In an embodiment, the correlation component may be integrated within the ECM 200.

For example, the correlation component is operable to correlate data from the inventory component (discussed in greater detail below) regarding the inventory contained by the shopping cart, with the unique identity of the shopping cart. In such an exemplary embodiment, the correlation component is operably coupled to the inventory component and the ECM 200, such that as the inventory of the cart 10 is updated, the correlation component correlates the current inventory with the unique identity of the cart 10 and stores the correlation (preferably in the ECM 200), such that, at the Point of Sale 300, the ECM 200 may wirelessly communicate the correlation of the inventory and the unique identity of the cart 10. The correlation component may be further operably coupled to the locationing component, such that the correlation component may correlate the inventory, the unique identity, and the location of the cart, over the course of a shopping trip, store the correlation, and wirelessly communicate the correlation to the Point of Sale 300.

For example, the correlation component is operable to correlate data from the inventory component (discussed in greater detail below) regarding the inventory contained by the shopping cart, with data relating to the shopping list component (discussed below). In such an exemplary embodiment, the correlation component is operably coupled to the inventory component, the shopping list component, the ECM 200, and the video display 75, such that as the inventory of the cart 10 is updated, the customer shopping list may be updated, as well as the shopping list displayed in the video display 75. The correlation may be stored in the ECM 200, or stored elsewhere in the network, associated with a specific consumer, and used to generate shopping lists in the future.

For example, the correlation component is operable to correlate data from the inventory component (discussed in greater detail below) regarding the inventory contained by the shopping cart, with data relating to which advertisements are displayed to a consumer by the cart. In such an exemplary embodiment, the correlation component is operably coupled to the locationing component, the video display 75 and the ECM 200, such that the correlation component receives the inventory from the inventory component, correlates it with advertisements that are stored or streamed to the ECM 200, and stores the correlation. The correlation may then be used in selecting which advertisement chosen from a plurality of advertisements are displayed based on the location of the cart. For example, if the inventory is known to include items for hosting a party, the correlation of the inventory with the advertisements and the location of the cart may be used to display one or more advertisements for additional items used for hosting a party.

The shopping cart system may further comprise a shopping list component for listing one or more products of a customer shopping list for purchase by the consumer. The shopping list component is operably coupled to the video display 75 of the cart 10 such that the shopping list may be displayed, either prominently, or as a less prominent display, with, for example, a menu of options or advertisements. In an embodiment, the shopping list component may comprise hardware, software, or a combination of hardware and software operable to carry out the function of maintaining, updating, and/or displaying a customer shopping list. In an embodiment, the hardware and software are co-housed and affixed to the cart 10, while in another embodiment, the hardware may comprise a unit affixed to the cart 10 (as will be discussed below) and the software may be stored and/or executed from a separate unit, such as the ECM 200, the ISS 330, POS computer 326 at the Point of Sale 300 or other networked system component, in conjunction with the hardware affixed to the cart.

In an embodiment, the shopping list component comprises the ECM 200 in conjunction with software operating thereon, populated with a customer shopping list. In an embodiment, the customer shopping list comprises historical data associated with the consumer 85 by way of the consumer's loyalty card, pin code, telephone number or other customer identifier associated with the consumer 85. The historical data relates to products that the consumer has purchased in the past or products that the consumer has listed in a customer shopping list previously. Consumer identifiers comprise a data reference that is unique to the consumer or their household. For example, a customer loyalty card may be associated with an identification number that is unique to the consumer or their household. Stores often offer customer loyalty cards to consumers, which consumers use in order to enjoy coupons, discounts and other advantages provided by the store to its loyal consumers. The loyalty card may additionally be linked with store services, such as a pharmacy, in-store deli, automotive service station, and the like, to track and record the consumer's needs relating to that service. A consumer may additionally identify themselves to the store using a pin code assigned by the store or their telephone number in order to receive discounts, coupons, and track usage of the store's services. The store may use the identifiers to track shopping of consumers for inventorying purposes as well as targeting advertisements and discounts to consumers based on what they actually buy.

In an embodiment, the customer shopping list for future shopping trips is generated by the inventory in the cart 10 during a present shopping trip. In such an exemplary embodiment, the shopping list component is operably coupled to the inventory component and the ECM 200 (or other networked component) to store the inventory of the cart 10 during a shopping trip, and store the purchases made based on the inventory at the Point of Sale 300. In such an embodiment, the stored inventory may be associated with a particular consumer by way of their customer loyalty card, pin code, telephone number or other consumer identifier. The stored inventory may then be used by the shopping list component to generate a customer shopping list.

In an embodiment, the customer shopping list may be downloaded from a store website and associated with the consumer's identity, such that when the loyalty card is scanned or other identifier is entered, the customer shopping list becomes available in the cart 10 to the consumer 85. In such an embodiment, when the consumer identifier is entered or scanned, the list downloaded from the store website may be streamed or wireless communicated from the ISS 330 via the access points to the ECM 200, and displayed. Alternatively, in an embodiment a shopping list stored in a PDA, handheld computer, mobile telephone or other electronic device may be downloaded to the ECM 200 through wireless, infrared, Bluetooth, and like known techniques, the details of which are not material herein, and the shopping list component will display the downloaded list, and enable the functions described herein. Alternatively, in an embodiment a shopping list may be emailed to the store system for transfer to a cart 10.

In still another embodiment, the customer shopping list is generated based one or more products selected by the consumer; wherein the one or more products are selected by the consumer by scanning a bar code on a product, placing a RFID tagged product in the shopping cart 10, and downloaded by the consumer in a list. In such an embodiment, the ECM 200 is operably coupled to the inventory component to store the identity of products purchased by the consumer before to generate a list. In such an embodiment, the ECM 200 is operable to store the identity of products previously placed in the cart 10 by the consumer to generate a list.

In an embodiment, the shopping list component is operably coupled to the correlation component in conjunction with the ECM 200 (as discussed above) for correlating the inventory contained by the shopping cart 10 with the shopping list to determine which products on the list are present in the shopping cart 10.

In an embodiment, the shopping list component is operably coupled to the ECM 200, the locationing component and the video display 75 for displaying an advertisement on the video display 75 for a product on the shopping list when the cart 10 is located proximate to the product. In such an exemplary embodiment, the locationing component determines where the cart is located in the store, the shopping list component determines which products on the customer shopping list are located nearby the cart based on its location, and the ECM 200 displays in the video display 75 at least one advertisement based on the cart 10 being located near to products on the shopping list.

Figure 16:
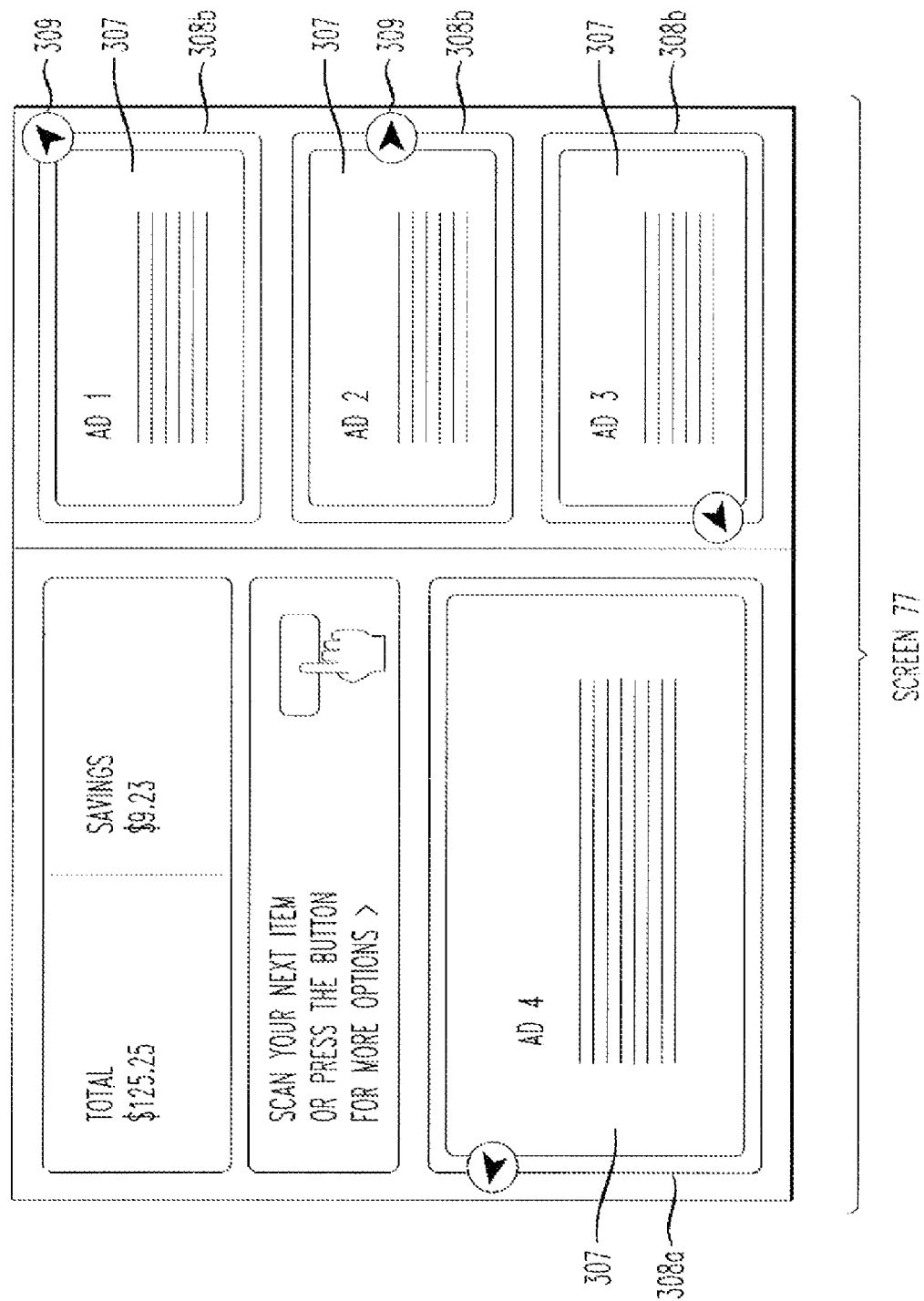
FIG. 16 shows an exemplary view of an advertising display on the video display according to an embodiment of the present disclosure.

In use, in an embodiment, the customer shopping list may be displayed in the video display 75 as a less prominent display with advertisements, or as a prominent display when selected by a consumer. By prominence, it is meant that the shopping list may be displayed as a larger, primary display on the video display 75 while advertisements are displayed in smaller, secondary display(s) on the video display 75 adjacent to the shopping list. As will be described further below, and as shown in FIG. 16, in an embodiment, the screen 77 of the video display 75 may be divided into a plurality of screen segments 308, such that one of the plurality of stored advertisements 307 may be displayed in various screen segment 308 while a shopping list may be displayed in a screen segment 308. In an embodiment, one of the plurality of screen segments 308 may be designated for display of consumer specific information, such as the customer shopping list.

The shopping list component may organize the products on the customer shopping list with locations in the store for each product on the list, and display the customer shopping list according to location. For example, the shopping list component may organize all the products on the customer shopping list according to a department of the store, or according to which aisle the products are located on, in order to facilitate shopping by the consumer.

In use, in an embodiment, the shopping list component, coupled to the correlation component, correlates the customer shopping list to the inventory of the cart 10, such that when a RFID tagged product from the customer shopping list is scanned by the basket RFID reader 227 or scanned by the scanner 215, the product is checked off the customer shopping list. In an embodiment, the consumer may check off a product from the customer shopping list. In the video display, the product may appear as checked off, or may be removed from the shopping list once added to the inventory of the cart.

In use, in an embodiment, the selection of advertisements displayed to the consumer may be correlated to the customer shopping list by the shopping list component, the correlation component (as discussed herein) and the ECM 200 or other networked component.

In an embodiment, the shopping list component is further operable, in conjunction with the ECM 200 or other networked component, for a consumer to select a recipe, and generate a customer shopping list based on the ingredients used for preparing the recipe. In such an embodiment, the consumer may select a recipe (either stored in the ECM 200, or streamed to the cart 10), and the ingredients necessary for preparing the recipe (also either stored in the ECM 200, or streamed to the cart 10) are added by the shopping list component to the customer shopping list.

In embodiment, the shopping cart system further comprises a voice activated interface 120. In an embodiment, a voice activated interface 120 comprising a microphone array 121 and a voice activation button 122 may be inset in the handle 22 of the cart 10 and/or in pod 150. In an embodiment, the microphone array 120 may comprise any number of microphones, including as few as a single microphone, for example integrated with pod 150. In an embodiment, the microphone array 121 comprises from 2 to 4 embedded microphones inset at intervals along the length of the handle 22. In an embodiment, a voice activation button 122 may activate the microphone array 120. In an embodiment, the voice activation button 122 may comprise a button of a five-way navigation device 123 or other navigation device and the microphone(s) may be housed in the pod 150. By pressing the voice activation button 122, the consumer 85 may activate a voice command option, enabling the consumer 85 to request the cart 10 to display the location of a particular product or other detailed information from a list of options on the video display 75. In an embodiment, the microphone array 120 has built-in noise cancellation capabilities.

In an embodiment, the voice activated interface 120, microphone array 121 and voice activation button 122 are operably coupled to the ECM 200. In an embodiment, the ECM 200 may store voice recognition software operable to process a spoken input from the consumer 85 through the microphone array 121 upon activation of the voice command option. The ECM 200 may determine an answer to the spoken question (which may involve reference to a database of product information) and display the answer on the video display 75. The answer may be provided graphically or in written description form, and may include a location (e.g., map) or a menu of options 124. For example, referring to FIG. 5, an exemplary response to a spoken input is shown. Upon a request by a consumer 85 being picked up by the microphone array 121, the video display 75 may identify the product requested (i.e. "ACME cottage cheese"), and display a written description 125 of the location of the product requested, as well as a graphical display 126 of a map of the store indicating the location 127 of the product requested with indication of the current location 128 of the cart. The video display 75 may simultaneously display a list of other options 124, e.g., a list of available voice commands, as well as one or more advertisements 306 in the plurality of screen segments 308, wherein the advertisements 306 are selected from a plurality of stored advertisements, as will be described in greater detail herein.

In an embodiment, the voice recognition software may comprise VoCon 3200™ software, commercially available from SCANSOFT™ or an equivalent software having similar voice recognition capabilities. In an embodiment, the voice activated interface 120, operably coupled to the ECM 200, may be re-activated from hibernation along with the ECM 200 when the motion sensor(s) 36 detects that the cart 10 is in motion.

In embodiment, the shopping cart system further comprises a speaker or other audio output device such as wired or wireless headphones operably coupled to the ECM 200. In an embodiment, a speaker or array of speakers may be inset in the handle 22 of the cart 10 and/or in pod 150. In an embodiment, the array of speakers may comprise any number and/or size of speakers, including as few as a single speaker, for example integrated with pod 150. In an embodiment, the speaker is a one inch audio speaker.

In an embodiment, the speaker may be operable to play audio portions of advertising corresponding to advertisements displayed on the video display 75. In an embodiment, the speaker may be operable to make announcements, such as a store announcement, or annunciate a successful scan, by audibly alerting the consumer when a product is scanned by the scanner 215 or when a RFID tagged product is added to the cart 10. In an embodiment, the speaker enables a customer service representative to speak with a consumer using the cart, resulting in saving the consumer from having to go stand in line at a customer service counter. In an embodiment, the speaker enables a store employee to speak with a consumer using the cart to alert the consumer to the status of their order at an in-store service such as a deli, pharmacy or automotive center.

In an embodiment, the shopping cart system may further comprise an inventory component for determining an inventory contained by the cart 10. The inventory component is operable to take an inventory of products placed in the basket 20 or products placed on the base tray 50. The inventory component may, in an embodiment, be operable to determine the inventory automatically without any action on the part of the consumer beyond placing a product in the cart 10. Alternatively, the inventory component may, in an embodiment, rely on some action by the consumer in order to determine the inventory of the cart 10, such as determining the inventory of the cart 10 when the consumer scans a product and places the product in the cart 10.

In an embodiment, the inventory component comprises hardware and software operable to carry out the inventorying function. In an embodiment, the hardware and software are co-housed and affixed to the cart 10, while in another embodiment, the hardware may comprise a unit affixed to the cart 10 (as will be discussed below) and the software may be stored and/or executed from a separate unit, such as the ECM 200, the POS computer 326 at the Point of Sale 300 or other networked system component, in conjunction with the hardware affixed to the cart. Various computing and communication components may use any suitable wired or wireless communications protocol such as those described herein.

In use, in an embodiment, the inventory component, in conjunction with the ECM 200 and the correlation component, is operable (as discussed above) to determine the inventory contained by a shopping cart, correlate the inventory to the unique identity of the shopping cart, convey the unique identity of the shopping cart to a Point of Sale 300 (or other retailer system), and convey the inventory of the shopping cart to a Point of Sale 300 (or other retailer system).

In use, in an embodiment, the inventory component is operably coupled to the ECM 200 and the identification component (discussed in greater detail herein). The identification component associates a unique identity with a shopping cart and the inventory component determines an inventory of the shopping cart. The correlation component (discussed in greater detail herein) correlates the inventory to the unique identity of the shopping cart, and the ECM 200 conveys the inventory of the shopping cart, or the correlation of the inventory to the unique identity to a retailer system, or the identification component conveys the unique identity of the shopping cart, or any combination thereof.

In use, in an embodiment, the inventory component determines an inventory contained by the cart 10. The inventory component is operable coupled to the shopping list component, the correlation component (both discussed in greater detail herein), the ECM 200 and the video display 75. The inventory component determines the inventory contained by a shopping cart, the shopping list component displays on the video display 75 a customer shopping list, the shopping list comprising one or more products for purchase. The correlation component correlates the inventory contained by the shopping cart with the shopping list to determine which products on the list are present in the shopping cart; and convey the inventory and the shopping list to a Point of Sale 300 at the time of purchase. Preferably, conveying the inventory and shopping list to the Point of Sale 300 is done wirelessly by the ECM 200, for example via any suitable wireless protocol such as those described herein.

Figure 13:
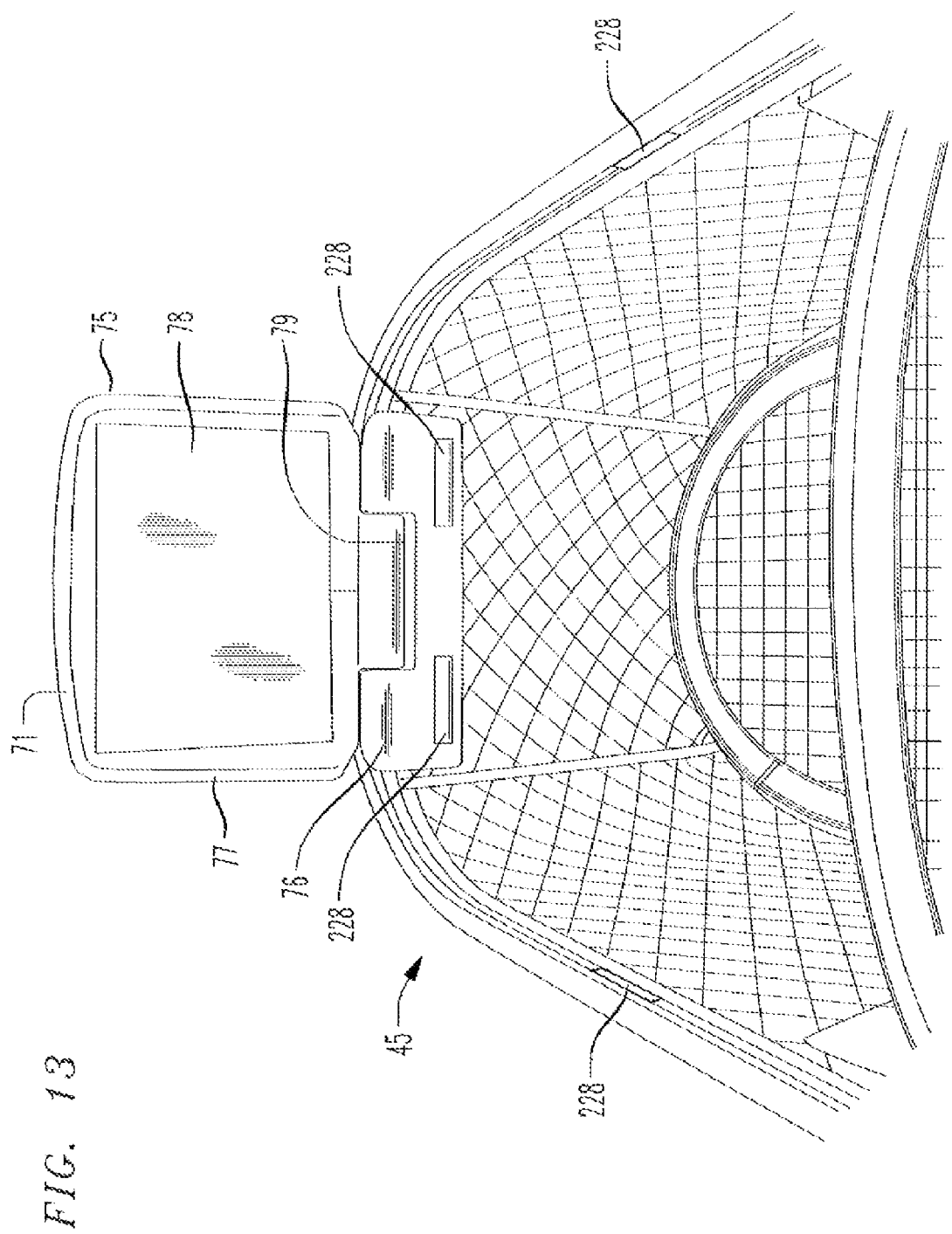
FIG. 13 shows a detailed view of the video display according to an embodiment of the present disclosure.

In an exemplary embodiment, the inventory component may comprise at least one basket RFID reader 227 with one or more RFID antennas 228 in conjunction with the ECM 200 and software operating thereon. The number and position of the antennas 228 may be selected as functionally needed, as would be apparent to one of skill in the art. In an embodiment, the basket RFID reader 227 with RFID antennas 228 may be located anywhere on the basket 20 and/or base tray 20 such products having RFID tags (either passive or active RFID tags) may be scanned as they are placed in the basket and/or base tray 20. Each RFID tag on a product is associated with an industry standard Electronic Product Code ("EPC"), giving the individual product a unique identity. In an embodiment, the basket RFID reader 227 may be integrated with the ECM, for example located within housing 199. Alternatively, the basket RFID reader 227 or may be located at other positions on the cart, for example located on the underside of the cart 10, secured by means of attachment to, for example, the bottom 21 of the basket 20, or to the base tray 50. In an embodiment, the basket RFID reader 227 and/or the antennas 228 may be integrated with the video display 75, for example as part of the base 76 as shown in FIG. 13. Alternatively, the RFID antennas 228 may be located along the edges 26, 27 or 29 as shown in FIG. 13; the side walls 23, 24; front side wall 28; rear side wall 31, or combinations thereof on basket 20 and/or base tray 50.

As products are placed in the basket 20 and/or base tray 50, and identification information (including, in an embodiment, the product EPC described above) is provided to the ECM 200, which may be further correlated with additional information such as price, product information, advertising, etc. In an embodiment, information may further be displayed on the video display 75, for example information pertaining to the product placed in the basket, added to a running total of the products in the cart 10, etc. The basket RFID reader 227 with RFID antennas 228 may automatically detect when an product has been removed from the cart 10 and placed back on a shelf, and will convey to the ECM 200 that the product has been removed, thus deducting the removed product from the running total displayed on the video display 75. The network transceiver 204 may additionally convey information about a product placed in or removed from the cart 10 to various network components as will be described in greater detail herein. In an embodiment, the cart 10 is a plastic cart as described herein which lessens or eliminates interference associated with basket RFID reader 227 and RFID antennas 228. In an embodiment, the cart 10 is a cart comprising metal, plastic, or a combination of plastic and metal that is retrofitted with the media enhancements described here.

In another exemplary embodiment, the inventory component alternatively or additionally comprises a scanner 215, for example a bar code scanner. In an embodiment, the scanner 215 is inset in the handle 22 and/or in pod 150 of the cart 10. In an embodiment, the scanner 215 may be attached to or incorporated with any portion of the basket 20, such as the side wall 23 or 24, the front side wall 28 or the rear side wall 31, in a manner that is accessible to the consumer 85 who is using the cart 10. Various attachment devices and means for attaching as described herein may be used with the scanner 215. The scanner 215 enables optional self-scanning of products for purchase, coupons, loyalty cards, and any other object having a bar code or Universal Product Code ("UPC") by the consumer 85. In an embodiment, the scanner 215 may be activated by the consumer 85 by bringing any product with a barcode symbol within a set proximity of the scanner 215. In an embodiment, the scanner 215 may be activated by a proximity sensor 216, which may comprise a portion of the scanner 215 or may be operably coupled to the scanner 215. Like the scanner 215, the proximity sensor 216 may likewise be integrated with pod 150. The scanner 215 may be any suitable scanner such as a laser scanner, CCD scanner, 2D imager, and the like. In an embodiment, the scanner 215 may comprise a linear imager scanner commercially available from HAND HELD PRODUCTS™ or an equivalent or improvement thereof. The scanner 215 may, in an embodiment, scan symbols, such as a UPC or European Article Numbering ("EAN") System codes, in an omni-directional manner.

In an embodiment, the inventory component may comprise the scanner 215, in conjunction with the ECM 200 and software operating thereon. In an embodiment, the inventory component is operable to determine the contents of the shopping cart based on what products the consumer 85 has scanned and placed in the shopping cart. In an embodiment, the scanner 215 is operably coupled to the ECM 200, such that as products are scanned and placed in the cart 10, the ECM 200 stores in local memory 202 a running total of the products in the cart 10 for purchase. Upon arriving at the checkout counter, known as the Point of Sale 300, the ECM 200 may communicate information regarding the products that were scanned by the consumer 85 to a POS computer 326 at the Point of Sale 300 or other networked system component, to be discussed in greater detail herein.

In an embodiment, the scanner 215, operably coupled to the ECM 200, may be hibernated or re-activated from hibernation along with the ECM 200 when the motion sensor(s) 36 detects that the cart 10 is in motion or stopped. Specifically, in an embodiment, the scanner 215 may be hibernated, or powered down, for power conservation purposes, when the cart 10 is in motion. When the consumer 85 stops pushing the cart 10 and the cart 10 becomes still while the consumer 85 is selecting products to purchase, the scanner 215 is re-activated such that the consumer 85 may scan products for purchase and place them in the cart 10. The motion sensor(s) 36 alone or in combination with other locator or positioning systems/data (for example, RFID scans and/or other locator/positioning means) enable this hibernation/reactivation function of the scanner 215. In alternative embodiments, other cart systems may be activated or deactivated based upon detection of motion or stoppage of the cart in order to conserve power and maximize battery life. For example, the bar code reader may be turned off when the cart is moving, the RFID reader/antennae may be turned off when the cart is stopped, the video display may be turned off when the cart is nested or is immobile for an extended time, or combinations thereof. Again, motion of the cart may be detected for example via a motion sensor such as a reed switch and/or mercury switch alone or in combination with other sensing means such interpreting read data from the RFID tags.

In an embodiment, the shopping cart system may further comprise a navigation device, for example a five-way navigation device 123. In alternative embodiments, other navigation devices may be used in addition to or in lieu of the five-way navigation device 123, for example hard or soft hot buttons, a joystick, touch panel/screen, or combinations thereof. As an additional user interface to the ECM 200 and other features of the cart 10, in an embodiment, a five-way navigation device 123 may be inset in the handle 22 or in the pod 150. The five-way navigation device 123 typically allows for input (e.g., navigation of a menu) via up, down, left, right, and enter functions. In an embodiment, the five-way navigation device 123 may be used to activate the microphone array 121 for voice recognition features, or may be used to navigate through a menu of options 124 shown on the video display 75. In an embodiment, the menu of options 124 may comprise such selections as: 1) a "Help" option, enabling the consumer 85 to request the location of a particular product, 2) an interface with an in-store pharmacy for the consumer 85 to request the status of their prescription or receive notification of prescription availability, 3) an interface with an in-store deli for the consumer 85 to make a deli order or receive notification of order availability, 3) an interface for notification to the consumer 85 of completion of in-store auto servicing, 4) an interface for interaction between the consumer 85 and customer service personnel for services such as rain checks, and other functions for in-store services.

In an embodiment, the shopping cart system may further comprise theft and tamper deterrence design features. The shopping cart, due to the nature of the electronic components used as well as the programming in the computer, may be targeted for theft and tampering. To this end, the various electronics assemblies for the components discussed herein are designed such that if a given cart is disassembled without customized tools and/or in an improper sequence of disassembly, the electronics assemblies are rendered non-functional by virtue of damage incurred by improper disassembly.

For example, the main logic board of the ECM 200 may be designed having the printed circuit board traces laid out with critical circuit traces residing in close proximity to mounting holes, such as within a few thousands of an inch from the mounting hole. The logic board then would be mounted to the casing and ECM 200 frame using a screw with a customized head, thereby requiring a customized tool for putting in or removing the screw. If the board is subsequently forced from the casing by someone lacking the customized tool, the critical traces would be damaged, and the board would be non-functional to a degree beyond repair without design schematics for the printed circuit board.

In another example, the video display 75, which is described in more detail below and that may comprise a liquid crystal display ("LCD"), includes theft deterrence and tampering design features. The video display 75 may include two primary physical elements, namely the LCD display screen and the LCD controller board that interfaces the LCD display screen via a flex circuit. The flex circuit connections to the LCD display screen are fragile and will not withstand flexing or pulling. A thin, insulating metal retaining bar may be added that runs the length of the flex circuit between the LCD display screen and the LCD controller board, and secured in place by a screw or screws with a customized head, thereby requiring a customized tool for removal. If the metal retaining bar is not removed using the appropriate customized tool and in a particular sequence that avoids flexing or pulling the flex circuit connections, the LCD assembly would be rendered non-functional to a degree beyond repair.

In an embodiment, the cart further comprises a battery 135 operably coupled to the ECM 200, the video display 75, voice activated interface 120, the bar code scanner 215, and any other component of the cart requiring power. In an embodiment, the battery 135 is a standard Lithium-Ion battery or other similar battery. In an embodiment, the battery 135 may be attached to the underside of the cart 10, by means of attachment to, for example, the bottom 21 of the basket 20, or to the base tray 50. Various attachment devices and means for attaching as described herein may be used with the battery 135. In an embodiment, the battery 135 may be integrated with the ECM 200. For example, a battery housing or compartment may be integrally molded from plastic with the ECM 200 housing 199 such that the battery is part of the ECM 200. In an embodiment, the battery 135 is rechargeable.

Figure 6:
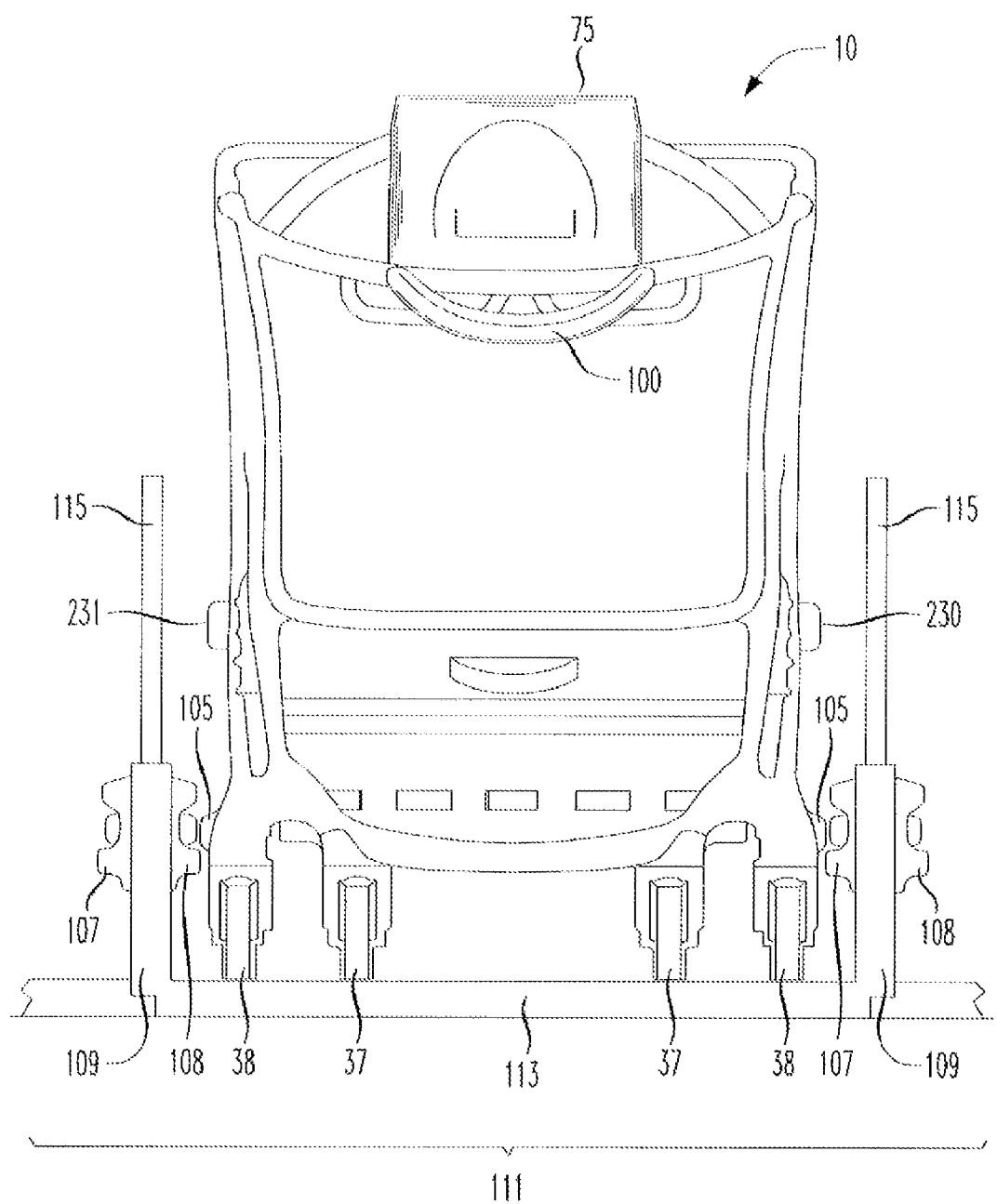
FIG. 6 illustrates a front view of a media enabled shopping cart recharging in a recharge corral according to an embodiment of the present disclosure.
Figure 7:
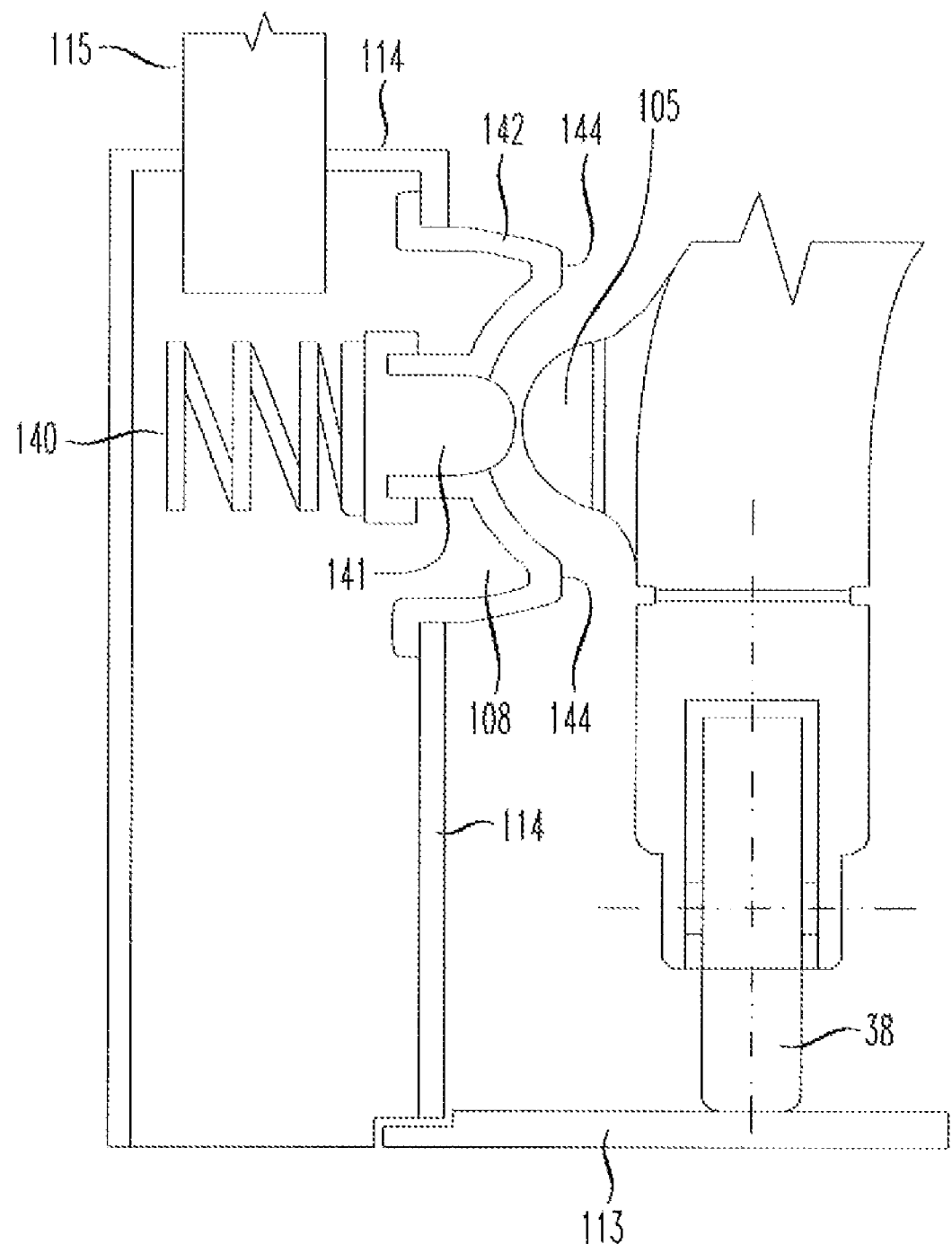
FIG. 7 is an exploded cutaway view of a media enabled shopping cart engaged in a recharge corral according to an embodiment of the present disclosure.

Referring to FIGS. 6, 7, and 8, in an embodiment, the cart 10 may further comprise one or more battery charger contact plates 105. FIG. 6 is a front view of a cart 10 recharging in a recharge stall 111. In an embodiment, the battery charger contact plate 105 may be located on the base side member 32 and/or 33, the side member 16 and/or 17, or the side wall 23 and/or 24. For example, as shown in FIGS. 1 and 6, a single battery charger contact plate 105 may be disposed on each side of cart 10, thereby providing a pair of battery charger contact plates for each cart. In an embodiment, the battery charger contact plates may be positioned adjacent the rear wheels 38, for example on the base side members 32, 33 slightly above the real wheel mount. Given that the rear wheel span is typically about the widest part of the cart, as can be seen in FIG. 6, positioning of the battery charger contact plates near the rear wheels places them in a low, outboard position on the cart that is useful in engaging a charge rail system 106 for recharging the battery. In an embodiment, the battery charger contact plate 105 may be spring-loaded to aid in contacting the contact plate with a charge rail.

Figure 8A:
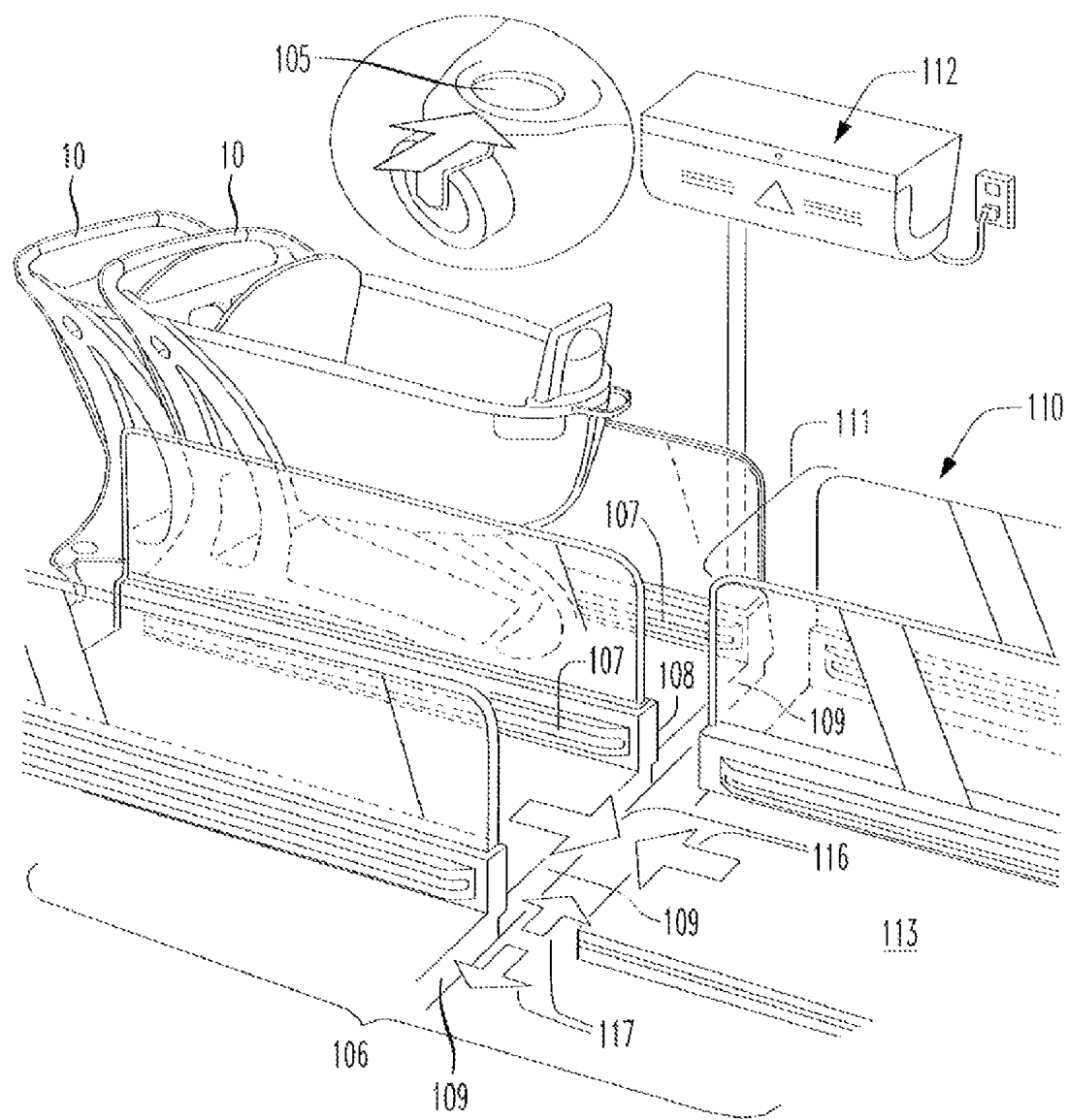
FIG. 8A shows a side view of a charge rail system for recharging the battery of one or more carts according to an embodiment of the present disclosure.

FIG. 8A is a side view of charge rail system 106 for recharging the battery 135 of one or more carts 10. The charge rail system 106 comprises a cart corral 110 having a plurality of recharge stalls or lanes 111, with each recharge lane having charge rails 107 and 108. In an embodiment, the recharge stalls 111 comprise a plurality of charge rail segments 109. In a store, the plurality of charge rail segments 109 comprised of charge rails 107 and 108 may be arranged in a cart corral 110. The plurality of charge rail segments 109 may be arranged in one or more rows of recharge stalls 111.

Figure 8B:
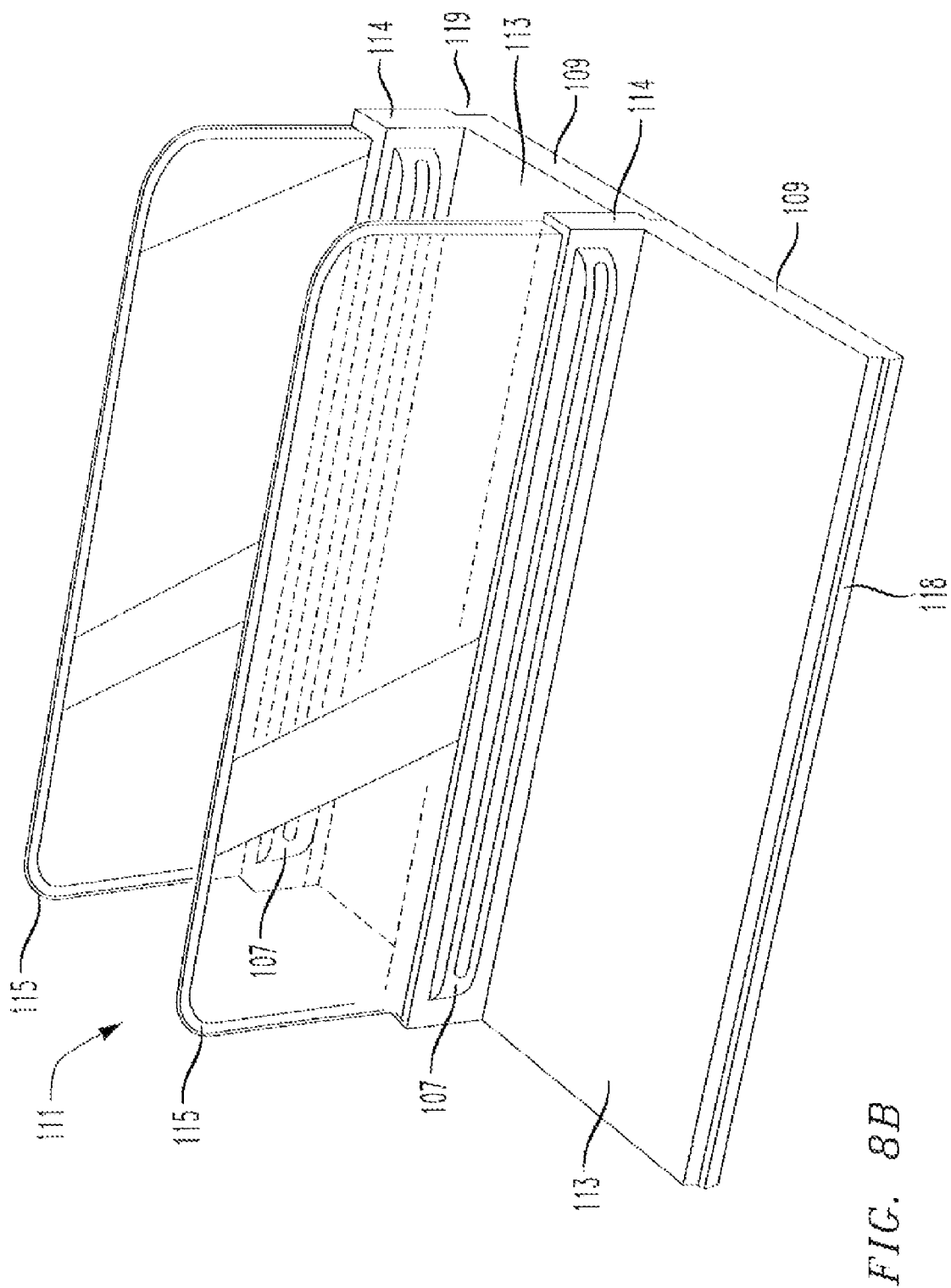
FIG. 8B illustrates a side view of two charge rail segments forming a single recharge stall according to an embodiment of the present disclosure.

FIG. 8B is a side view of two charge rail segments 109 forming a single recharge stall 111. Each charge rail segment 109 comprises a floor section 113, a charge rail wall 114, and optionally a stall wall 115, which may be transparent as shown in the Figures or may be non-transparent. Charge rails 107, 108 are disposed on either side of charge rail wall 114, as is shown more clearly in FIG. 6. In an embodiment, a plurality of charge rail segments 109 may attach together in an end-to-end fashion (as indicated by reference arrows 116) or in a side-to-side fashion (as indicated by reference arrows 117) to form the recharge stalls 111 and cart corral 110. As shown in FIG. 8B, the side edge 118 of the floor section 113 may be configured to mate or interlock with the side edge 119 of charge rail wall 114 of an adjacent charge rail segment 109. Likewise, front and rear edges 129, 130 of the floor section 113 may configured to mate or interlock with corresponding front and rear edges from adjacent charge rail segments 109.

In an embodiment, the charge rail system 106 further comprises a power supply 112 which may be mounted on a wall or other permanent fixture for providing power to the carts 10. The power supply 112 may be plugged in and operably connected to the charge rails 107 and 108. Likewise, the plurality of charge rail segments further comprise connections such that power is supplied to the entire cart corral grid via the connection of adjacent charge rail segments 109.

In operation, a cart 10 may be fed into a cart corral 110 by a consumer 85 or store employee placing it in a recharge stall 111. In an embodiment, the recharge stall 111 may be sized such that the charge rail segments 109 are spaced apart adequately (e.g., about equal to the rear wheel span of the cart 10) such that the cart 10 fits between the charge rail segments 109 securely enough for the battery charger contact plate 105 to come into contact with the charge rails 107 and 108, as shown in FIG. 7. Contact between a battery charger contact plates and charge rails 107 and 108 forms a flow path for electrical current between power source 112 and the battery 135 such that the battery is charged. Rechargeable batteries are well known in the art, as are methods of charging such rechargeable batteries from a power source. In an embodiment, a first contact plate 105 and a first charge rail (e.g., 107 or 108) form a positive terminal of the electrical connection and a second contact plate 105 and a second charge rail (e.g., 107 or 108) form a negative terminal of the electrical connection. While dual contact plates and charge rails are shown, the charge rail system may be configured to operate using a single contact plate 105 on the cart and/or a single charge rail 107 or 108.

In an embodiment, each charge rail 107 or 108 may be spring loaded, each battery charger contact plate 105 may be spring loaded, or both may be spring loaded. In an embodiment shown in FIG. 7, the charge rail 107 further comprises a spring 140 biasing a rail plate 141 outward for contact with the battery charger contact plate 105 located on the cart. The rail plate 141 may be surrounded by rail guard 142. The rail guard 142 may be configured to allow contact between the contract plate 105 and the rail plate 141 while preventing unwanted contact with rail plate 141 which might lead to electrical shock. In an embodiment shown in FIG. 7, the rail guard 142 has a concave shape with the rail plate 141 extending outward a portion of depth of the concave cavity, but not beyond the outer edges 144 of the rail guard 142. The contact plate 105 may have a corresponding convex shape, thereby allowing contact between the contact plate 105 and the rail plate 141. When a cart 10 is fed into a recharge stall 111, the cooperative shapes and spring loaded nature of the battery charger contact plate 105 and/or the charge rail 107 or 108 cause them to be in contact with each other, creating an electrical conductor between the battery 135 and the power source 112. While FIG. 7 is shown with a single charge rail 108 (for example, for use as an end rail assembly for attachment on end 118 of FIG. 8B to form a complete stall 111), it should be understood that typically two charge rails 107 and 108 will be used in a back-to-back or mirror configuration, as is shown in FIG. 6. The components of the two charge rails 107 and 108 will be similar to the components shown in FIG. 7 for charge rail 108.

In an embodiment, the plurality of charge rail segments 109 are further configured to form a cart corral 110 such that a plurality of carts may be nested and stored therein, and each of the plurality of carts may be charged at the same time by the contact between each battery charge contact plate 105 of each cart with the charge rails 107 and 108. For example, some or all of the carts in a store may be placed in the recharge stalls 111 of the cart corral 110 during off-hours or hours when the store is closed in order for the battery 135 of each cart 10 to be recharged for the next day or busy period of time.

In alternative embodiments, the contact plates 105 may be positioned at other locations on the cart 10 and the charge rail system 106 may be modified accordingly to provide contact with such plates as described previously. In an embodiment, contact plates 230, 231 are positioned adjacent to and/or integral with ECM 200 as shown in FIGS. 6 and 12, which may be advantageous in simplifying and shortening the flow path between the charge plates and the battery 135, especially when the battery 135 in integrated in ECM 200. Contact plates 230, 231 would typically be used in lieu of contact plates 105, as shown in FIG. 12, provided however that dual sets of contact plates 105 and 230, 231 could be used if desired as shown in FIG. 6. The location of charge rails 107 and 108 would be modified, for example raised and/or extended, to engage with contact plates 230, 231 positioned adjacent to and/or integral with ECM 200. Likewise, the contact plates 230, 231 could be mounted in a position extending outward from the ECM 200 as needed to facilitate engagement with the charge rails 107 and 108. For example, contact plates 230, 231 may be mounted on protruding or bulbous ECM 200 side plates 235, as shown in FIG. 12.

Figure 8C:
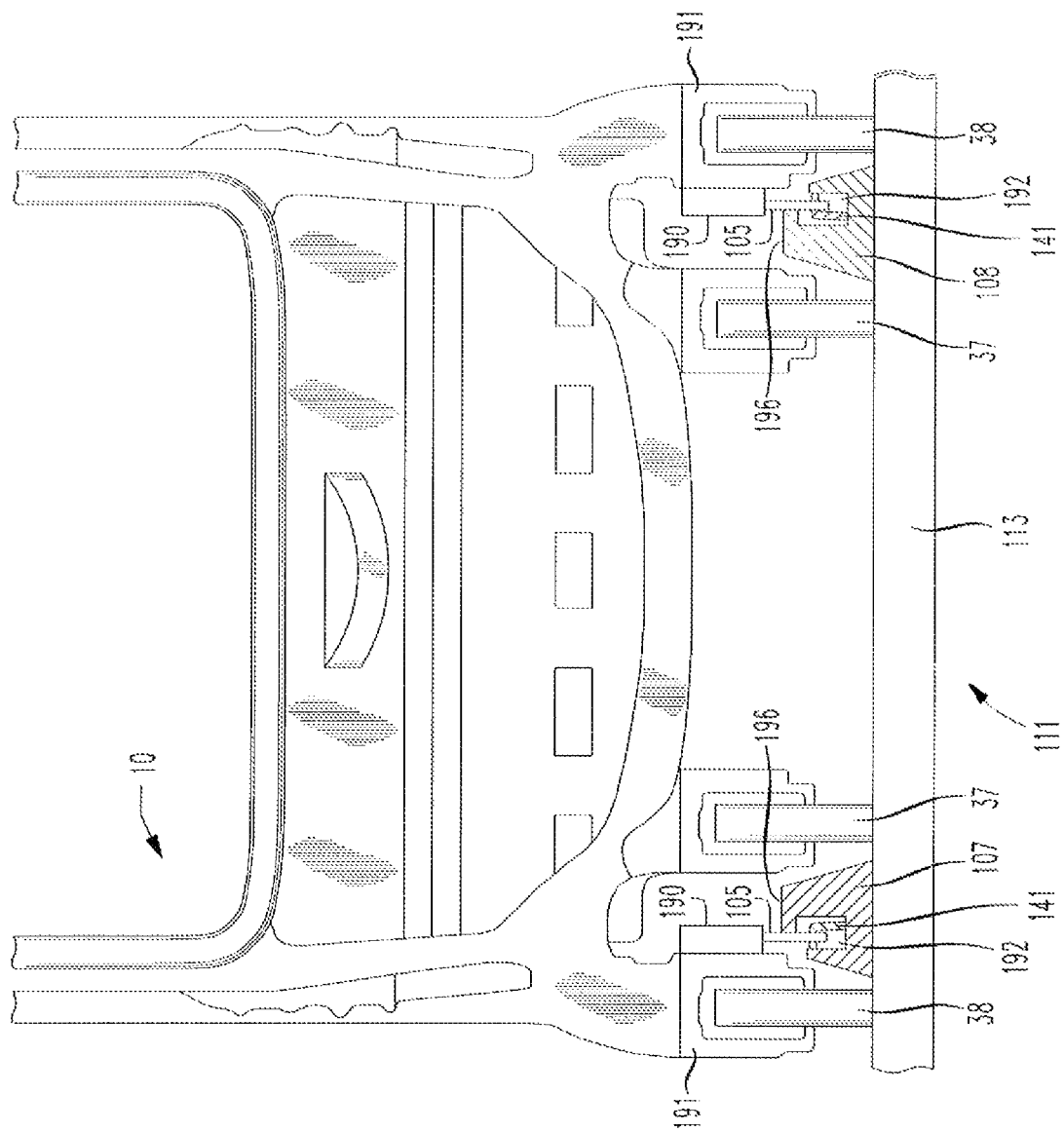
FIG. 8C illustrates a front view of a media enabled shopping cart recharging in a recharge corral according to an alternative embodiment of the present disclosure.
Figure 8D:
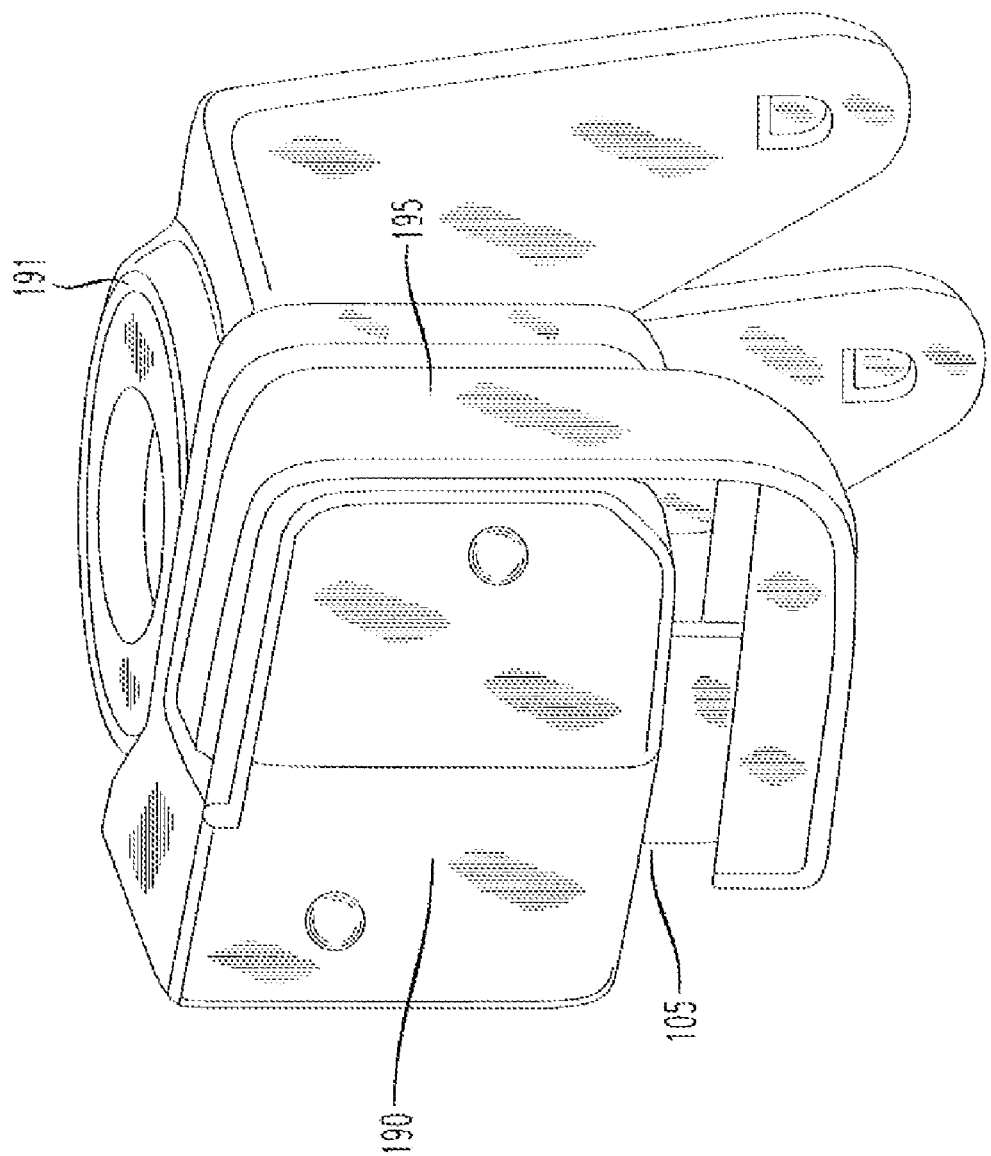

An alternative charge rail configuration is shown in FIGS. 8C-E. The recharge stall embodiment shown in FIGS. 8C-E may likewise be modular in nature as described herein. FIG. 8C is a partial front view of cart 10 recharging in a recharge stall 111. A charging module 190 is mounted to the wheel yoke 191 of rear wheels 138, for example via one or more bolts or other connectors. In an alternative embodiment, the charging module 190 may be mounted to the frame 30 or the underside of base tray 50. Preferably, the charging module 190 is mounted inboard of the rear wheels 38 and outboard of the front wheels 37, and more preferably on the interior side of rear wheel yoke 191. A battery charger contact plate 105 extends downward from the charging module 190. The battery charger contact plate 105 may be spring loaded to aid in contacting the contact plate with a charge rail.

Charge rails 107 and 108 extend upward from the floor section 113 of recharge stall 111. As shown in FIG. 8C, when a cart 10 is positioned in a recharge stall 111, the charge rails 107, 108 are positioned inboard of the rear wheels 38 and outboard of the front wheels 37 and serve to guide the cart into the proper position for recharging. While positioned in recharge stall 111, the battery charger contact plates 111 enter slots 192 on charge rails 107, 108 and make contact with rail plate 141 such that electricity may pass from the recharge stall 111 and charge battery 135. Rail plate 141 may be spring loaded in addition to or in lieu of spring-loading the battery charger contact plate 105 to aid in contact there between. The slots 192 in charge rails 107, 108 may be fully or partially covered by a flexible material such as plastic or a nylon brush to prevent debris from entering the slots 192. Such flexible material may be pushed aside by the battery charge plate 105 as it enters the slots 192.

As shown in FIGS. 8D and 8E, the charging module 190 may further comprise a contact plate cover 195. As shown in FIG. 8D, when the cart is not in a charge stall 111, the contact plate cover 195 extends downward to cover and protect the battery charge plate 105. As shown in FIGS. 8D and 8E, the contact plate cover 195 may comprise a generally U-shaped member having a gap or protective arm extending there from for receipt of the battery charge plate 105 in a closed position. The contact plate cover 195 may be biased in a closed position, for example with a spring. When a cart is positioned inside a recharge stall 111, the contact plate cover 195 is pushed upward via contact with an upper portion 196 of charge rails 107, 108, thereby placing the contact plate cover 195 in an open position as is shown in FIG. 8E.

In still further embodiments, the charge rail system 106 is operable to accept a cart 10 in both directions, and fully charge the cart 10. That is, the charge rail system 106 allows for DC charging voltages to be accepted in either direction (positive to ground or ground to positive). A Power Management Unit (referred to herein as the "PMU") of the charge rail system 106 senses the presence of a cart 10 on the charge rails 107 and 108. Upon DC power contact, the PMU determines battery 135 capacity from previous battery readings prior to charging. The PMU may then initiate LED status indicators on the charging device (here, a cart 10) to indicate a level of charge and when charging has commenced.

In an embodiment, the PMU comprises a PIC processor in the charging unit and firmware. The PIC processor of the PMU communicates with the processor in the ECM 220 on the cart 10. The PMU monitors the communication control between the host cart ECM 200 and the PMU communication interface. If loss of communication occurs, default protocols may be executed. For example, the charge rails of the host system (i.e., cart) are shut down and reset or power to the system (e.g., cart) may be otherwise cycled, thereby preventing lockup conditions with the host ECM 200 and other subassemblies.

The PMU calculates the appropriate charging algorithm to charge the battery 135. In various embodiments, the calculation of the appropriate charging algorithm may be based upon voltage and/or temperature calculations. In various embodiments, the PMU uses measurement averaging routines to determine the charge routines, such as trickle charge, full charge, or over/low voltage fault conditions. Averaging helps to mitigate the effects of contact chatter when the device being charged (i.e., the cart 10) traverses the charge rails 107 and 108 (i.e., impedance fluctuations and the like). In an embodiment, the PMU imposes a delay (e.g., 5 or 10 seconds) from first contact to allow time for the cart to become fully nested and stop moving prior to commencing charging.

Additionally, the PMU senses error conditions for voltage levels or if the PMU loses communication with the host (i.e. the cart ECM 200), then the PMU initiates a self-reset to recover and reestablish communication with the cart 10. Error conditions may include for example too low a voltage, or a very high voltage. Either case could indicate a bad cell in the battery 135, which would indicate that the battery 135 should not be charged with full charge. Error conditions are set in the PMU.

To prevent deep battery discharge of the cart 10, the PMU in still further embodiments, senses voltage level of the cart 10 and calculates remaining charge capacity. If the capacity approaches a predetermined threshold (such as 20% of remaining capacity, or in an illustrative system 11 volts), a warning message is issued via the communications port for system action. If the low voltage condition persists after a predetermined period of time, the PMU may automatically shut down the entire system, thereby preserving the PMU power needed for subsequent operation (i.e. reboot) and allowing the device (i.e., cart 10) to be charged without replacing the battery 135.

In additional power management features, the PMU may be operable to shut down certain functions of the device to conserve system power during charging. For example, while the cart 10 is within the corral 110, the LCD is not needed, the RFID is not needed, and the like, while the wireless connection is still needed. By shutting off cart features that consume significant amounts of power while charging, faster charging is enabled.

Figure 10:
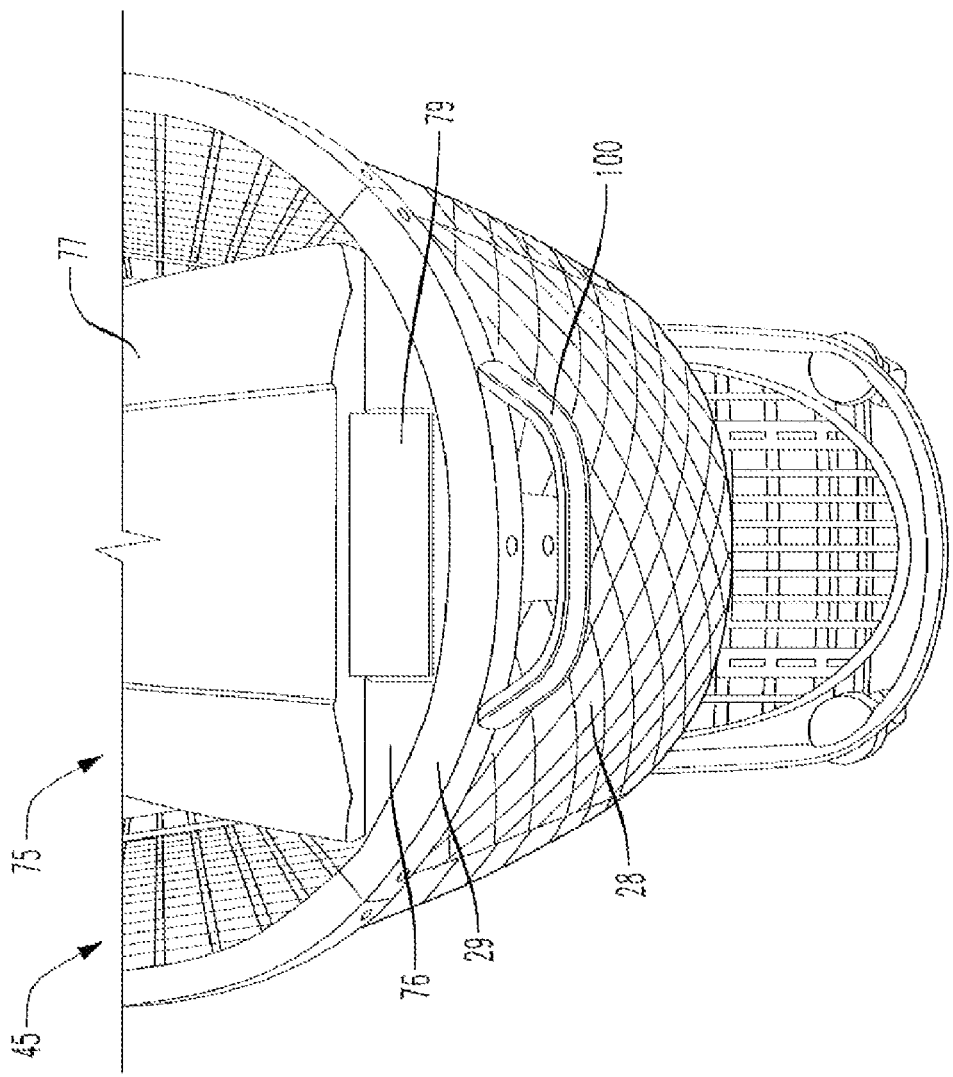
FIG. 10 shows a detailed view of a video display of a media enabled shopping cart according to an embodiment of the present disclosure.

As shown in the Figures, a video display 75 is attached or mounted (referred to collectively hereinafter as attached) to the basket 20 of the shopping cart 10. Attachment of the video display 75 to the basket 20 is in contrast to attachment of the video display 75 to the handle 22. In other words, the video display 75 is not attached or mounted to the handle 22. As shown in FIG. 10, the video display 75 may comprise a base 76 and a screen 77 having a viewable area 78. In an embodiment, the video display 75 is attached to the basket 20 such that the viewable area 78 is above the interior 54 of the basket as previously defined. Unless otherwise specified, attaching the video display 75 such that the viewable area is above the interior 54 of the cart includes, in various alternative embodiments, having the viewable area 78 entirely above the interior 54; having the viewable area 78 substantially above the interior 54; or having greater than 50, 60, 70, 75, 80, 85, 90, 95, or 99 percent of the viewable area 78 above the interior 54.

Figure 9:
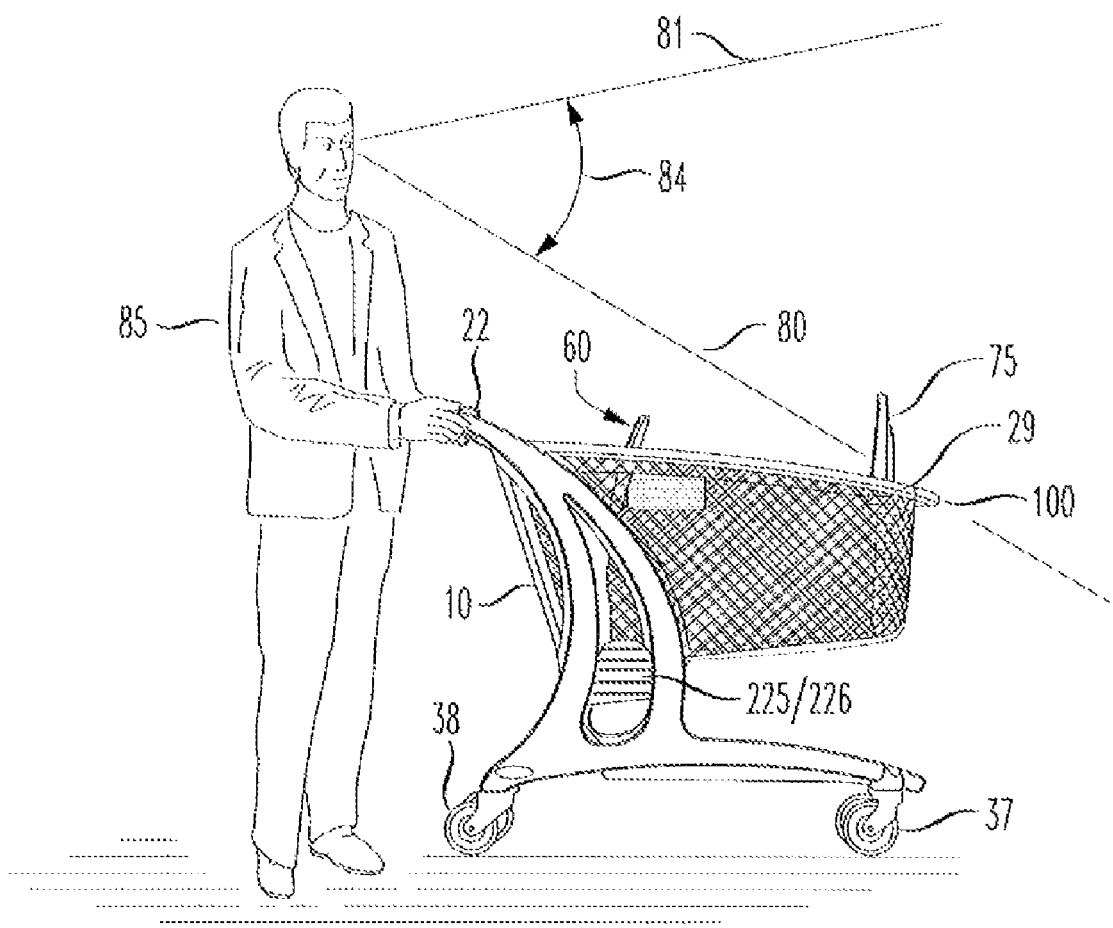
FIG. 9 is an exemplary view, defining a field of vision of a consumer using a media enabled shopping cart according to an embodiment of the present disclosure.

In another embodiment, the video display 75 is attached to the basket 20 such that the viewable area 78 is in a field of vision 84 of a consumer 85 pushing the cart 10 via the handle 22. Referring to FIG. 9, field of vision 84 refers to the area having a lower boundary 80 defined by an unobstructed line of sight from the eyes of consumer 85 to the an upper edge of the basket (e.g., front edge 29) and an upper boundary 81 defined by a line of sight from the eyes of the consumer 85 to an upper periphery of the consumer's vision. Unless otherwise specified, attaching the video display such that the viewable area is in consumer's field of vision 84 includes, in various alternative embodiments, having the viewable area 78 entirely in the field of vision 84; having the viewable area 78 substantially in the field of vision 84; or having greater than 50, 60, 70, 75, 80, 85, 90, 95, or 99 percent of the viewable area 78 in the field of vision 84. The field of vision 84 may vary based upon the height of the consumer 85, and in an embodiment the shopping cart 10 is configured and the video display 75 is attached to the basket 20 such that the viewable area 78 is in a field of vision 84 of a consumer 85 having a height of equal to or greater than 5 feet and 0 inches. The field of vision 84 may also vary based upon the position of the child seat 60 or the presence of a child seated therein, and in an embodiment the shopping cart 10 is configured and the video display 75 is attached to the basket 20 such that the viewable area 78 is in a field of vision 84 of a consumer 85 having a height of equal to or greater than 5 feet and 0 inches when the child seat 60 is empty and folded in a closed position. The field of vision 84 may also vary based upon the position of products in the basket, and in an embodiment the shopping cart 10 is configured and the video display 75 is attached to the basket 20 such that the viewable area 78 is in a field of vision 84 of a consumer 85 having placed products in the basket, wherein said products do not extend outside or above the interior 54 of the basket as previously defined.

In another embodiment, the video display 75 is attached to an upper edge 26 or 27, or front edge 29 of the basket 20. For example, the base 76 of the video display 75 may be attached to an upper edge 26 or 27, or front edge 29 of the basket 20. Various attachment devices and means for attaching as described herein may be used with the video display. In an embodiment, the base 76 of the video display may be attached to an upper edge 26 or 27, or front edge 29 of the basket 20 such that the viewable area 78 is above the interior 54 of the basket as discussed previously. In an embodiment, the base 76 of the video display may be attached to an upper edge 26 or 27, or front edge 29 of the basket 20 such that the viewable area 78 is in a field of vision 84 of a consumer 85 pushing the cart 10 via the handle 22 as discussed previously.

In another embodiment, the base 76 of the video display may be attached to walls 23 or 24, front side wall 28, and rear side wall 31 on the interior or the exterior of the basket 20. In an embodiment, the base 76 of the video display may be attached to a wall 23 or 24, front side wall 28, and rear side wall 31 on the interior or the exterior of the basket 20 such that the viewable area 78 is above the interior 54 of the basket as discussed previously. In an embodiment, the base 76 of the video display may be attached to a wall 23 or 24, front side wall 28, and rear side wall 31 on the interior or the exterior of the basket 20 such that the viewable area 78 is in a field of vision 84 of a consumer 85 pushing the cart 10 via the handle 22 as discussed previously.

Figure 11:
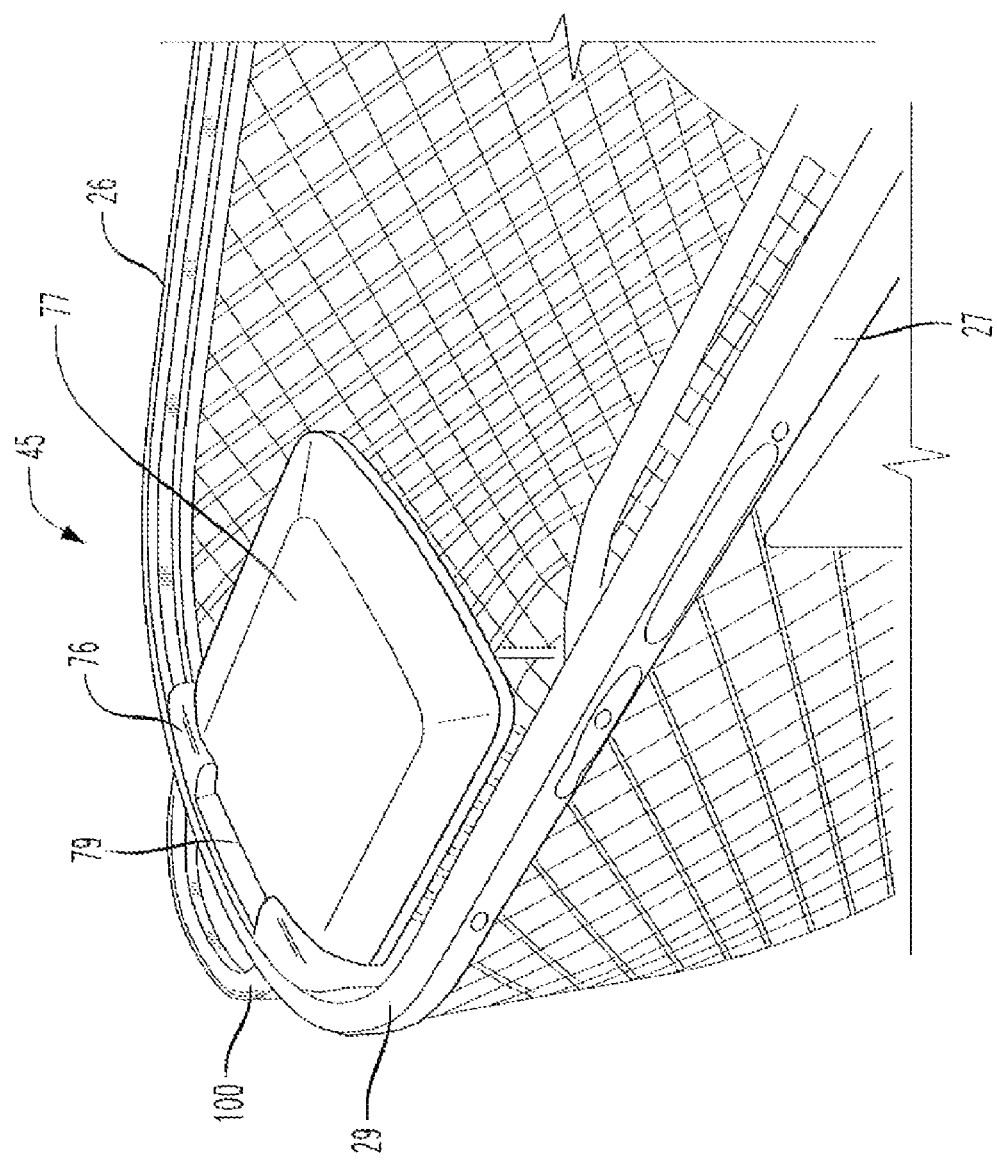
FIG. 11 illustrates the nose of the media enabled shopping cart with a folding video display according to an embodiment of the present disclosure.

In another embodiment, the video display 75 is attached to the nose 45 of the cart 10. The nose of the cart 45 is a well known area to those skilled in the art. In various embodiments, nose of the cart 45 refers to the frontward most ⅓ of the basket 20, alternatively the frontward most ¼ of the basket, alternatively the frontward most ⅕ of the basket, alternatively the frontward most ¹⁄₁₀ of the basket, alternatively the front wall 28, alternatively front edge 29. In an embodiment, the nose of the cart is shown in FIG. 10 or FIG. 11. In various embodiments, the video display may be attached to the nose of the cart via a wall or an upper edge as described previously and the viewable area 78 may be above the interior 54 of the basket and/or in a field of vision 84 of a consumer 85 as described previously. In an embodiment, the base 77 of the video display 75 is shaped to conform to or about match the contour or shape of the nose 45 of the cart 10, as is shown in FIGS. 10 and 11.

The video display 75 may be any suitable electronic display for receiving and displaying visual images to the consumer 85. The visual images may be transmitted to the video display 75 by any suitable means known in the art such as via a wireless transmission. In an embodiment, the video display 75 is of a type commonly referred to as a flat screen display, for example an LCD. The video display 75 may be powered by a rechargeable battery 135 attached to the cart 10 and operatively coupled to the video display 75.

In another embodiment, the video display 75 is attached to the basket 20 and is foldable or retractable for storage. For example, the video display 75 may fold or retract into the interior 54 of the basket 20 for storage when the cart 10 is not in use. In an embodiment, the video display 75 is configured to fold or retract such that a plurality of carts 10 may be nested for storage as shown in FIG. 12 without damaging the video display 75. For clarity, the outer cart in FIG. 12 is shown without rear side wall 31, with the understanding that rear side wall 31 would typically be present in carts used by a consumer 85.

In an embodiment, the base 76 of video display 75 forms a housing in which screen 77 may retract. Such housing receives screen 77 in a retracted position and protects the screen 77 from damage. The screen 77 may be retracted into such a base housing (comprising a front base housing 96 and a rear base housing 97) by known means such as rails, slides, rollers, telescoping members, and the like, which may be further biased, for example by springs, as needed. The screen 77 may be retracted to a closed position by pushing on the top 71 of screen 77 where the screen 77 is biased up, or by releasing a latch or lock where the screen 77 is biased in a retracted position. In an embodiment, the screen 77 is folded down by contact with another cart when nested therewith as shown in FIG. 12 and is biased up such that the screen flips up upon unnesting of the carts.

In another embodiment as shown in FIG. 13, the video display 75 comprises a hinge 79 between the base 76 and the screen 77, which allows the screen 77 to fold downward toward the interior 54 of the basket 20 into a folded position as shown in FIGS. 10 and 11. In an embodiment, the screen 77 folds at about a 90 degree angle with respect to the base 76 (or alternatively folds such that the screen 77 is about within the plane defining the upper edges of the cart), which clears the nose 45 and exterior of the cart for nesting with a second cart while also keeping the interior of the cart 10 clear such that the rear side wall 31 may swing upward into the interior 54 of the basket 20 to receive the front side wall 28 of a third cart.

Figure 14:
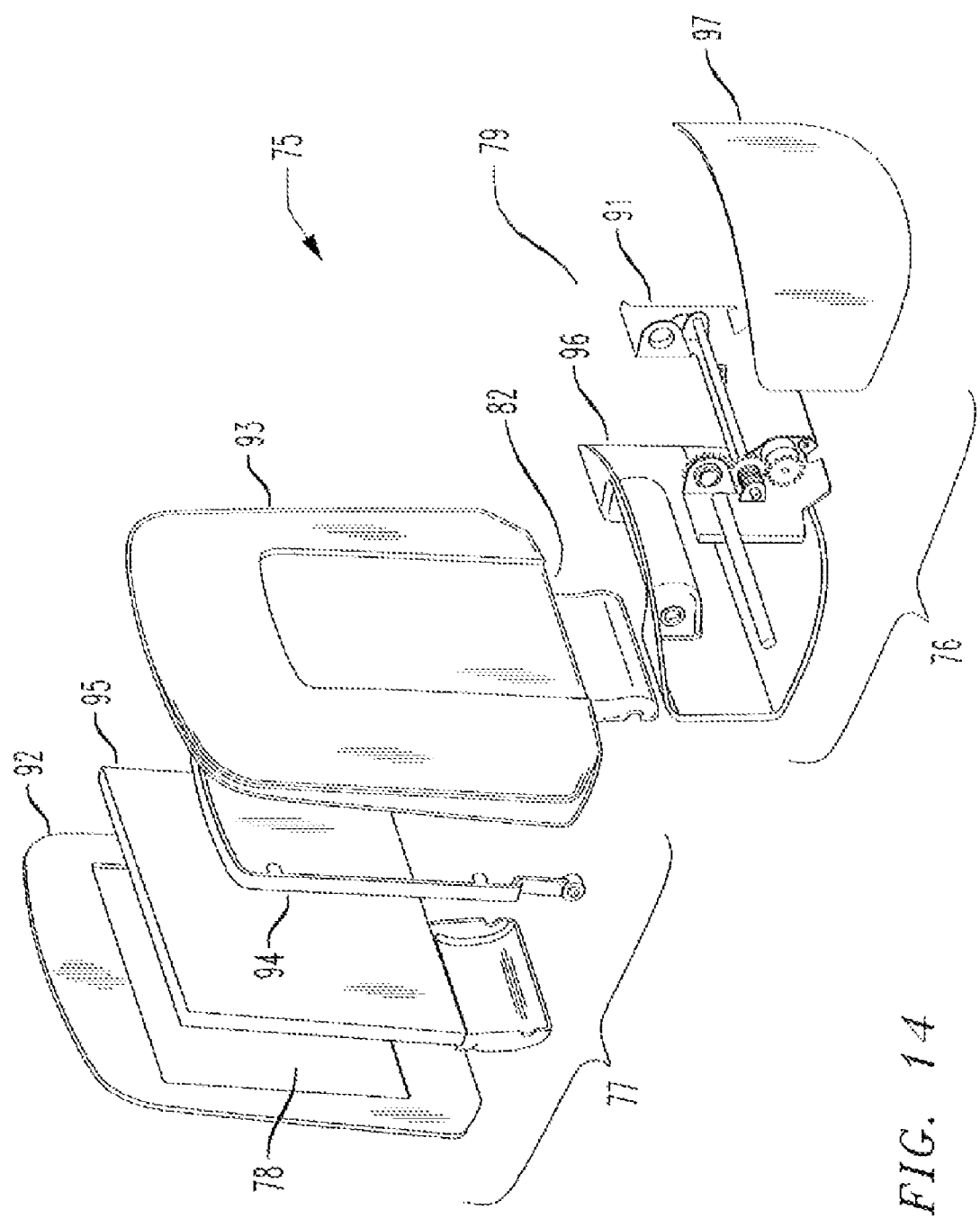
FIG. 14 illustrates an exploded view of the video display components according to an embodiment of the present disclosure.

With reference to FIG. 14, the screen 77 of video display 75 may further comprise a shock absorber 94 protecting an electronic display 95 such as an LCD screen, each of which are disposed between front and rear screen housings 92, 93. The base 76 of video display 75 may further comprise a hinge 79 disposed between front and rear base housings 96, 97. The hinge 79 may further comprise a gear assembly 91 comprising gears, springs, dampeners, or combinations thereof for biasing the hinge in a folded or unfolded position. The gear assembly 91 may be used to control the force required to fold the screen 77 into a folded position, as shown in FIGS. 10 and 11, in response to a force applied to a rear screen housing 93 of the video display 75. Likewise, the gears assembly 91 may be used to control the speed with which the screen 77 unfolds into an unfolded position such as shown in FIGS. 1-3. In an embodiment, the screen 77 unfolds in a slow, controlled manner to avoid damaging the screen 77. In an embodiment, the unfolding of the screen is dampened via dampeners in the hinge 79 and/or gear assembly 91.

In another embodiment, the video display 75 is attached to the basket 20 and may be swiveled such that the viewable area 78 may be viewed from various locations relative to the cart 10. A swivel may be positioned between the base 76 and the screen 77 such that the screen 77 may rotate or swivel about the base. The swivel may be integrated with the hinge 79, or alternatively may be a separate component, for example positioned between the hinge 79 and the screen 77. In embodiments where the video display is mounted on a side edge 26, 27, the video display 75 may further comprise a swivel such that the viewable area 78 may rotated to face rearward toward the consumer 85 while the consumer 85 is pushing the cart using handle 22. Alternatively, in embodiments where the video display 75 is mounted on the nose 45 of the cart, the video display 75 may swivel such that the consumer 85 may see the viewable area 78 from locations other than at the rear of the cart. For example, a consumer 85 may wish to swivel a nose-mounted screen 77 sideways such that the viewable area 78 is readily viewable while standing at the side or front of the cart 10. In an embodiment, the video display 75 may swivel about 180 degrees such that the viewable area 78 faces forward rather than facing rearward toward a consumer 85 pushing the cart 10 via handle 22. From a forward facing position, the video display 75 may further fold into a folded position such that the screen 77 is on the exterior of the basket 20 in a folded position, wherein the viewable area 78 is protected via mating with the base 76.

In another embodiment, the video display 75 is attached to the basket 20 and may be heated such that the screen 77 is readily operable in cold environments. For example, the video display of FIG. 9 may further comprise a heating element, which may be positioned internal or external to the screen housing 92, 93. Alternatively, the base housing 96 and 97, as described previously, may be heated such that the screen 77 is kept warm while in a retracted position. Any suitable heating element that is compatible with the screen components and operation thereof may be used, for example a resistive electrical heating element. The heating element may be powered during storage and/or charging of other components of the cart 10, for example during charging of the battery 135 for video display 75.

Figure 15:
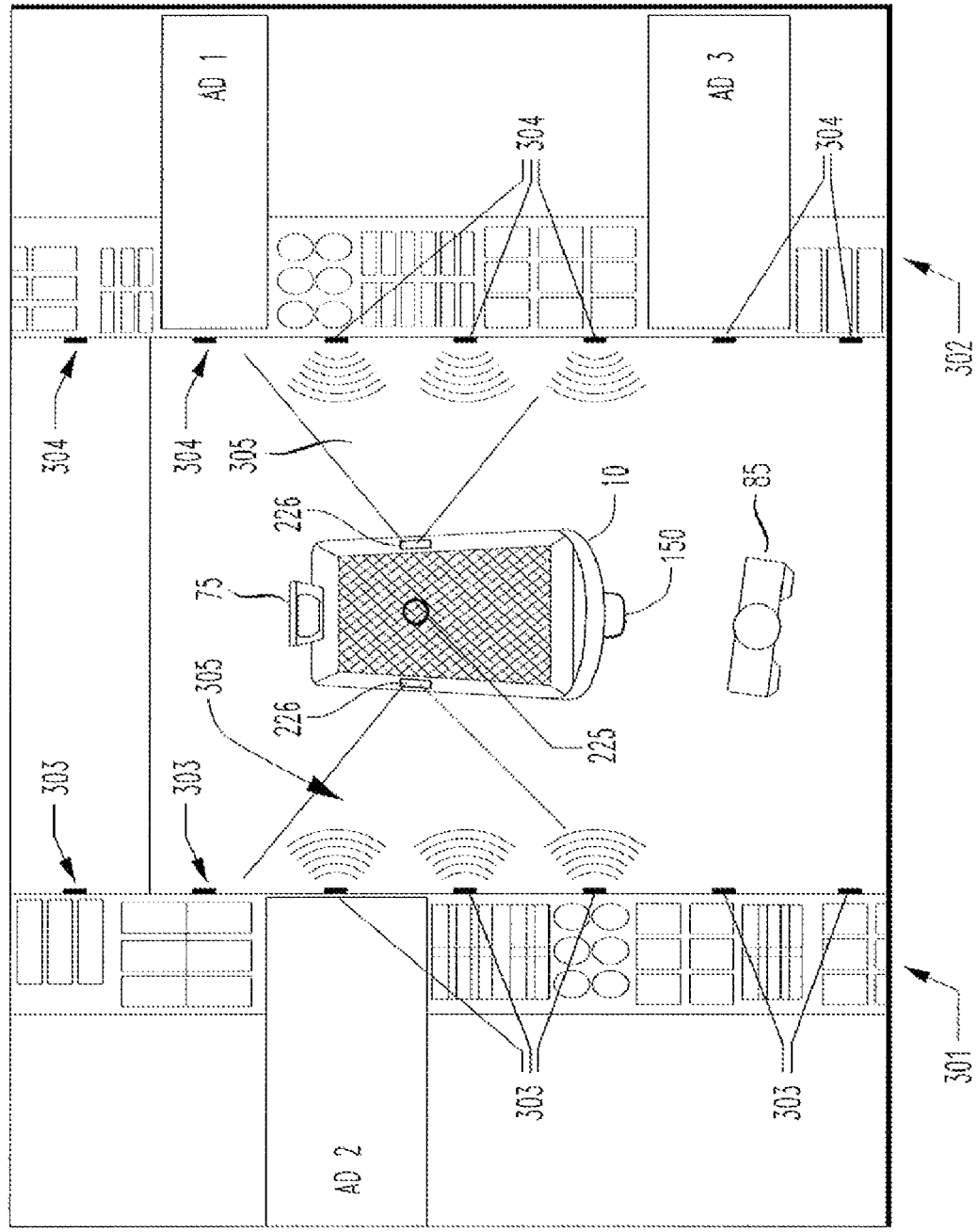
FIG. 15 is an overhead view of the media enabled shopping cart when reading one or more RFID tags affixed to objects for locating the cart in the store according to an embodiment of the present disclosure.

Referring to FIG. 15, in an embodiment, the cart 10 further comprises a read component comprising at least one aisle Radio Frequency Identification ("RFID") reader 225 with RFID antennas 226, in conjunction with the ECM 200 and software operating thereon. The read component performs a proximity scan of the cart 10 that reads the area surrounding the cart 10. The number and position of the antennas 226 may be selected as functionally needed, as would be apparent to one of skill in the art. The aisle RFID reader 225 and the antennas 226 may be an integrated component or may be separate components. In an embodiment, the aisle RFID reader 225 may be integrated with the ECM 200, for example located within housing 199. Alternatively, the aisle RFID reader 225 or may be located at other positions on the cart, for example integrated into the video display 75 or base/housing 76 or alternatively located on the underside of the cart 10, secured by means of attachment to, for example, the bottom 21 of the basket 20, or to the base tray 50. In an embodiment, the RFID antennas 226 are located on either side of the housing 199 of the ECM 200. Alternatively, the RFID antennas 226 may located at other positions on the cart, for example on side walls 23, 24; on edges 26, 27; on base side members 32, 33; on the sides of the video display 75; or any other position suitable for carrying out their intended function.

In an embodiment, the aisle RFID reader 225 and/or RFID antennas 226 may be integrated with the video display, for example one or both located on the side edges of the video display 75. In such a placement, the aisle RFID reader 225 and/or RFID antennas 226 are in a location to maximize the effectiveness of the reader distribution pattern and encompass RFID tags located at various heights and locations along the shelves, when the video display is not retracted and the cart 10 is not nested. Placement on the video display is advantageous as the RFID reader/antenna are positioned at approximately the middle of the shelf height, thereby allowing an about equidistant scan pattern above and below the position of the RFID reader/antenna to cover the complete height of the shelf.

Figure 20B:
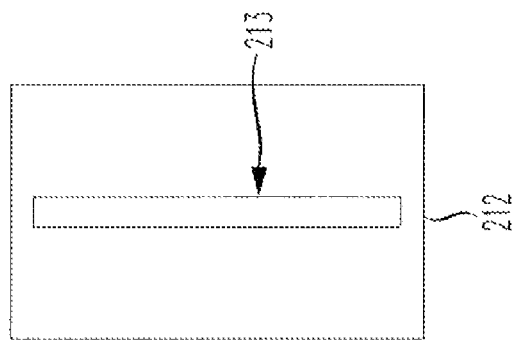
FIG. 20B is a front view of a slot shaped aperture for an RFID antenna.
Figure 20D:
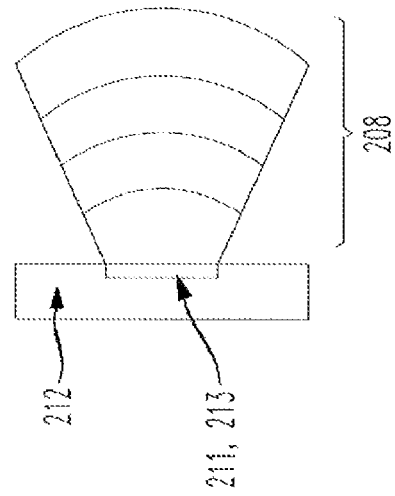
FIG. 20D is a side view of a radiation pattern emanated from the aperature of FIG. 20A or 20B.
Figure 20A:
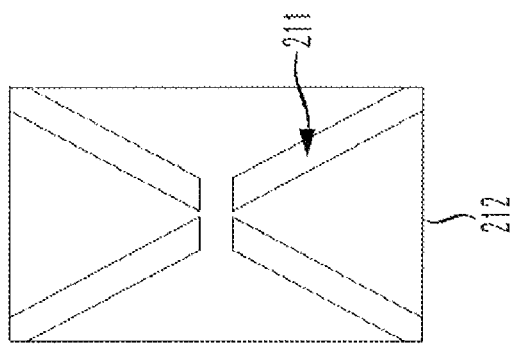
FIG. 20A is a front view of a bowtie shaped aperture for an RFID antenna.
Figure 20C:
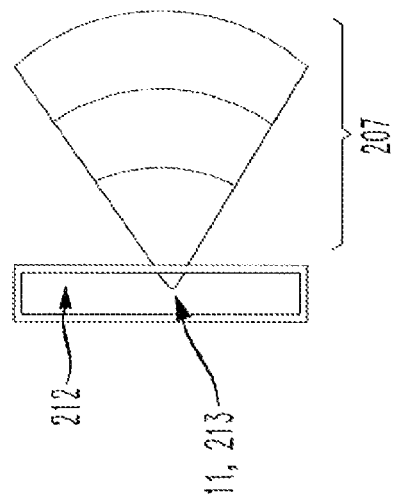
FIG. 20C is a top view of a radiation pattern emanated from the aperture of FIG. 20A or 20B.

In an embodiment, RFID antennas 226 are placed on the side edges of the video display 75. In some embodiments, patch antennas may be used for the RFID antennas 226. In alternative embodiments, the RFID antennas 226 comprise bowtie and/or slot antennas, which narrow the field of broadcast for the antenna and have a more focused radiative pattern. As illustrated for a bowtie-shaped aperture 211 of antenna 212 in FIG. 20A and for a slot-shaped aperture 213 of antenna 212 in FIG. 20B having an approximate radiative patterns 207 and 208 of FIGS. 20C and 20D, respectively. In an embodiment, a bowtie or slot antenna having a beam approximately eighteen (18) inches wide and approximately six (6) to eight (8) feet high is used for the RFID antennas 226, and are placed in vertical alignment parallel with the LCD video display (and/or at other suitable mounting locations on the cart) such that the radiative pattern of the antennas provides a narrow slice of broadcast in the direction perpendicular to each side of the cart for reading RFID tags located on the shelves or on items on the shelves on each side of an aisle. In an alternative embodiment, a bowtie or slot antenna having a radiative pattern of plus/minus 45 degrees (90 degrees total) in a vertical plane covering shelf height and plus/minus 15 to 22.5 degrees (30 to 45 degrees total) in a horizontal plane covering shelf width is positioned on each side of the cart, for example mounted on or integrated with the video display 75. The use of slot and/or bowtie antennas provides a more focused field of view for the RFID reader to acquire specific tags, and thus may assist in eliminating unwanted interference, echos, reflections, and the like. Thus, the more focused field of view may also aid in more accurately determining position/location of the cart, and in particular in combination with other positioning/locating techniques described herein.

Various means for attaching and attachment devices may be used as described herein. In an embodiment, the aisle RFID reader 225 with RFID antennas 226 may comprise a standard or customized RFID configuration commercially available from for example ThingMagic, Alien Technology™ or an improvement or equivalent thereof. The aisle RFID reader 225 and RFID antennas function to read a plurality of active or passive RFID tags positioned throughout a retail establishment (e.g., along shelves), as will be discussed in more detail. In an embodiment, the cart 10 is a plastic cart as described herein which lessens or eliminates interference associated with the aisle RFID reader 225 and RFID antennas 226. In an embodiment, the cart 10 is a traditional cart comprising metal, plastic, or a combination of metal and plastic, retrofitted with the aisle RFID reader 225 and RFID antennas 226 and other media enhancements.

In or about a store, a consumer 85 may select a cart 10 from the cart corral 110 upon entering the store. The motion sensor(s) 36 detect that the cart 10 is moving when the consumer 85 begins to push the cart 10, and will activate the ECM 200, video display 75, and the aisle RFID reader 225. As previously noted, various components of the cart 10 may be hibernated or re-activated based on motion by the cart to preserve power. In an embodiment, the video display 75 may initially show the consumer 85 a welcome display that includes information about the store, explains the media enhancements to the cart 10, and/or announces in-store promotions. As shown in FIG. 15, as the consumer 85 pushes the cart 10 through the store, such as between two shelves 301 and 302, a plurality of RFID tags 303 and 304 (which may be active or passive RFID tags) located on or near the shelves 301 and 302 respectively, will communicate with the aisle reader 225 via the antennas 226.

In an embodiment, the RFID tags 303 and 304 may be distributed and affixed to objects throughout the store premises. For example, RFID tags 303 and 304 may be attached (i) at a shelf or fixture level, which refers to placement of tags at about regularly spaced intervals along a shelf or other product display areas such as kiosks, pillars, freezers, refrigeration units, walls, bins, and counters; (ii) at a SKU level, which refers to placement and/or incorporation of the tags with or near the standard SKU label, with a given product typically having one corresponding SKU tag positioned on the shelf adjacent the product; (iii) at a product level, which refers to having a tag on each individual product or package of products, or (iv) combinations thereof. The aisle reader 225, operably connected to the ECM 200, will convey a signal comprising informational data to the ECM 200, causing the video display 75 to present location-based content to the screen 77. The RFID enablement of the cart permits advertisers and retail stores to interact with the consumer 85 as she navigates the store.

The location-based content is determined as follows. In an embodiment, the aisle reader 225 with antennas 226 reads any RFID tag 303 or 304 that comes within a cone-shaped pattern defining an electromagnetic zone 305 (of the aisle RFID reader 225) on either side of the cart 10. As noted previously, the shape of the electromagnetic zone or radiative pattern may be adjusted based upon the type and positioning of the RFID components on the cart, for example use of bowtie and/or slot antennas. The shape of the electromagnetic zone 305 read by the aisle RFID reader 225 may be another shape, other than a cone, according to the particular aisle RFID reader 225 employed, and the range (i.e. proximity within which tags may be read by the reader) is likewise determined by the particular aisle RFID reader 225 and antenna 226 array employed.

When an RFID tag 303 or 304 passes through the electromagnetic zone 305, the tag is activated and communicates with the aisle RFID reader 225 according to known RFID techniques. A locationing component (which in an embodiment comprises the aisle RFID reader 225, in conjunction with the ECM 200 and software operating thereon) determines the location of the cart 10 in the store by processing signals from any number of RFID tags 303 or 304 that are within range of the aisle RFID reader 225. The location of the cart 10 relative to specific RFID tags 303 or 304 is determined according to well known RFID positioning techniques. In an embodiment, location may be determined based on the strength of the signals coming from the RFID tags 303 and 304 (i.e. highest number of scans read by the aisle RFID reader 225 indicates which tag or tags 303 and 304 are closest).

In an embodiment, the process of locating the cart 10 begins by creating an electronic representation of the store configuration including fixtures, aisles, and other relevant data using the location of a number of reference or anchor RFID tags (e.g., shelf or fixture level tags) placed around the store in known locations. This electronic representation provides a base map of the store. The base store map may be built using the cart 10 by placing the anchor RFID tags in the known locations around the store, taking the cart 10 through various routes throughout the store to read each of the anchor RFID tags, and correlating the read data with the known data. The base store map is materialized as either database entries or an xml document generated from the correlated data. The base store map provides reference data for determining the location of other goods or items in the store. As fixtures, items, and/or anchor tags are moved within the store, the base store map may be updated by taking the cart 10 through the store again to obtain fresh data and correlate it with the updated known anchor RFID locations.

Against the backdrop of the anchor RFID tags, a series of virtual locations are created and positioned within the defined framework of the store, i.e., the base store map. Each location, such as for example a shelf, freezer fixture, aisle, or produce bin, can then be defined as associated with one or more anchor RFID tags, which may be active or passive tags, as previously noted. Such known locations may be used to determine the location of the cart, for example using the RFID locator service software routine described below. Furthermore, the known locations may be correlated to specific products, for example via use of additional SKU level and/or product level RFID tags. For example, a given product such milk may be correlated to a specific refrigerator having a known location within the base store map. Via such correlation, the location of specific products can be provided relative to the known location of the cart within the store, and the consumer may be provided directions to such products.

In various embodiments, subcategories may be used for product positioning instead of positioning every single product with a location in the store. Using subcategories simplifies store deployment. Each product is tied to a subcategory, and each subcategory is in turn associated with a location in the store. Thus, milk may be assigned to dairy or milk may be a subcategory including all brands and varieties of milk (e.g., whole, skim, etc.).

As discussed herein, the aisle RFID reader 225 is located upon the cart with the RFID antennae 226 oriented facing outward from the cart. Given that the cart and associated RFID reader is mobile within the store whereas the RFID tags are typically stationary within the store, various RFID data along with other positioning information (for example, motion sensor data) may be gathered and analyzed using software algorithms, for example operating on ECM 200 or a remote location such as a store server and provided to the cart. The antennae configuration (position, orientation, type) is made known in inputs to the software processes involved in locating the cart in the store, as well as performing useful tasks such as shelf management for tasks including inventory, price changes, and the like. The RFID are evaluated using the known antenna orientation and configuration in order to determine cart orientation.

For instance, at a recurring interval, the aisle RFID reader 225 may perform an inventory by recording RFID information for products located on the shelves and correlating the recorded information with the store's system. The results of the inventory may then be analyzed and used in decisions regarding orders for additional products and product placement in the store.

In locating the cart (which may then be used for determining the placement of advertisements in the video display 75, store purposes, or data mining for external or internal uses), for each antenna, the RFID tags "in view," or located within the radiative pattern of the antenna 226, are evaluated. The evaluation process uses several pieces of information to determine the location of the cart within the store, and specifically within the electronic base store map defined above.

The RFID locater service software routine that encompasses these functions performs location inventory and store mapping that is used to determine what any given cart is doing within the store, and provides an added level of accuracy in addition to the RFID location determination. The intelligence involved in the RFID locater service intelligently links what is read by the aisle RFID reader 225 with information known about the store based on the base store map and the known locations of anchor RFID tags. In an embodiment, the anchor RFID tags may be located at regular intervals, such as every 2 feet along the shelves, or on each side of fixtures such as produce bins, and the like. The RFID locater service additionally incorporates knowledge about RFID dead zones, such as foyers or the locations surrounding large metal fixtures that may interfere with RFID signals, so that locating the cart 10 is smooth and continuous regardless of where the cart is located in the store. For example, metal refrigerators tend to generate a lot of reflections such that RFID readings in the vicinity of a refrigerator are full of noise. The RFID locater service can account for known reflections in such an area, and adjust what the RFID reader 225 reads in such an area.

In an embodiment, location is determined via a scan to determine what products and items are in proximity to the cart (i.e., an inventory of tags read by the scanner) and correlating same to the cart's determined position to check the accuracy of the determined position and correct same as needed. The ECM 200 issues a read command to the aisle RFID reader 225. The locator software process then evaluates the read RFID tags (e.g., SKU and/or product level tags) to eliminate tags generating spurious reads, i.e., those included in the read that are not RFID tags associated with a location as established via the anchor RFID tags (e.g., shelf level tags). The remaining tags are then converted to locations indicated in the map. All of the locations (e.g., all RFID tag data) may then be evaluated to determine the cart location and orientation relative to the locations defined in the base store map. Such RFID data may be further correlated with other locationing means and data such as motion sensors such as the reed switch described herein. In this process, the software assumes and takes into account the anticipated read zone of the two antennae. If evaluated individually, each tag indicates the orientation of the cart. The overall orientation is determined by evaluating the orientation differential of each tag location from the orientation indicated by the complete location inventory. The "outlying" locations providing an orientation that is substantially out of correlation in comparison with the others within the inventory are removed, given that they represent spurious locations derived from spurious tag reads.

In some cases, RFID reads during inventory will be non-deterministic. Inconsistencies in the RF environmental (e.g., reflections, nulls, false reads, signal collisions, etc.), physical obstructions, technology failure and other factors may cause unpredictable inventory responses. Spurious reads are defined as those that are inconsistent with the results expected for the cart in a given position and orientation. For example, one spurious read would occur for a tag that shows up in the inventory that is outside the maximum expected read range of the aisle RFID reader 225. Furthermore, transient reads are defined as those that are consistent with the expected results for a given cart position and orientation, but that do not consistently appear in a set of inventory reports collected over an arbitrary period of time.

With the inventory of locations in the system, locations may then be evaluated to determine cart position as a relative x,y coordinate within store map. The system employs a location buffer to smooth out errors introduced by transient tag reads. The remaining locations are evaluated, and an average x,y position is calculated. The nearest location (among the inventory locations) to the calculated location is determined and the cart position is adjusted according to which location is nearest. This adjusted position is then compared to the map and further adjusted as necessary to position the cart accurately within the map. Such positions and data may be further compared to known/mapped routes or paths within the store to further assist in determining the location of the cart. For example, if may be know that a consumer will likely travel a certain path based upon the position within the store and same may be used to help track and position the cart as it traverses the anticipated path.

A number of rules may be applied in the evaluation of the inventory location to improve the accuracy of locating the cart, and therefore also the efficacy of the cart 10 as a shelf management tool. For example, a temporal rule may be applied such that recent tags reads are prioritized above older reads into determining cart position. Additionally, recent location reports may be used in determining if a particular tag represents a spurious read.

Similarly, a volume rule may be applied, such that a large volume of tag reads occurring during a given time frame are prioritized above smaller volumes of tag reads for determining cart position. For example, a RFID tag "seen" by the aisle RFID reader 225 twenty times during the last second is prioritized above a RFID tag "seen" only one time during the last second. Likewise, a proximity rule may be applied, wherein RFID tags in the inventory that are proximate to one another are prioritized above RFID tags in the inventory that are not proximate. In such a case, proximity is based upon the base store map and business rules.

In various embodiments, the accuracy of the determination of cart location is improved by the addition of the magnetic reed switch, discussed previously as an embodiment for the motion sensor(s) 36. The rotational speed of each wheel may be determined based on the "heartbeat" signal generated each time the magnet opens or closes the magnetic reed switch, preferably without physical contact thereof, when the wheel turns. By placing a magnet and reed switch assembly on two wheels, such as, for example, on both back wheels, the ECM 200 may determine when the cart 10 is turning as an added factor in accurately determining the location and orientation of the cart 10. Specifically, when the cart 10 is turning, such as around a corner or to enter a next aisle in the store, the wheel to the inside of the turn will not rotate as much as the wheel to the outside of the turn, and by comparing the difference in rotational speed of each wheel, the ECM 200 locationing component may incorporate the knowledge that the cart 10 is turning a corner or turning around to supplement the locationing performed by the aisle RFID reader 225 and antenna 226.

In various embodiments, the locationing component further includes an integrated compass for additional optimization of locationing for the cart. In some embodiments, the integrated compass is a digital compass. The compass provides various functions, including enabling the provision of an enhanced path layout for precise data reporting of shopping events. Another function of the compass is to provide directionality or a heading for the cart 10 in a store map. For example, the directionality provided by the compass enables display of a direction icon in a store map to identifiable areas of the store. For example, the point of sale (i.e., check out) area of the store, restrooms, store exits, and store departments. Such directionality is relative to the present location of the cart based on the proximity scan as described herein.

In various embodiments, the accuracy of the determination of cart location is improved by the addition of an Automatic Gain Control ("AGC") module. The use of an AGC module to control the transmit power and/or antenna attenuation of the aisle RFID reader 225 provides still another means of improving the accurate determine of cart location and, therefore, product awareness. In operation, the AGC module, which may be implemented in a software routine and executed from the ECM 200, automatically controls each antenna 226. Specifically, the AGC may be used, as understood by one of ordinary skill in the art, to either increase the transmit power or adjust attenuation. By doing so, sensitivity to tags may be controlled so that tags that are "unexpectedly" read, in that they are not located within the expected radiation pattern of the antenna 226 and aisle RFID reader 225 yet still are read, may be avoided. For example, the cart 10 may be located on aisle 4, but unexpectedly is reading tags from adjacent aisles 3 and 5. Tags from the adjacent aisle are "unexpected" based on the presently determined cart location. To correct for the unexpected tags, the AGC adjusts the attenuation or power of the read signal, such that the tags from the adjacent aisles are no longer read. In another example, the cart 10 may be located on aisle 4, but is not reading all of the "expected" tags for aisle 4. In order to correct for the missing, but expected tags, the AGC adjusts the transmitted power until the expected tags, based on the cart's presently determined location, are read by the aisle RFID reader 225. The AGC module may particularly be useful for improving accuracy of cart location in areas with higher interference or when many carts are in close proximity. By adjusting transmit power and/or attenuation (i.e., providing automated, real-time, dynamic power control from the RFID reader/antennae), the AGC module provides the additional advantage of conserving power by adjusting the power such that an appropriate and efficient amount of power is used in reading the RFID tags.

In testing, it has become clear that as there are more RFID tags broadcasting, it becomes more and more complex to discern whether there is a good transmit and receive from a particular RFID tag among the group. The present system presents a special challenge in that other applications do not use as many readers as close together. The present system has a uniquely high number of RFID readers in close proximity to one another, and the number of readers in close proximity to one another is constantly changing as carts move around.

Two things happen when the number of RFID readers in close proximity to another is a large number and constantly changing. First, passive RFID tags become saturated by all the RF energy. Second, each reader becomes saturated by too much interference, resulting in a phenomenon referred to as dense reader mode. Dense reader mode is when multiple RFID readers are broadcasting and receiving RFID information and the resulting RFID read performance is fluctuating and/or decreasing from the available number of RFID tag reads within the useable read range of the RFID tags. Specifically, dense reader mode is a mode of operation that prevents readers from interfering with one another when many are used in close proximity to one another.

As discussed previously, it is possible to partially optimize RFID reader performance by increasing or decreasing the gain until an optimal number of tags are detected. However, upon further testing, it has become apparent that additional optimization may be achieved by increasing or decreasing other characteristics in addition to power. For example, in addition to adjusting power up or down, RFID reader performance is optimized by increasing or decreasing the duty cycle (i.e. the transmit on and off time such as broadcast on for 2 seconds, and off for 8 seconds for a 20% duty cycle). Additionally, RFID reader performance may be further optimized by adjusting the antennas themselves. As there is an antenna directed to both sides of the cart (or alternatively, a single bidirectional antenna), each can be adjusted individually such that the antennas (or directions for a single antenna) are not matched, until an optimal number of tags are detected. For example, it is possible to alter the sleep time (i.e., the duty cycle for one antenna or antenna direction as relative to other antenna or antenna direction respectively).

Such optimization allows a greater number of readers to function with a limited RF domain. Such optimization also allows a large number of readers to co-exist within a small fixed area, such as in the Point of Sale (i.e. check out) area of a store.

In an embodiment, the locationing component is similarly operable to determine the location of a given product relative to the shopping cart 10 based on signals from the read component. The locationing component then displays on the video display 75 the location of the given product in relation to the cart 10. In an embodiment, the locationing component may comprise software, hardware or a combination of hardware and software operable to determine the location of the shopping cart or a product in the store. The locationing component may, in an embodiment comprise hardware affixed to the cart with software incorporated therein, or may, in an embodiment, comprise hardware affixed to the cart operably coupled with software stored in and/or executed from the ECM 200 or another networked component. In an embodiment, the locationing component may be integrated within the ECM 200.

In an embodiment, the location of the given product in relation to the location of the cart 10 may be graphically displayed on the video display 75 on a floor plan of the store, using an indicator to show the location of the cart 10 on the floor plan of the store and another indicator to show the location of the given product on the floor plan of the store. In an embodiment, the indicators may comprise directional arrows 309, as will be discussed further below. In an embodiment, the location of the given product in relation to the location of the cart 10 may be described using words relative to a floor plan of the store. For example, such a written direction may be provided in the video display 75 by indicating "You are on Aisle 2, the Product you are looking for is on Aisle 9 to your left."

In an embodiment, the locationing component is operable so as to locate a given product being displayed in an advertisement on the video display 75 relative to the shopping cart 10. In an embodiment, the locationing component then displays on the video display 75 the location of the product being advertised in relation to the cart 10. In an embodiment, the location of the product being advertised in relation to the location of the cart 10 may be graphically displayed on the video display, using an indicator, such as an arrow, displayed adjacent to or as part of the advertisement to point towards the location of the product being advertised. In an embodiment, the location of the product being advertised in relation to the location of the cart 10 may be described using words to indicate to the consumer where she may find the product being advertised. For example, in or adjacent to an advertisement for laundry detergent, an indicator reading "Laundry Detergent ahead on the right" may be displayed based on the location of the cart.

Figure 17:
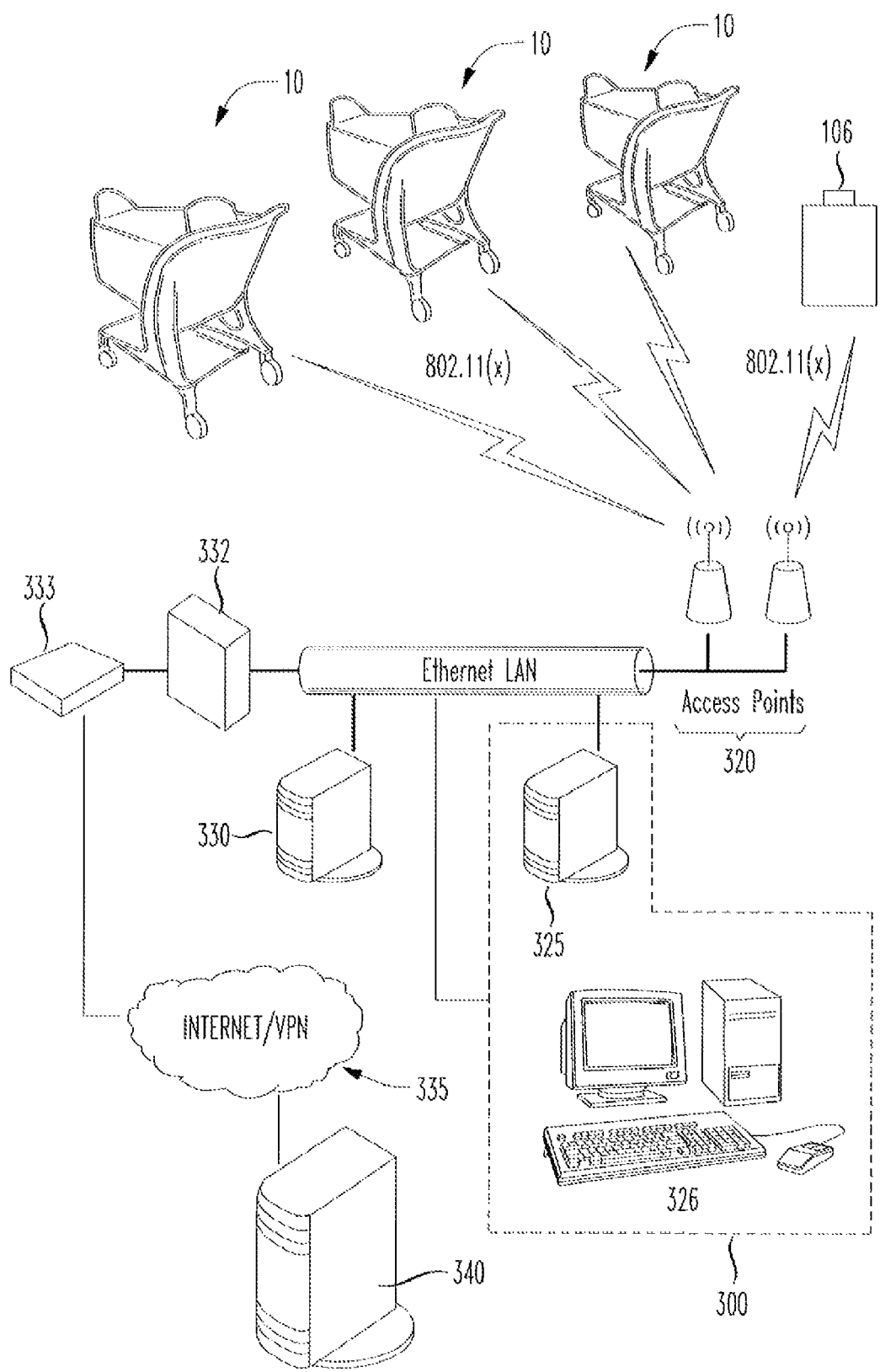
FIG. 17 illustrates the overall system of the media enabled shopping cart in a store network system according to an embodiment of the present disclosure.
Figure 18:
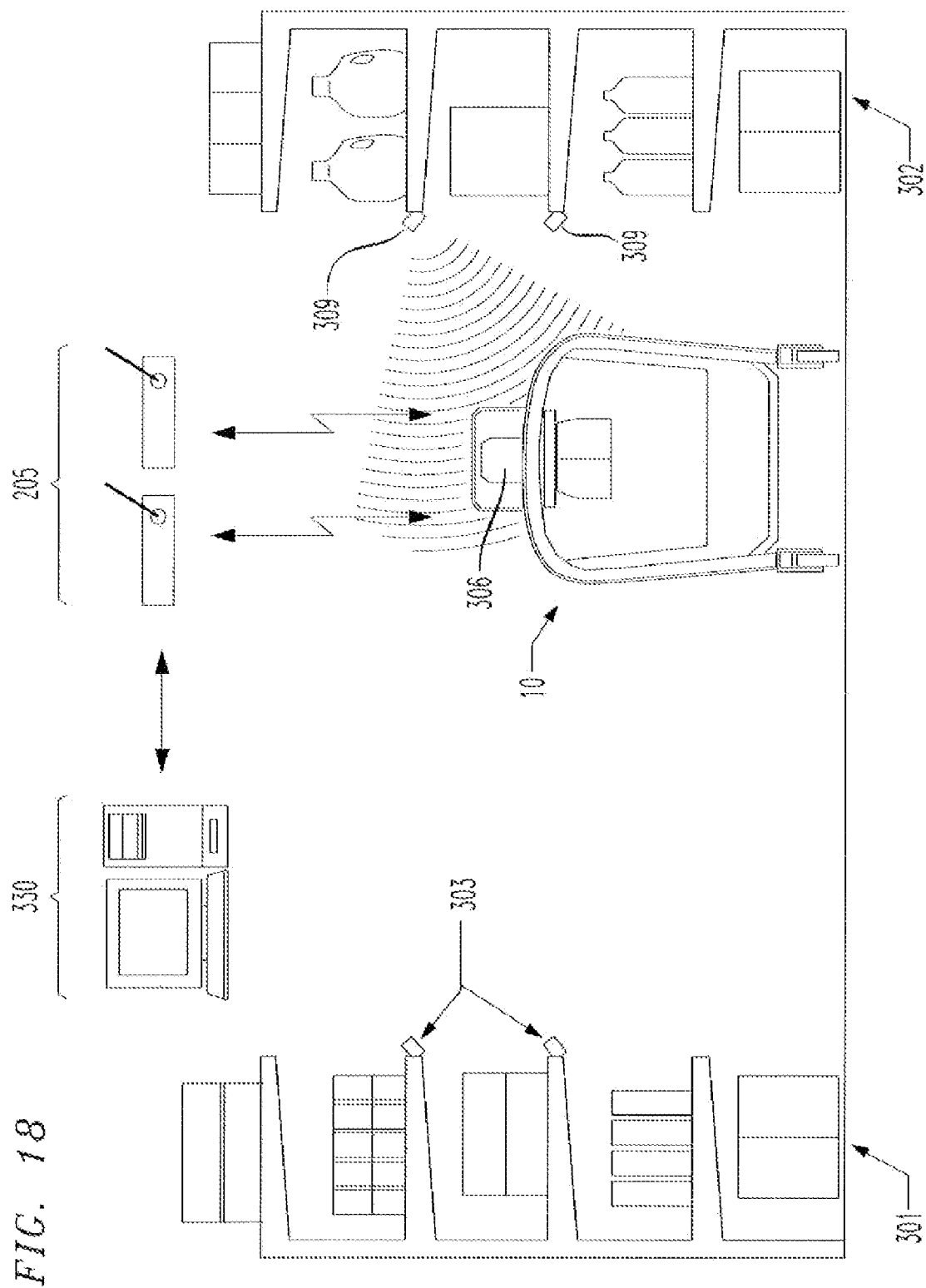
FIG. 18 is an illustrative view of the media enabled shopping cart in a store network system according to an embodiment of the present disclosure.

Referring now to FIGS. 16, 17 and 18, upon determining the proximity of the cart 10 to any particular tag or tags 303 or 304, the ECM 200 causes at least one advertisement 306 to be displayed to the consumer 85 on the video display 75. The advertisement 306 displayed may be selected from a plurality of stored advertisements 307, and the advertisement 306 may be selected based on the proximity of the cart 10 to a particular tag or tags 303 or 304. In an embodiment, the plurality of stored advertisements 307 may be stored in the ISS 330, streamed to the ECM 200 via a wireless LAN (e.g., transceivers 205 mounted in the store communicating with the network transceiver 204 in ECM 200), and displayed on the video display 75 according to the location of the cart 10. In an embodiment, the plurality of stored advertisements 307 may be stored in local memory 202 in the MOD, accessed, and displayed on the video display 75. When the cart 10 enters a different area of the store and the aisle RFID reader 225 detects different RFID tags 303 or 304, the location of the cart 10 is updated, and the advertisement 306 is changed to reflect a different one of the plurality of the stored advertisements 307 based on the updated location of the cart 10.

As shown in FIG. 16, in an embodiment, the screen 77 of the video display 75 may be divided into a plurality of screen segments 308, such that one of the plurality of stored advertisements 307 may be displayed in each screen segment 308. In an embodiment, one of the plurality of screen segments 308 may be designated for display of consumer specific information, such as the running total of the products in the cart 10, loyalty card or other consumer identifying information, product information pertaining to a specific product recently placed in the cart 10, and the like.

Referring again to FIG. 16, an exemplary display of advertising is shown. In an embodiment, a selected number of the plurality of stored advertisements 307 (equal to the number of screen segments 308) are displayed in the screen segments 308. Directional arrows 309 may be provided as an indication to point in the general direction of the advertised product on adjacent shelves. In an embodiment, one screen segment 308*a* may be more prominently sized than the other screen segments 308*b*, such that one of the plurality of stored advertisement 307 is displayed in the more prominently sized screen segment 308*a*, while others of the plurality of stored advertisements 307 are displayed in the less prominently sized screen segments 308*b*. This division of the screen 77 into screen segments 308 may be analogized to advertisements in a newspaper, wherein various of the advertisements may use one half, one quarter, one third of a page, etc. to fill a page with advertisements, and the cost of running an advertisement in each portion of a page may relate to the size of the advertisement relative to the rest of the page, the prominence of the advertisement on the page, the duration of time the advertisement is on the page, or combinations thereof. In an embodiment, the selected plurality of stored advertisements 307 may rotate being displayed on each screen segment 308, such that the most prominent screen segment 308 displays each of the selected ones of the plurality of stored advertisements 307, one after another, based on the time each one of the plurality of stored advertisements 307 has been displayed, or based on the location of the cart 10 between the shelves 301 and 302 in proximity to tags 303 and 304, which may be further correlated to the proximity of the cart to the advertised product on the shelf.

Rather than showing multiple advertisements in various screen segments, a single advertisement at a time may be displayed in a screen segment generally reserved for advertising. A multi-tier approach may be used to determine pricing of advertisements when a single screen segment is devoted to advertising, given that the newspaper analogy may not apply. For example, advertising may instead be sold for zones of the store, whether based on what types of products will be shelved there, or based on consumer traffic patterns in the store. For example, pricing may be different and the types of advertisements that will be effective will vary based on whether the advertisement segment is purchased for advertisements to be displayed along high traffic routes such as the front aisle of the store, or the lower traffic areas, such as the pharmacy or deli. Selling advertising based on when and where it will be displayed may permit advertising companies to make decisions to effectively market products even while only one advertisement is displayed at a time in the video display 75.

Figure 21A:
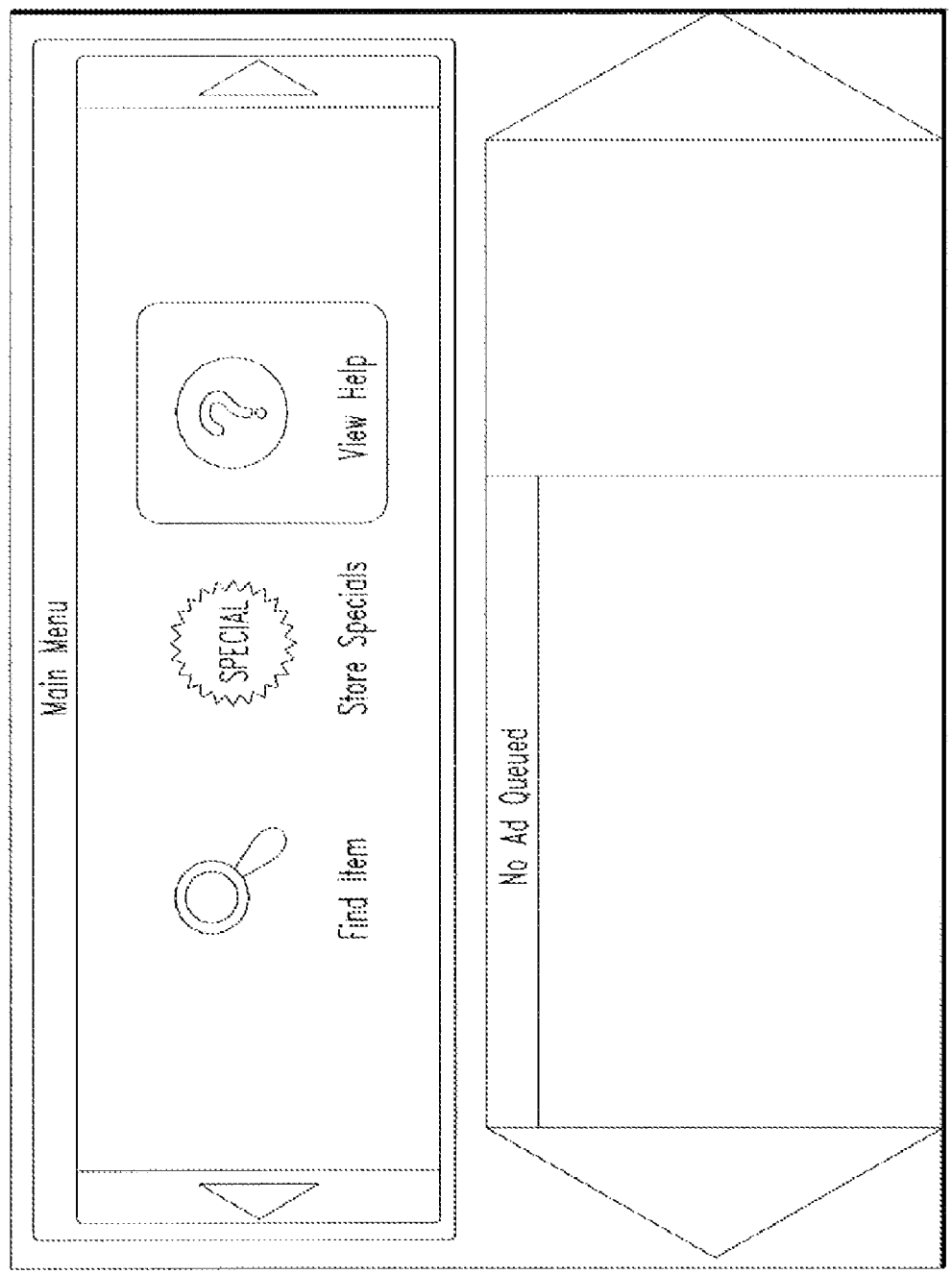
FIGS. 21A-F illustrate various graphical user interfaces (GUIs) to be presented via a video display to a consumer user of the media enabled shopping cart.

In an alternative embodiment, no one screen segment is sized more prominently than the other, but rather, a simplified, unique split screen Graphical User Interface ("GUI") is shown, as is illustrated in FIG. 21A. The unique attributes of the GUI are associated with cart operation and LCD display position. The GUI provides the consumer with user-friendly easy access to cart functionality while maintaining readability and utility as viewed from the nose-mounted position at the opposite end of the cart from the consumer.

The GUI may be adjusting to one of a plurality of user levels, providing basic, intermediate, or advanced functionalities of the enhanced cart 10 based on how the consumer prefers to use the cart 10. The GUI shown in FIG. 21A enables the consumer to access the basic level of functionality, and does not require the use of any identifying information associated with the consumer to carry out the functions. In an embodiment, the video display defaults to the basic level of functionality when the cart 10 is powered on. The basic level of functionality displayed in the menu includes "Find Item," "Store Specials," and "View Help," each of which may be displayed in the form of a button, textual link or the like for selection by the consumer. In the segment below the menu, space is reserved for display of an advertisement that is placed there when so indicated by the ECM 200, as discussed herein. Upon selection of a menu item, the GUI changes for each functional menu item.

Figure 21B:
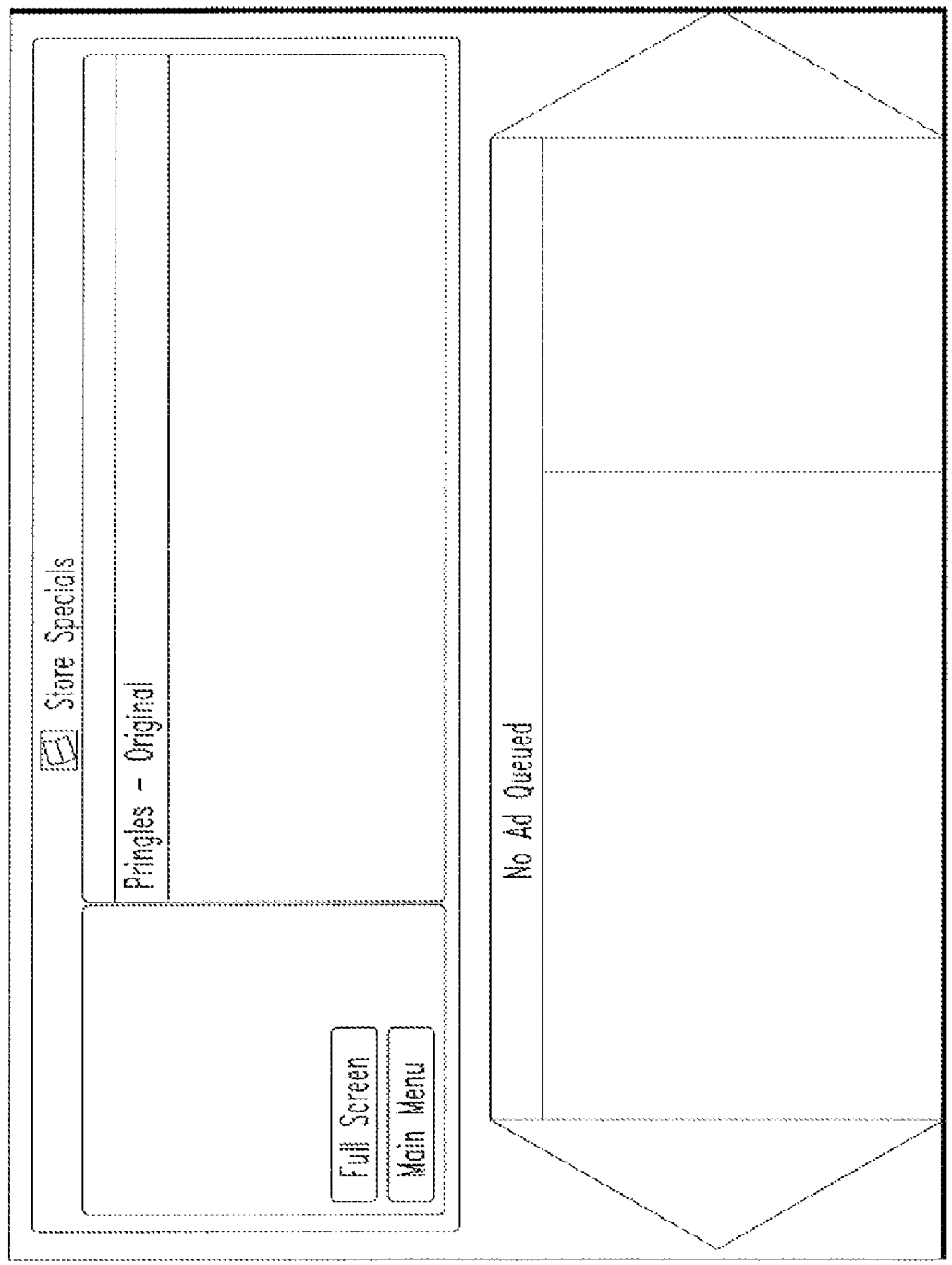

Upon selecting "Store Specials," the GUI reflects the view of FIG. 21B. In FIG. 21B, the Store Specials are shown, along with a button or link to show a full screen view of the store specials (which eliminates the space below reserved for display of advertisements), or return to the main menu. If the "Full Screen" is not selected, the space for display of advertisements remains displayed.

Figure 21C:
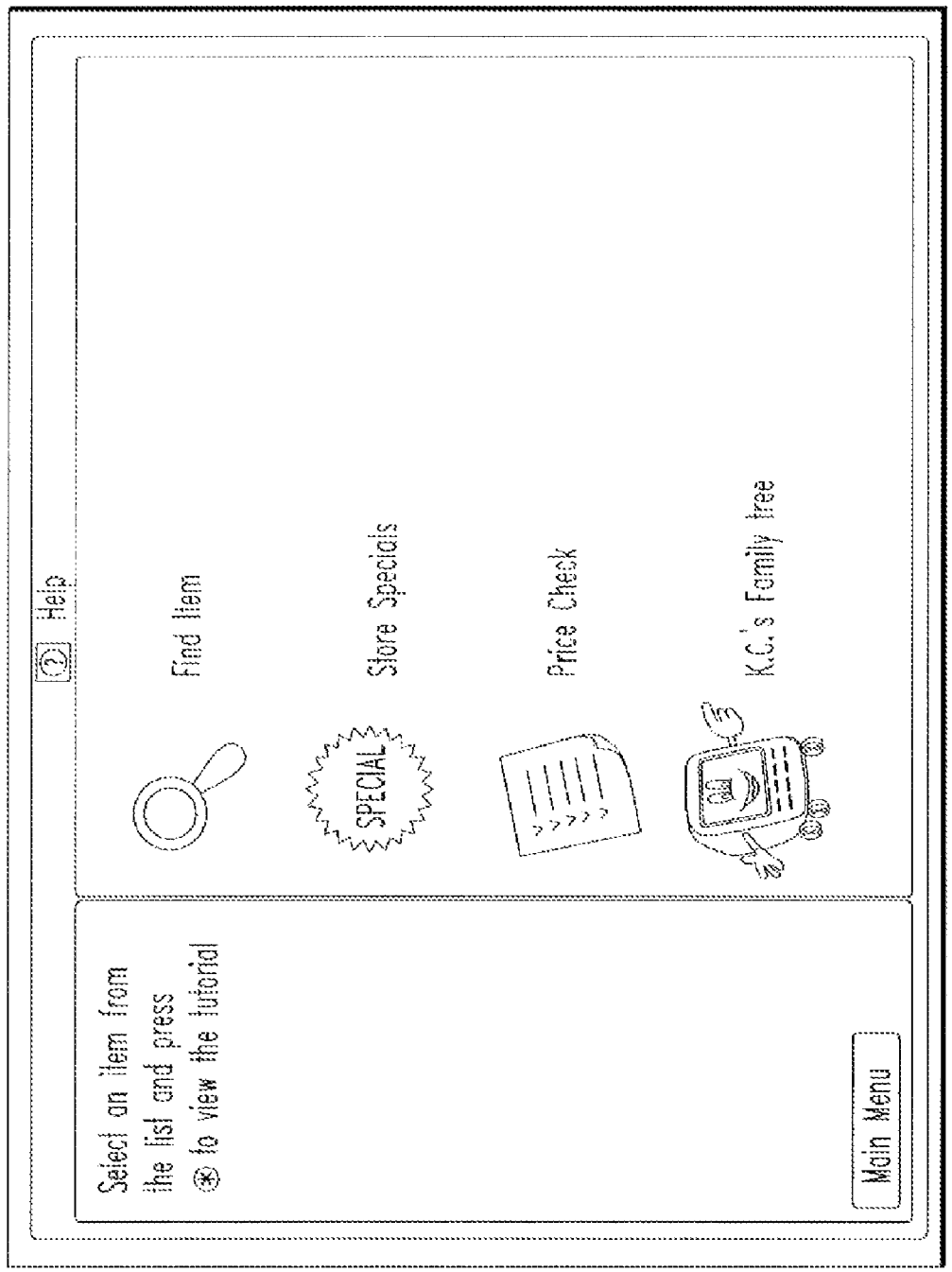

Upon selecting "View Help," the GUI reflects the view of FIG. 21C. In FIG. 21C, a menu appears that presents to the consumer the choices of "find item," "store specials," "price check," and more, according to the desires of the store for which the cart is configured. A link for a tutorial on the use of the cart 10 may be provided, along with a button or link to return to the main menu.

Figure 21D:
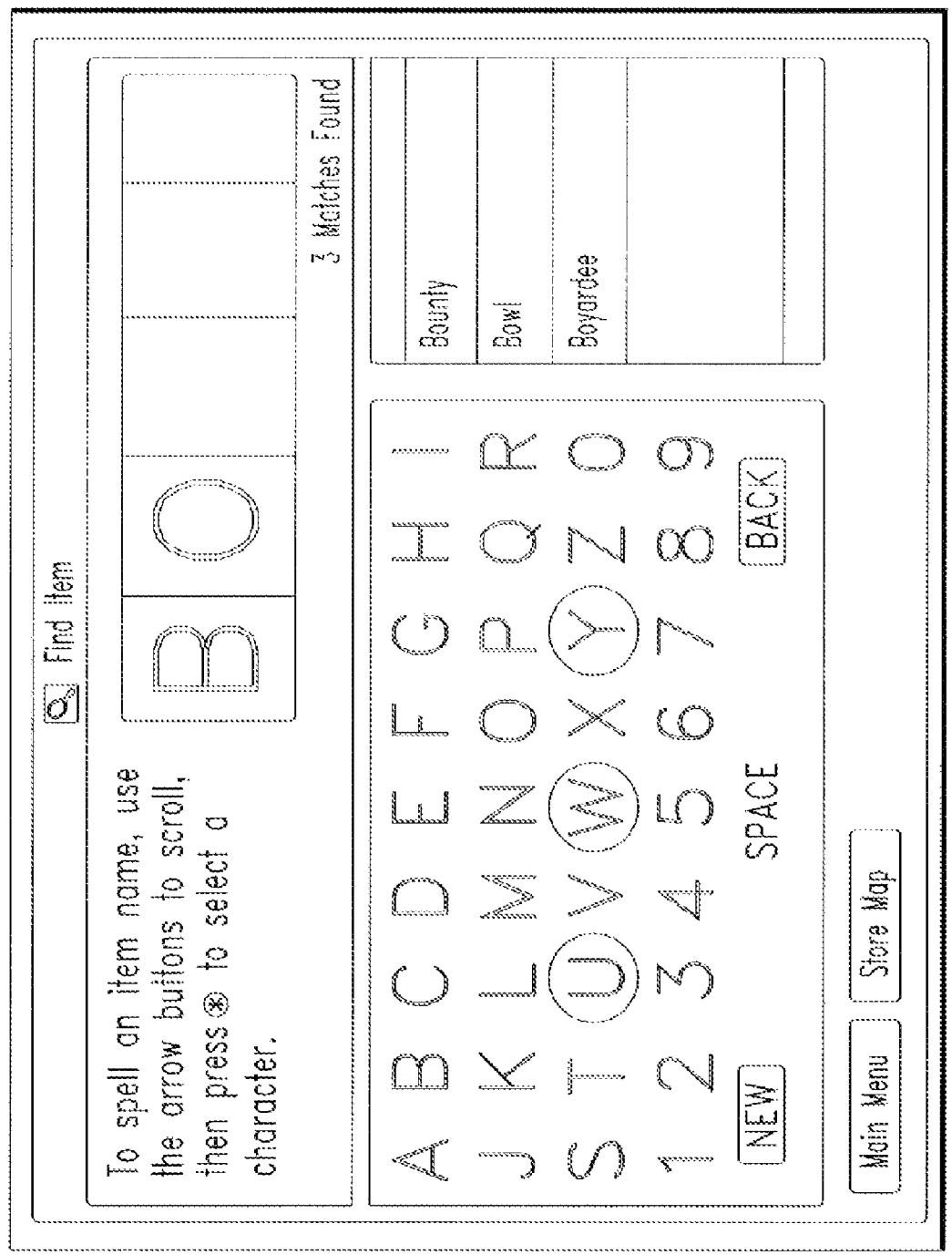
Figure 21E:
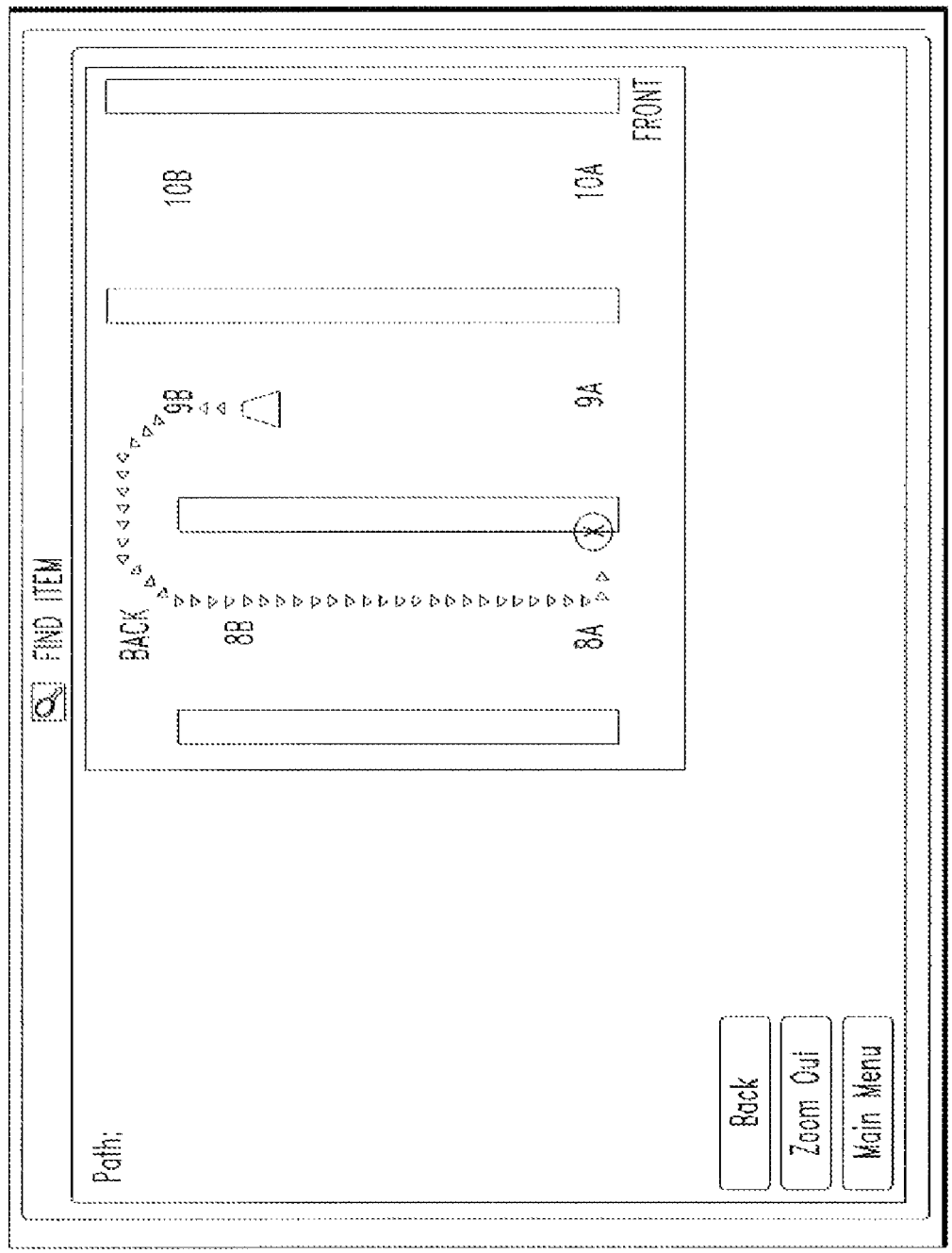

From the "View Help" view of the GUI, when "Find Item" is selected, the GUI provides the view of FIG. 21D, wherein the user may scroll and select letter or number characters using the five-way navigation device 123. Additional links for returning to the main menu or viewing a store map may also be provided. The store map provided by the link, as shown in FIG. 21E, may graphically indicate where in the store the cart is located as well as the location of an item for which the consumer is searching using the "Find Item" feature.

Figure 21F:
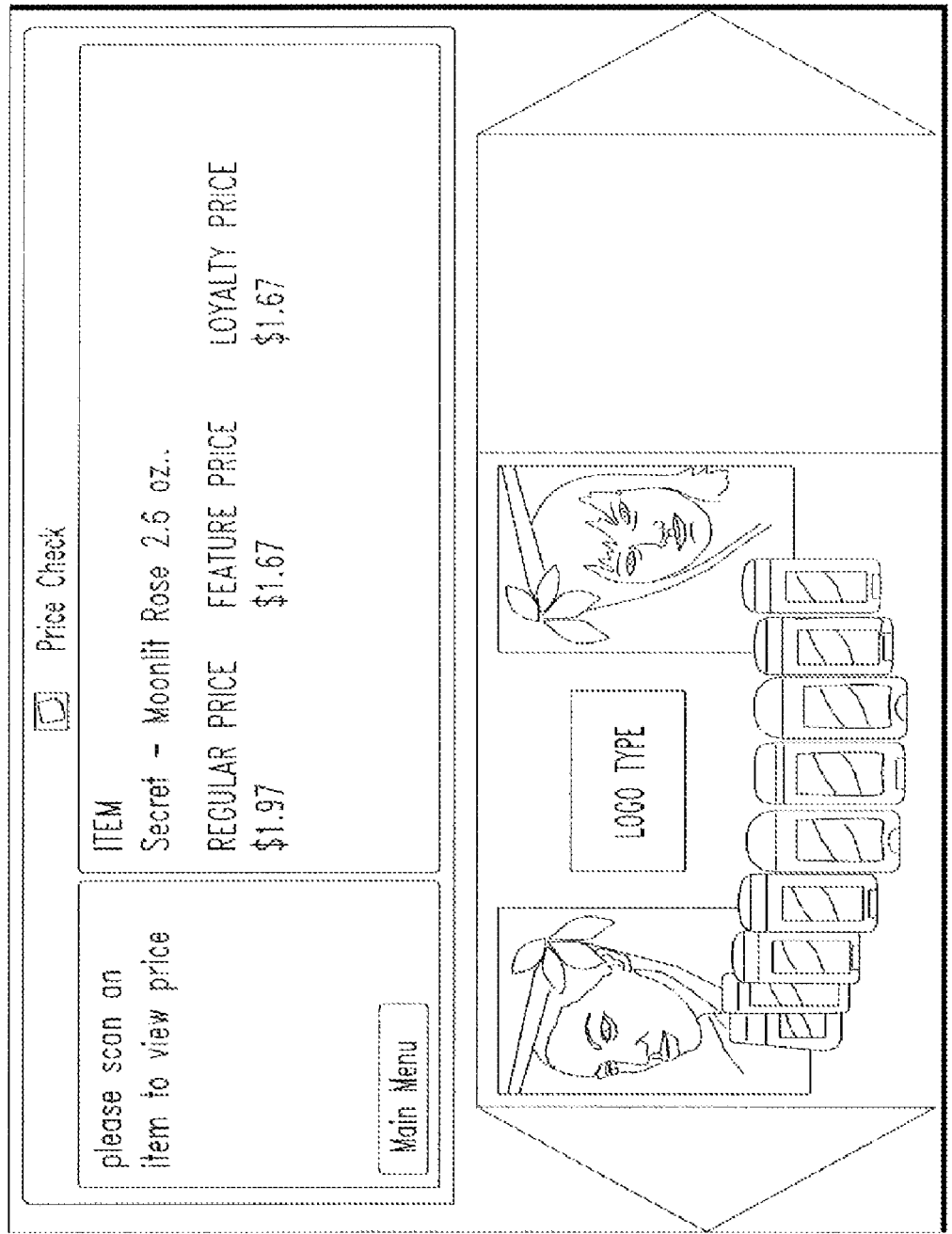

From the "View Help" view of the GUI, when "Price Check" is selected, the GUI provides the view of FIG. 21F, which displays a price (or prices, if a sale price is additionally available, or if a discount price is available for loyalty consumer 85*s*). In the price check view, the consumer may scan a product using the scanner 215, and the price is displayed. Also, as seen in FIG. 21F, an advertisement may be displayed in the space reserved for advertisements. The price check feature may be activated via a price check button as described herein.

Figure 23:
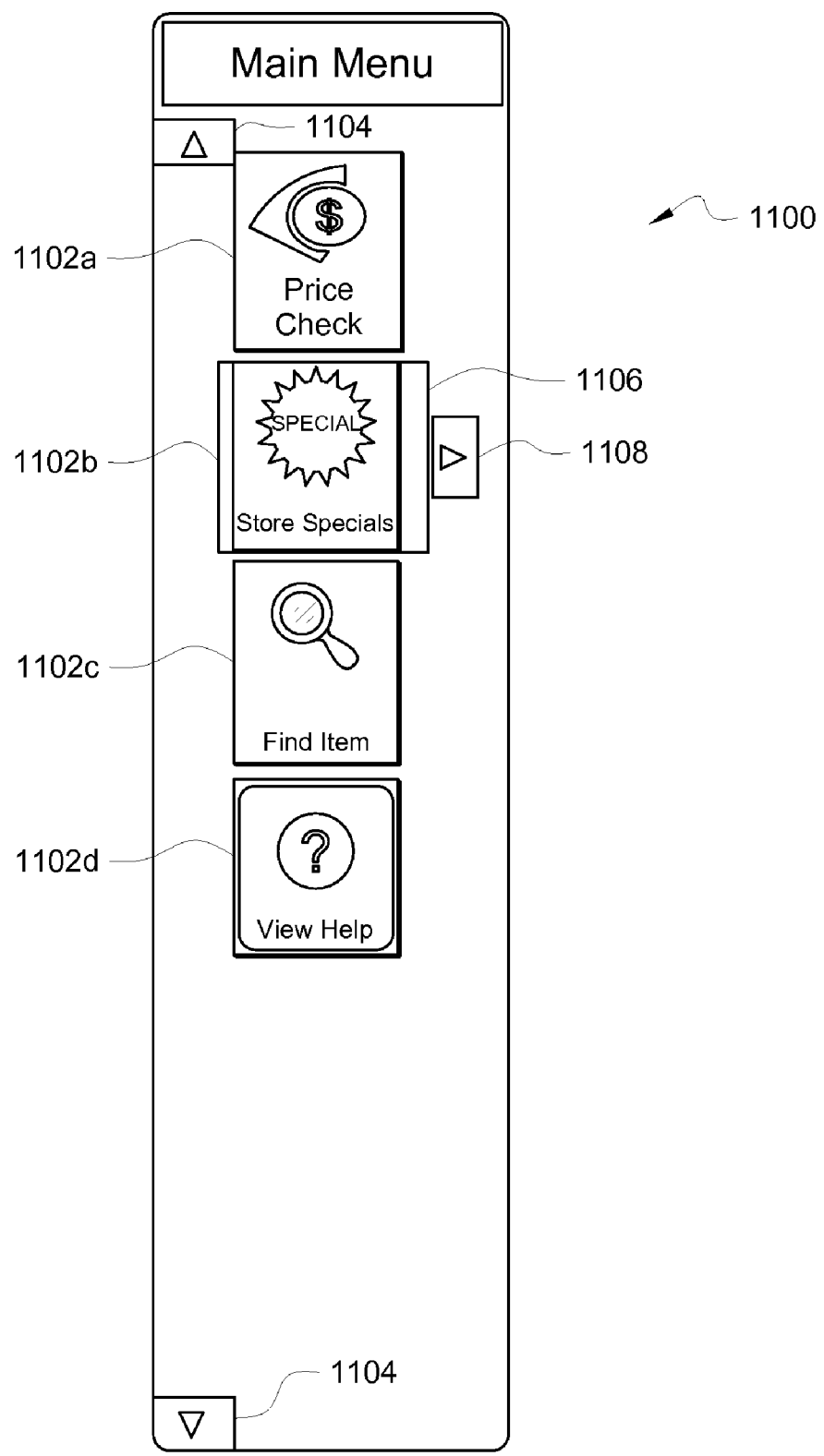
FIG. 23 illustrates an exemplary scrolling menu according to an embodiment of the present disclosure.

Referring now to FIG. 23, an exemplary scrolling menu for a user interface is shown in accordance with embodiments of the present disclosure. In an embodiment, content displayed on the video display 75 is navigated and controlled by way of a scrolling menu 1100. The scrolling menu 1100 includes a plurality of functions that may be selected, each function represented by a graphical icon 1102a-d. The scrolling menu 1100 rotates the functions, represented by icons 1102a-d, as directed by a user, for example when the user indicates an upward scrolling motion, a downward scrolling motion, or sideways scrolling motion with the five-way navigation device 123. The scrolling menu 1100 may present the functions in a horizontal or a vertical presentation (as shown in FIG. 23), which may be navigated using the relevant directional controls of the five-way navigation device 123. The scrolling menu 1100 may additionally include indicators of direction 1104 in order to help users determine how to use the directional control to scroll through the scrolling menu functions. In various embodiments, each function may alternatively or additionally be represented by text that easily identifies the function to a user. The text indicating a function may likewise be scrolled around within the scrolling menu.

The scrolling menu includes a selection position 1106, such that when a particular function icon (1102b as shown) is scrolled into the selection position 1106, content associated with the function icon is displayed in some or all of the remaining space visible in the video display 75. The video display 75 dynamically magnifies the content associated with whatever function icon is presently in the selection position 1106, in order for the user to see and use the associated content to achieve an objective that the function offers.

In various embodiments, the selection position 1106 is indicated by an icon 1108 that differentiates the selection position 1106 from the other positions in the scrolling menu 1100. As shown in FIG. 23, the selection position 1106 is indicated by a right-facing arrow (i.e., the icon 1108), indicating that the associated content for the function in the selection position 1106 is magnified in the area of the video display 75 to the right of the selection position 1106. In alternative embodiments, any icon may be used to indicate the selection position 1106, such as a magnifying glass or other attention-getting graphical icons or text such as the box 1106 shown in FIG. 23.

Figure 24:
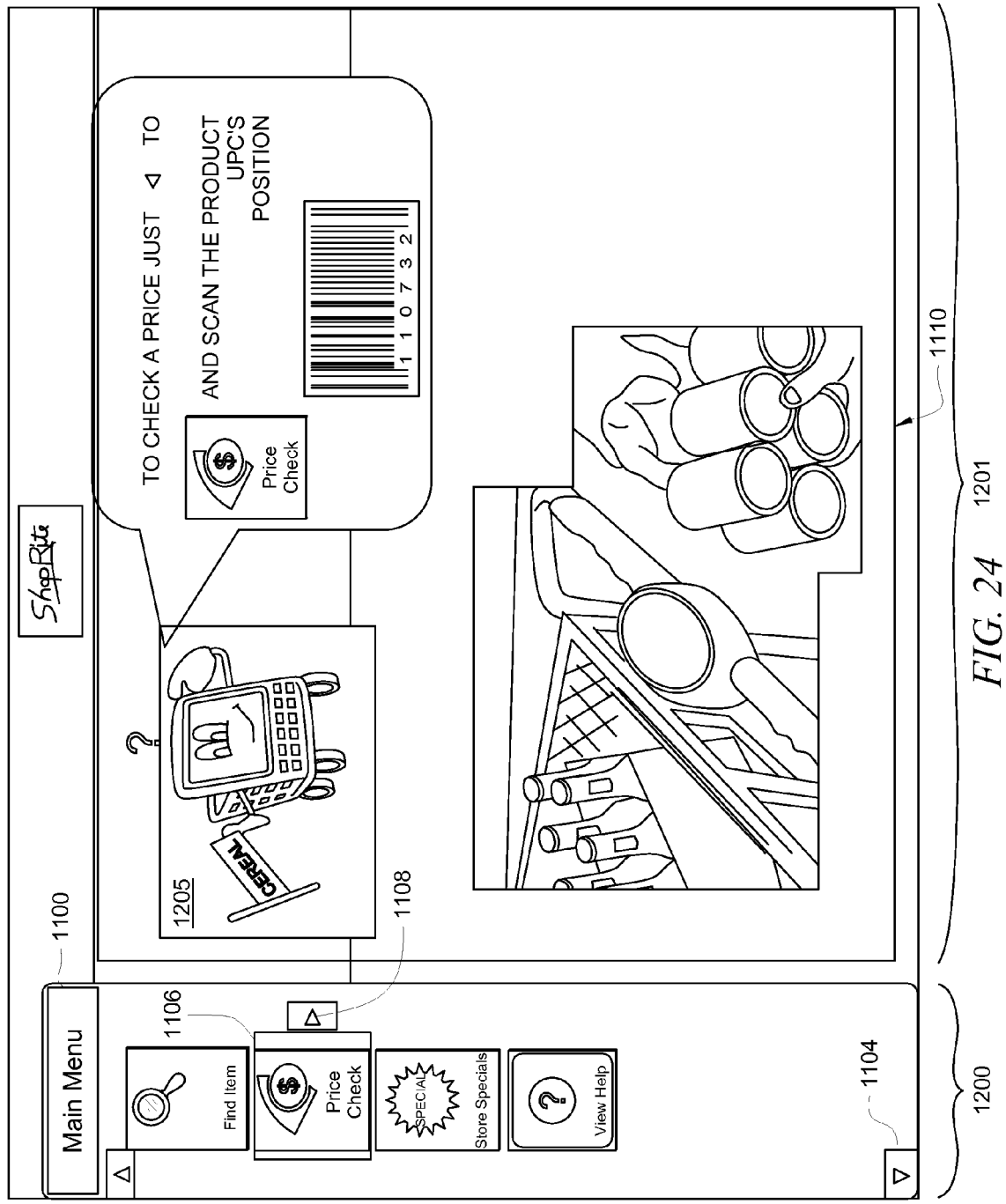
FIG. 24 illustrates an exemplary display including the price check function associated content according to an embodiment of the present disclosure.

In the video display 75, the available display space may be apportioned into at least two areas, though in various embodiments, the available display space may be apportioned into more than two areas. As shown in FIG. 24, in a first area 1200 of the available display space, the scrolling menu 1100 may be presented, while in a second area 1201 of the available display space, content 1110 is displayed, wherein the content 1110 is associated with the particular function presently displayed in the selection position 1106 of the scrolling menu 1100. As the scrolling menu 1100 scrolls, the content 1110 displayed in the second area 1201 of the display space dynamically changes, preferably as rapidly as the user is scrolling the scrolling menu. As such, when each function icon is within the selection position 1106, the content 1110 associated with that function is displayed, and the instant that the function within the selection position 1106 changes, so does the content 1110 displayed in the second area 1201.

Thereby, the user is presented with a real-time graphical display that changes according to her wishes and comfort level with using the user interface. For example, an elderly consumer who is not accustomed to using a computer or a first time user of the media enabled shopper cart may scroll the scrolling menu slowly, and the associated content is displayed at the same rate, as she scrolls the menu, affording her as much time as she needs to look at and become familiar with the content. By comparison, a shopper who is more familiar with using the media enabled shopping cart may scroll the menu quickly to use functions that she is already familiar with, and will be displayed the selected feature dynamically, in real time.

In embodiments having the available display space apportioned into more than two areas, additional space may be used to display, for example, advertisements, a help function in addition to the function in the selection position, a store map, instructional photographs (for example, a photograph showing the user how to scan a product for a price check), and retailer sales, promotions, or logos. As may be seen in FIG. 25, the first area 1200 is used to display the scrolling menu 1100, the second area 1201 is used to display the content 1110 associated with the function in the selection position 1106, and a third area 1202 of the available display space is used to display an advertisement, which may be selected based on the location of the cart within the store, or based on historical information known about the consumer's purchasing habits.

The scrolling menu 1100 may include any number of different functions, including, for example, a "Price Check" function, enabling the consumer 85 to scan an item to see the item's price, a "Store Special" function, enabling the consumer 85 to review (and optionally find on a store map) reduced or special price items, an "Item Finder" function, enabling the consumer 85 to request the location of a particular product, and a "Help" option, enabling the consumer 85 to receive helpful tips for use of the media enabled shopping cart. Additional optional functions may include various service functions, such as an interface with an in-store pharmacy for the consumer 85 to request the status of their prescription or receive notification of prescription availability, an interface with an in-store deli for the consumer 85 to make a deli order or receive notification of order availability, an interface for notification to the consumer 85 of completion of in-store auto servicing, an interface for interaction between the consumer 85 and customer service personnel for services such as rain checks, and other functions for in-store services.

Some or all of these functions may be included in the basic level of functionality. In addition to these functions, additional functionality of the cart 10 is available to users who desire to additionally enhance their shopping experience at an intermediate level of functionality and at an advanced level of functionality. At the intermediate level of functionality, the consumer may scan products at the cart 10 using the scanner 215, view the scanned cart contents and a running total, and remove an item from the cart by scanning an item that has already been placed in the cart 10. The intermediate level of functionality may be accessed by a consumer by simply starting to use the scanner 215. To use the intermediate level of functionality, the consumer is not required to identify himself or herself, but may do so using a loyalty card associated with his or her identity, or by simply using a PIN. The consumer has the option to use a consumer created Personal Identification Number (PIN) which is unique to the consumer, but may or may not be associated with any consumer information such as name, address, and the like, in the same manner as a loyalty card identifier. Using a PIN, the consumer may retrieve saved electronic shopping lists, favorite recipes, and nutritional information in some advanced features, but does not have to identify him or herself with a name and address. In an embodiment, the PIN comprises a phone number, optionally with a security code.

In an embodiment, the level of functionality selected and the resultant display screens and features made available to a consumer 85 is based upon existing data entered by the user or gathered from previous use of the cart 10 by the consumer 85. For example, upon scanning of a loyalty card or entry of a PIN, a database may be consulted to determine what level of functionality the consumer 85 has selected or previously used, and then the appropriate functionality and display screens are presented to the user. Such data can be tracked over time and functionality adjusted to correspond to preferences and usage by the consumer 85. For example, as the consumer 85 becomes experienced in using the system, more detailed information and functionality may be provided to the consumer 85. Alternatively, tutorials or other help functions may be provided for inexperienced users.

At the advanced level of functionality, the consumer may additionally perform a cart level express check out, when products for purchase have already been scanned, view nutritional information and recipes, and view lists according to store departments. The consumer may also create, save, and retrieve electronic shopping lists, and obtain loyalty card prices and promotions.

In various embodiments, when the consumer identifies himself or herself to the cart 10 by way of a loyalty card, a consumer privacy notice may be displayed. The privacy notice may be displayed upon the first use of the cart 10 by a particular user who has identified himself or herself by way of a loyalty card, and thereafter, when the consumer identifies himself or herself via a loyalty card, the privacy notice will not be displayed since it has been displayed and accepted by the consumer before.

The unique attributes of the GUI are associated with cart operation and LCD display position. The GUI provides the consumer with user-friendly easy access to cart functionality while maintaining readability and utility as viewed from the nose-mounted position at the opposite end of the cart from the consumer.

Referring now to FIG. 24, when the function icon for "Price Check" is scrolled in the scrolling menu 1100 to the selection position 1106, content 1110 associated with the price check function is displayed in the second area 1201. Specifically, the content 1110 may include instructions to a user, either textually or graphically, for how to carry out a price check. In various embodiments, the instructions indicate that to check a price of an item, the consumer 85 presses a particular one of the buttons of the five way navigation device 123, and scans the item's UPC code using the scanner 215.

The content 1110 associated with the price check function may additionally include, as shown in FIG. 24, a helper icon 1205 to offer the consumer 85 an additional way to seek information, or a tutorial, on the use of the price check function. Although not shown in FIG. 24, but discussed above, an advertisement, such as an advertisement for the item for which the price is being checked, another product made by the same company, or a competing product, may be displayed in a third area reserved for advertisements 1202.

Figure 25:
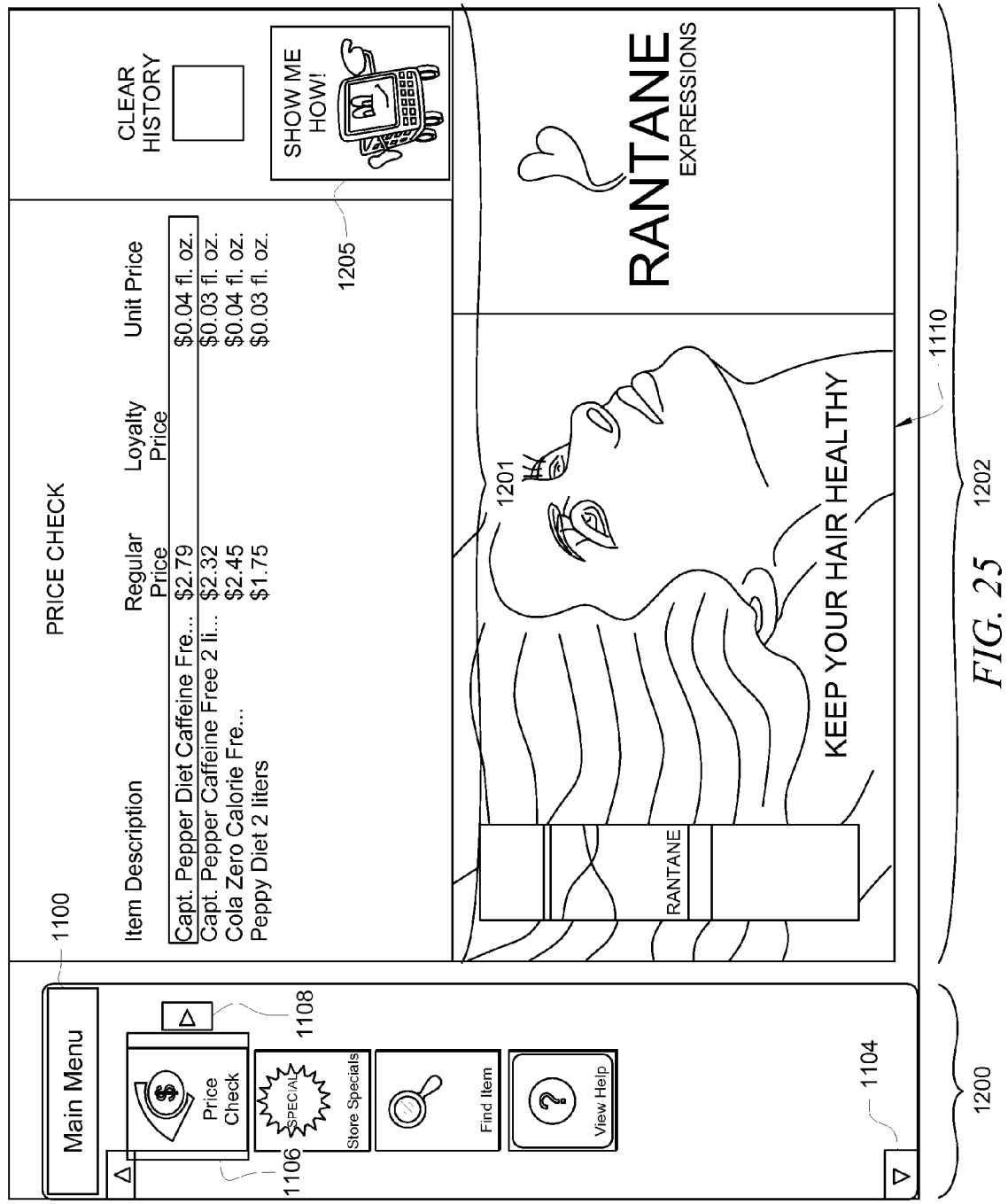
FIG. 25 illustrates an exemplary display including the price check function resulting content according to an embodiment of the present disclosure.

Upon a scan of an item by the consumer 85 while the content associated with the price check function is being displayed, the user interface dynamically changes to display the results of the price check, i.e., a price (or prices, if a sale price is additionally available, a discount price if available for loyalty consumer 85s, or a per unit price) as shown in FIG. 25. The results of the price check may be displayed in a full screen, consuming all available display space not used for displaying the scrolling menu, or may be displayed in one area, such as a second area 1201, while a third area 1202 is used for displaying other content, such as an advertisement for the item for which the price is being checked, another product made by the same company, or a competing product.

Additionally, as shown in FIG. 25, a Price Check History may be displayed including each item for which the consumer 85 has performed a price check during the particular shopping trip. The Price Check History may be used by the consumer 85 to perform comparison shopping, or to decide which items to keep for purchase, and which items to return to a store shelf. An icon may be provided for clearing the Price Check History.

Figure 26:
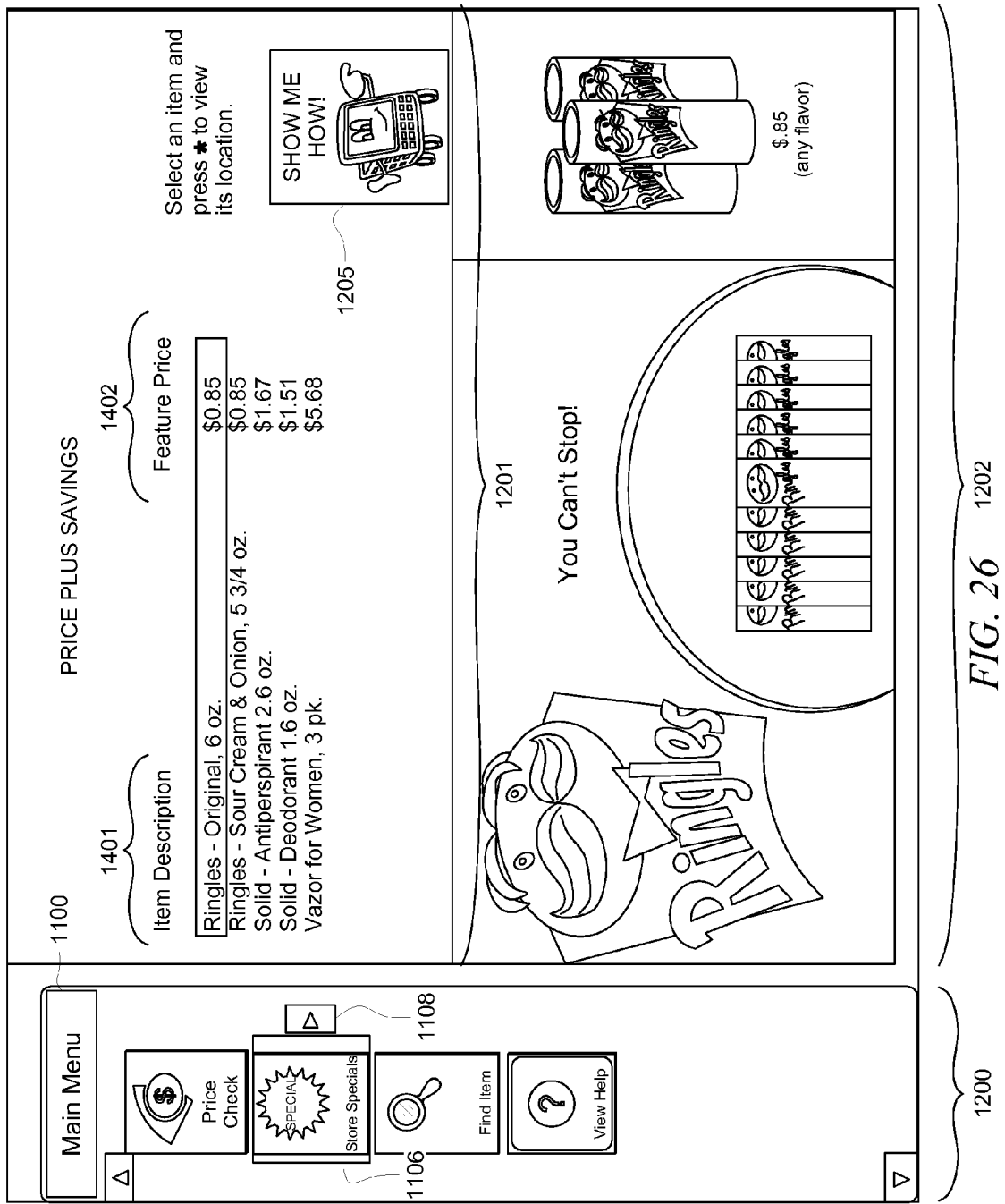
FIG. 26 illustrates an exemplary display including the store specials function associated content according to an embodiment of the present disclosure.

Referring now to FIG. 26, when the function icon for "Store Specials" is scrolled in the scrolling menu 1100 to the selection position 1106, content 1110 associated with the store specials function is displayed in the second area 1201. Specifically, the content 1110 may include an item description 1401 and a feature price 1402 for each item priced for Store Specials (such as weekly specials). The item description 1401 may include a product name brand (e.g., Pringles™) and type (e.g., Original), as well as a size (e.g., 6 ounces) purchased for the feature price 1402. In various embodiments, the content 1110 associated with the store specials function may include instructions to indicate that to view a location for a particular item from the list displayed for store specials, the consumer 85 may press a particular one of the buttons of the five way navigation device 123 while highlighted the particular item in which she is interested, and a location of the product relative to the present location of the cart may be displayed in a store map.

The list of store specials items may be displayed in a full screen, consuming all available display space not used for displaying the scrolling menu 1100, or may be displayed in one area, such as a second area 1201, while a third area 1202 is used for displaying other content, such as an advertisement, which may be selected based on the location of the cart within the store, or based on historical information known about the consumer's 85 purchasing habits.

The content 1110 associated with the store specials function may additionally include, as shown in FIG. 26, a helper icon 1205 to offer the consumer 85 an additional way to seek information, or a tutorial, on the use of the store specials function.

Referring now to FIG. 27, when the function icon for "Find Item" is scrolled in the scrolling menu 1100 to the selection position 1106, content 1110 associated with the item finder function is displayed in the second area 1201. Specifically, the content 1110 may include a keyboard 1500 in the second area 1201 and a list of items in store inventory 1502 pertaining to the search may be displayed in a third area 1202. The graphical keyboard 1500 displayed in the second area 1201 may be navigated by the consumer 85 using the five way navigation device 123. Specifically, the consumer 85 may use arrow buttons of the five way navigation device 123 to scroll through the letters in the keyboard 1500, and press the center button or "*" button in order to select a character. Using the keyboard, the consumer 85 may spell out the brand name or the item name for a product.

Figure 27A:
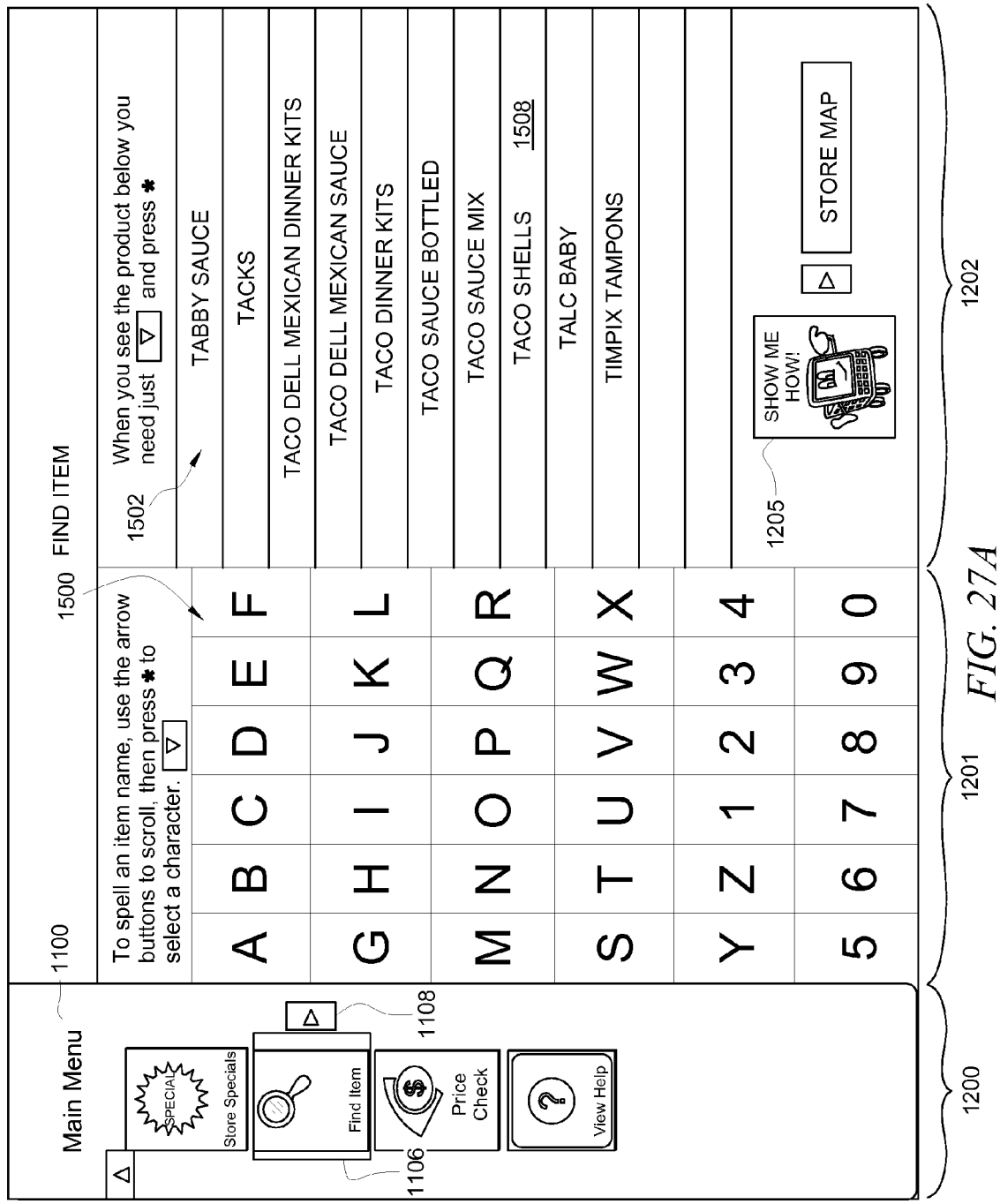
FIGS. 27A-C illustrate exemplary displays including the item finder function associated content according to an embodiment of the present disclosure.
Figure 27B:
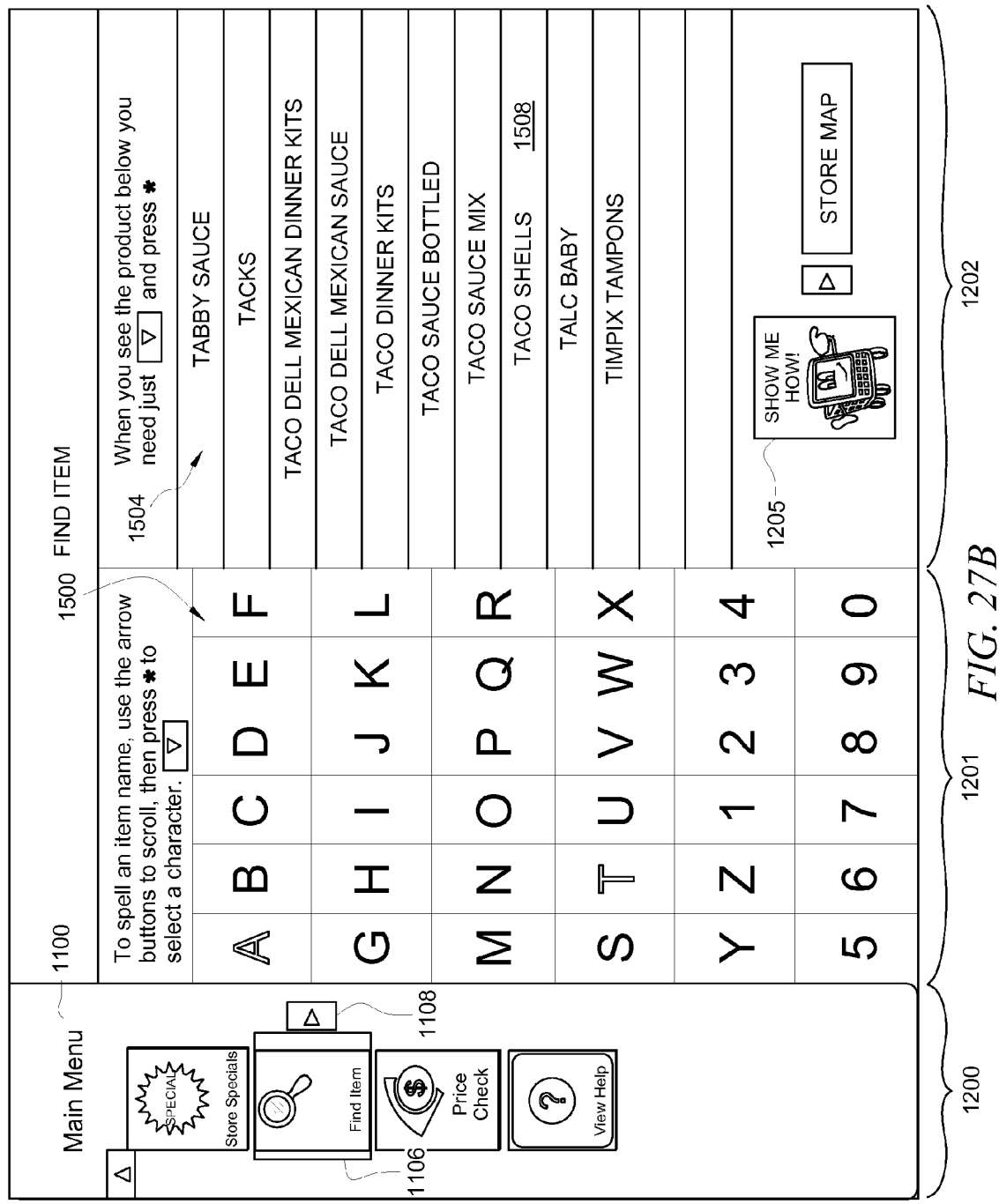

Upon the consumer 85 typing a first letter of the brand name or item name of a sought after product 1508, the list of items in store inventory 1502 pertaining to the search may be narrowed to items in the store inventory that start with the letter that was typed. For example, as shown in FIG. 27A, when the letter "T" is entered in the keyboard 1500, the list of items in store inventory 1502 is narrowed to only items with a brand name or item name in store inventory that start with the letter "T." Upon the consumer 85 typing a second letter of the brand name or item name of the sought after product 1508, a narrowed list 1504 of the items in store inventory pertaining to the search may be displayed. For example, as shown in FIG. 27B, when the letter "A" is entered in the keyboard 1500, the list of items in store inventory 1502 is narrowed to the narrowed list 1504 to include and display only items with a brand name or item name in store inventory that start with the letter "T" and the next letter is the letter "A."

Figure 27C:
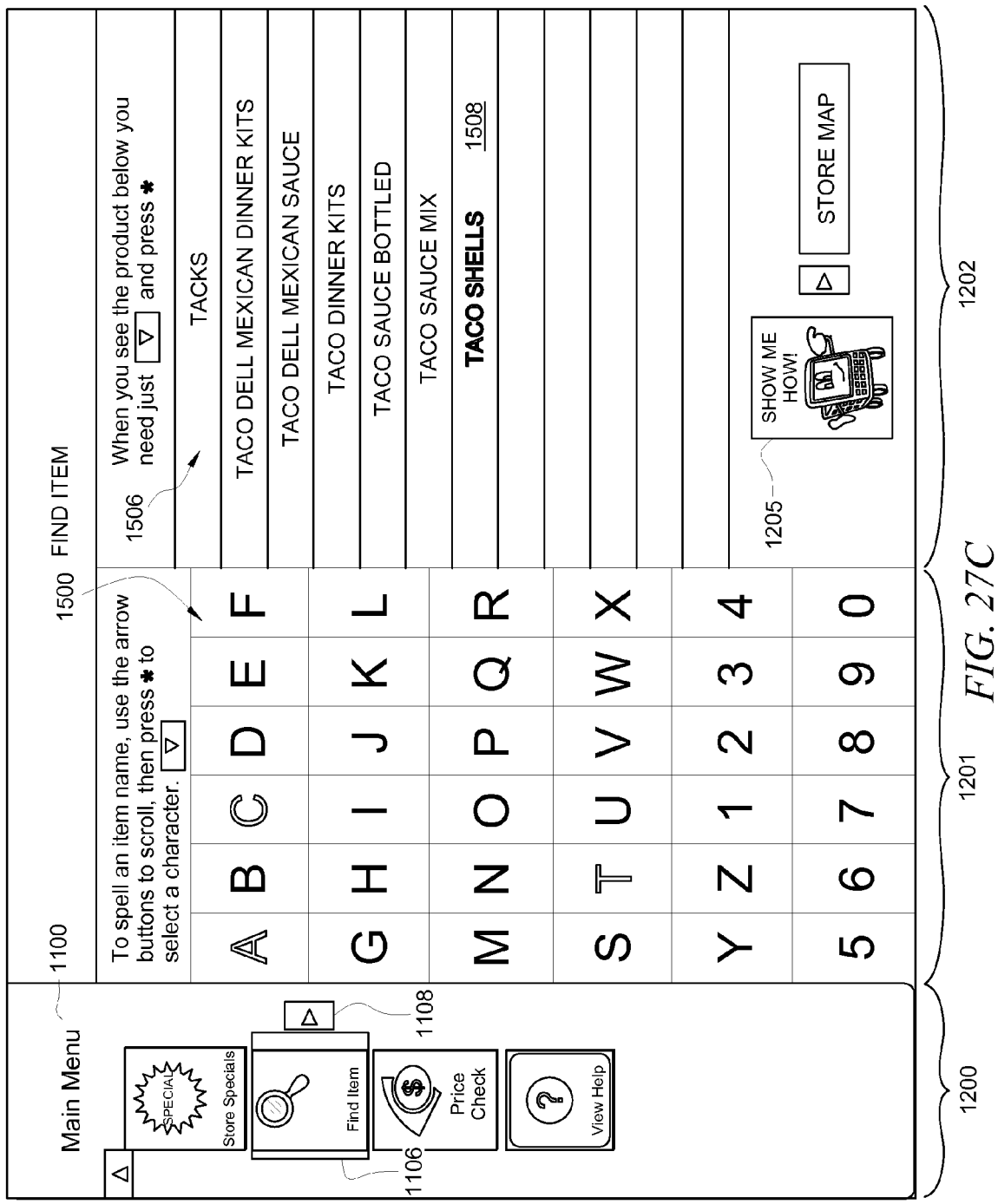

Likewise, upon the consumer 85 typing a third letter of the brand name or item name of the sought after product 1508, a further narrowed list 1506 of the items in store inventory pertaining to the search may be displayed. For example, as shown in FIG. 27C, when the letter "C" is entered in the keyboard 1500, the list of items in store inventory 1502 is narrowed again to the further narrowed list 1506 to include and display only items with a brand name or item name in store inventory that start with the letter "T," having the second letter as the letter "A," and having the third letter as the letter "C," and so on. The consumer 85 may enter as few or as many letters of the brand name or item name of the product he or she seeks to find, such that if all letters of the name are entered, the list 1502 is narrowed to only the item he or she seeks to find. The consumer 85 may enter fewer than all of the letters of the name, and once the list is narrowed sufficiently to display in the list the sought after item, the consumer 85 may select the item from the list 1502, 1504, 1506, or so on.

Figure 28:
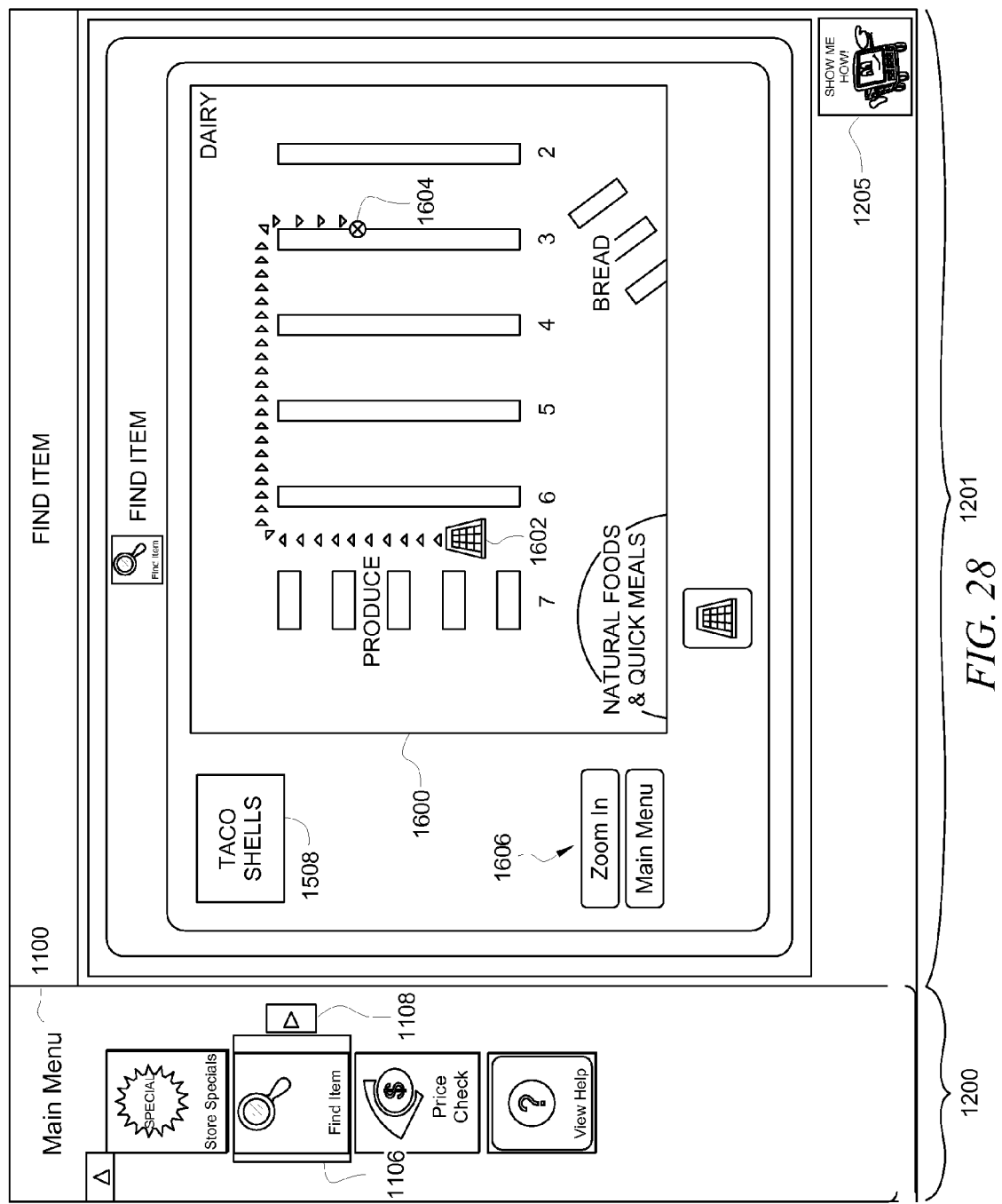
FIG. 28 illustrates an exemplary display including the item finder function resulting content according to an embodiment of the present disclosure.

Upon selection of the item from the list 1502, 1504, 1506, or so on, the result of the "find item" is displayed, identifying the sought after product 1508. Specifically, the location of the sought after item 1508 is displayed on a store map 1600 relative to the present location of the cart as shown in FIG. 28. The present location of the cart may be indicated with an icon representing the cart 1602, and the location of the sought after item 1508 may be indicated with an icon representing the item 1604. In various embodiments, an icon representing "zoom" 1608 may enable the consumer 85 to zoom in on the map for an additional level of detail to find the sought after item 1508.

The content 1110 associated with the item finder function may additionally include, as shown in FIGS. 27A-C and 28, a helper icon 1205 to offer the consumer 85 an additional way to seek information, or a tutorial, on the use of the item finder function.

In some embodiments, a link for a tutorial on the use of the cart 10 may be provided, along with a button or link to return to the main menu. In some embodiments, a user may enter a question by way of a keyboard such as that described above with respect to the item finder function, and an answer, if one exists in a database of frequently asked questions, may be displayed. In some embodiments, an index of topics pertaining to frequently asked questions may be displayed, enabling the user to select any one relevant to her question for review.

Figure 29:
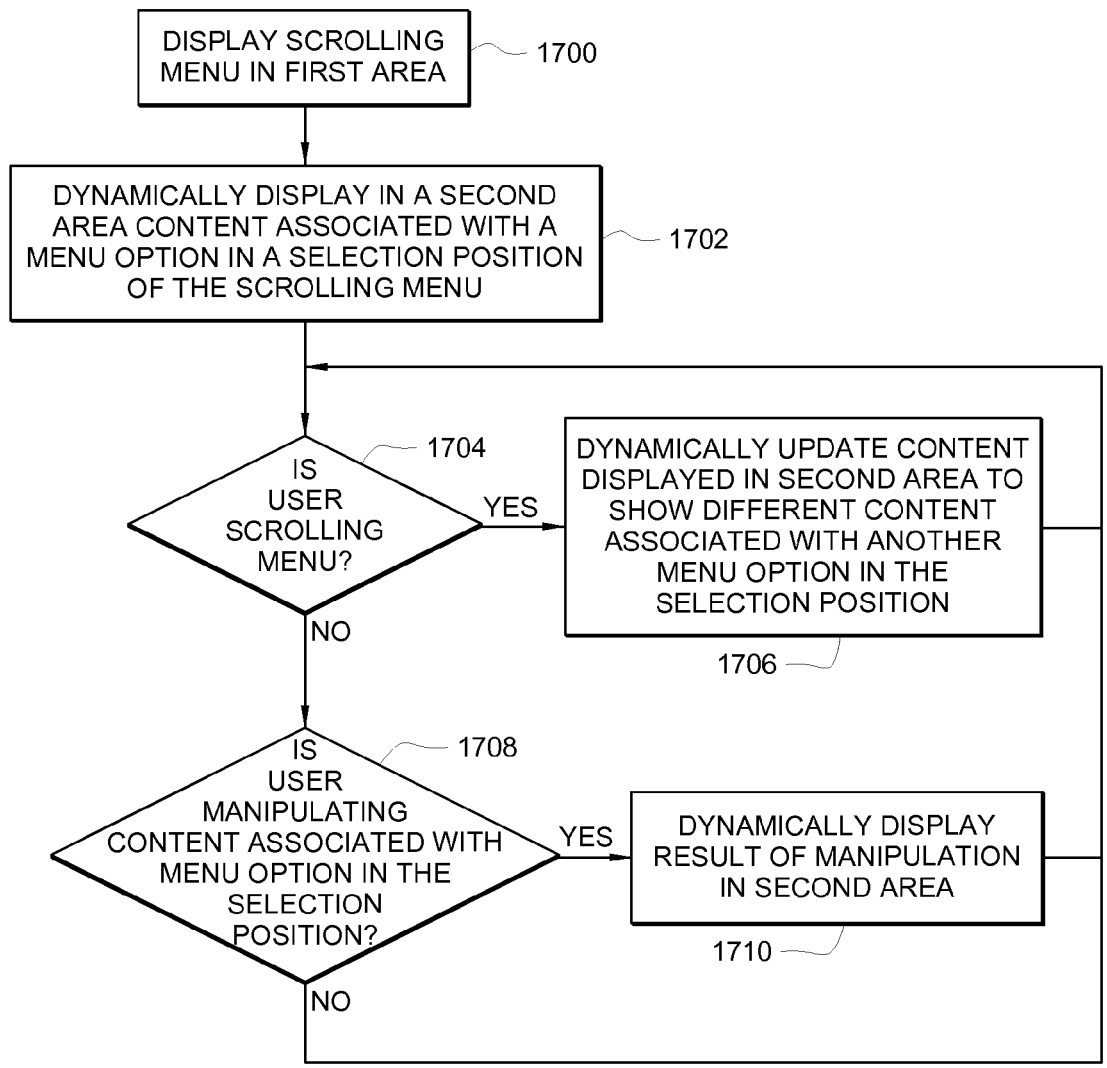
FIG. 29 illustrates an exemplary method according to an embodiment of the present disclosure.

Referring now to FIG. 29, a method is shown for navigating the scrolling menu functions with a user interface in accordance with embodiments of the present disclosure. The user interface displays the scrolling menu in the first area of the available display space (block 1700). The user interface also dynamically displays in the second area of the available display space content associated with a menu option in the selection position of the scrolling menu (block 1702). The term "dynamic display" is intended to indicate that as the scrolling menu is scrolled in any direction (e.g., up and down for a vertical scrolling menu or right and left for a horizontal scrolling menu), the content displayed in the second area is changed at the same rate at which the scrolling menu is scrolled. When each menu option (i.e., a function icon) is within the selection position of the scrolling menu, the content associated with that particular function is displayed, and the instant that the function within the selection position changes (i.e., due to movement of the scrolling menu by the user), the content displayed in the second area is also updated.

If the user is scrolling the menu (at block 1704), the user interface dynamically updates the content displayed in the second area to show different content (i.e., the content associated with the menu option presently shown in the selection position) (block 1706). As described previously, the scrolling menu may be scrolled by the user at any rate, based on the comfort level of the user with the media enabled shopping system.

If the user is not scrolling the menu at block 1704, then if the user is manipulating the content associated with the menu option in the selection position (at block 1708), the user interface dynamically displays in the second area the result of manipulation of the content (block 1710).

In the method described with respect to FIG. 29, one menu option of the plurality of menu options may include the price check function. As such, the content associated with the menu option for the price check function dynamically displays a prompt to the user to scan an item at the cart to determine a price for the item, and upon detecting that an item has been scanned, dynamically displays the result of the manipulation of the content, i.e., displays a price for the item.

In the method described with respect to FIG. 29, one menu option of the plurality of menu options may include the store special function. As such, the content associated with the menu option for the store special function dynamically displays at least one sale item (and preferably a list of the store's regular specials), and a price for the sale item. Upon selection of a particular sale item by the user to view a location for the sale item (i.e., manipulation of the content), the result of the manipulation of the content is displayed, that is the location for the sale item in a store map.

In the method described with respect to FIG. 29, one menu option of the plurality of menu options may include the item finder function. As such, the content associated with the menu option for the item finder function dynamically displays an alphanumeric keyboard display, enabling entry of an item name. Upon entry of letters (resulting in dynamic display of valid combinations of the entered letters), and listing products of the valid combinations of the entered letters, and selection of an item from the list by the user (i.e., manipulation of the content), the result is dynamically displayed, that is the location for the entered and selected item in a store map. Generating the list of products of the valid combination of entered letters may include accessing a database of items in the store to display each item containing each letter or number successively entered in the alphanumeric keyboard, narrowing the list of items contained with each letter entered.

In the method described with respect to FIG. 29, one menu option of the plurality of menu options may include the help function. As such, the content associated with the menu option for the help function dynamically displays a step-by-step explanation of use of the menu option to which the user most recently scrolled. Alternatively, the content associated with the menu option for the help function may display an index of topics for frequently asked questions, and upon selection of a topic from the index (i.e., manipulation of the content), the result is dynamically displayed, that is the answer to the selected topic.

With the content associated for each menu option, the user interface may additionally display advertising associated with the content associated with the menu option. In the sense used here, the "associated" advertising may include advertising for an item in the associated content (such as advertising for an item entered in the item finder function associated content), advertising for a competing item (such as advertising for an item that competes with an entered in the price check function associated content), or advertising simply relevant based on the location of the cart within the store.

Optionally, prior to display by the user interface, the user interface may generate a prompt to a user to perform an action, such as a prompt to the user that instructs the user to scan a loyalty card. Upon the user scanning a loyalty card, the plurality of menu options available for that user to choose in the scrolling menu may be broadened (if an advanced user), or limited (if a basic user).

In various embodiments, a price check may be performed locally, without accessing the store server to obtain a price for a particular item. In such embodiments, as in earlier described embodiments, the consumer 85 scans a product using the scanner 215. A price database may be maintained locally in the ECM 200 of the cart 10, such that a price check accesses the local database of prices, rather than obtaining the price wirelessly from the store server. Prices in the price database may be regularly updated, such as each night, or each time a cart is placed in the cart corral, in order for prices to stay up-to-date. Prices may alternatively be updated in real time, by wireless downloads of price changes to the price database at any time.

Figure 30:
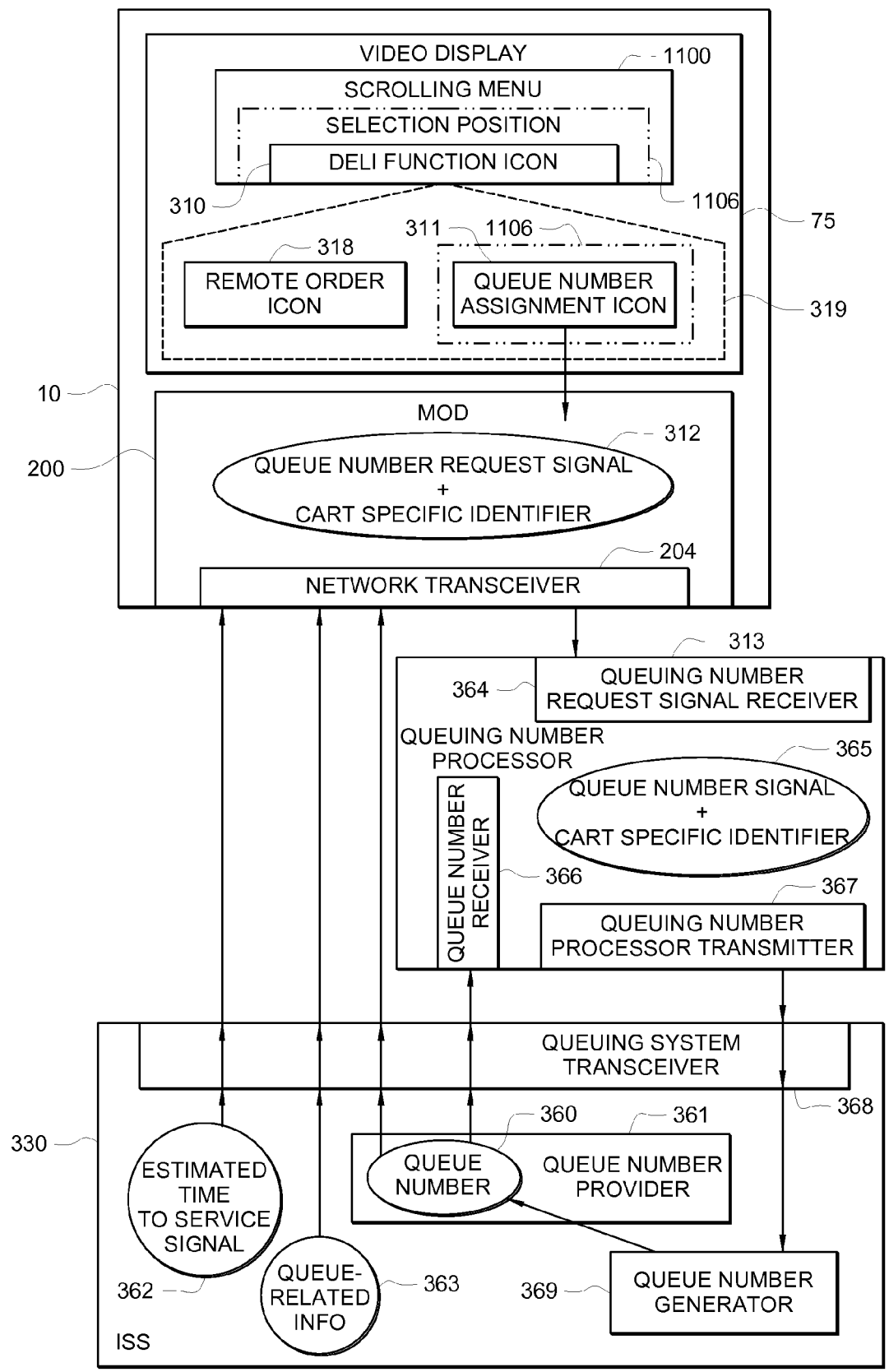
FIG. 30 illustrates a block diagram of a cart enabled for remote queuing according to an embodiment of the present disclosure.

As mentioned above, the scrolling menu 1100 may include a number of different functions, including, for example, enabling a consumer 85 to remotely request and secure a place in a store department's service queue. In one embodiment as shown in FIG. 30, a consumer 85 can navigate the scrolling menu 1100 with the five way navigation device 123 and scroll the store's deli function icon 310 into the selection position 1106. Once the deli function icon 310 has been scrolled into the selection position 1106, the content associated with the deli function icon 310, including a request for a queue number assignment icon 311 is displayed in some of the remaining space visible in the video display 75. The consumer 85 may then use the five way navigation device 123 to move the selection position 1106 from the deli function icon 310 to the displayed content associated with the deli function icon 310 and scroll the queue number assignment icon 311 into the selection position 1106 and activate the queue number assignment icon 311 to request a deli queue number 360. This would be the equivalent of going to the deli and tearing off a paper tag to enter the deli queue.

In an embodiment, as shown in FIG. 30, when the consumer 85 activates the queue number assignment icon 311, this authorizes the ECM 200 to generate a queue number request signal with a cart specific identifier 312 that is communicated to a queuing number processor 313 via the network transceiver 204. The network transceiver 204 is one of a number of electronic queue number-related information receivers employed in this electronic queuing system. Other electronic queue number-related information receivers include a queue number request signal receiver 364, a queue number receiver 366, and a queuing system transceiver 368. Transmit and receive functions may be carried out by separate components or a common component (e.g., transceiver) as will be understood by those skilled in the art. The network transceiver 204 transfers the queue number request signal with a cart specific identifier 312 to the queuing number processor 313 via a wireless link between the network transceiver 204 and the queuing number processor 313. The queue number processor 313 may generally analogized to, or recognized as, a typical queue number dispenser that may be found in various automotive, pharmacy, photo lab, and deli service areas. These dispensers, like the queue number processor 313 of the instant disclosure, may be configured to provide hard and/or electronic notice of the queue number place assigned to a requesting customer. Additionally, these devices may be networked so that direct requests for queue positions, e.g., physically pulling a tab from a dispenser, and remote requests for queue positions, e.g., the cart based request described below, may be coordinated and allocated in the most efficient and customer friendly manner. The queuing number processor 313 is configured with a queue number request signal receiver 364 to receive the queue number request signal with a cart specific identifier 312. The queuing number processor 313 is also configured to generate successive queue number signals with a cart specific identifier 365 in response to queue number request signals 312. The queuing number processor 313 communicates the queue number signal with a cart specific identifier 365 to the ISS 330 via the queuing number processor transmitter 367 and the store's WLAN. The ISS 330 receives the queue number signal with a cart specific identifier 365 via its queuing system transceiver 368. The ISS 330 determines where in the service queue to place the cart 10 associated with the queue number request signal with a cart specific identifier 312. The ISS 330 is configured with a queue number generator 369 for generating a queue number 360. The ISS 330 is also configured with a queue number provider 361 that operates to communicate the assigned queue number 360, to the cart 10 and to the queuing number processor 313, via the queuing system transceiver 368 and the store's WLAN. The cart 10 receives assigned queue number 360 by way of the network transceiver 204. The queuing number processor 313 receives the assigned queue number 360 by way of the queue number receiver 366. When determining where in the queue to place the cart 10 associated with the queue number request signal with a cart specific identifier 312, the ISS 330 may consider: the distance the cart 10 has to travel to reach the service queue; the number of requests for queue numbers, both non-remote and direct (e.g., walkups), over a period of time; the items contained on the consumer's 85 shopping list that has been uploaded onto the cart 10; the loyalty or preferred status of the consumer 85; allowing for the availability of sufficient and efficient queue numbers for store consumer 85s choosing to directly obtain a queue number from the service queue; and any other factors relating to placing the cart 10 associated with the queue number signal with a cart specific identifier 312 into the service queue, other than mere sequential requests for queue numbers. The ISS 330 may also generate and communicate an estimated time to service signal 362 to the cart 10 via queuing system transceiver 368 and the store's WLAN which is received by the cart 10 by the network transceiver 204. The ISS 330 may also generate other queue number-related information 363, such as the current queue number being served, and communicate that other queue number-related information 363 to the cart 10 via the store's WLAN which is received by the cart 10 by the network transceiver 204.

Figure 31:
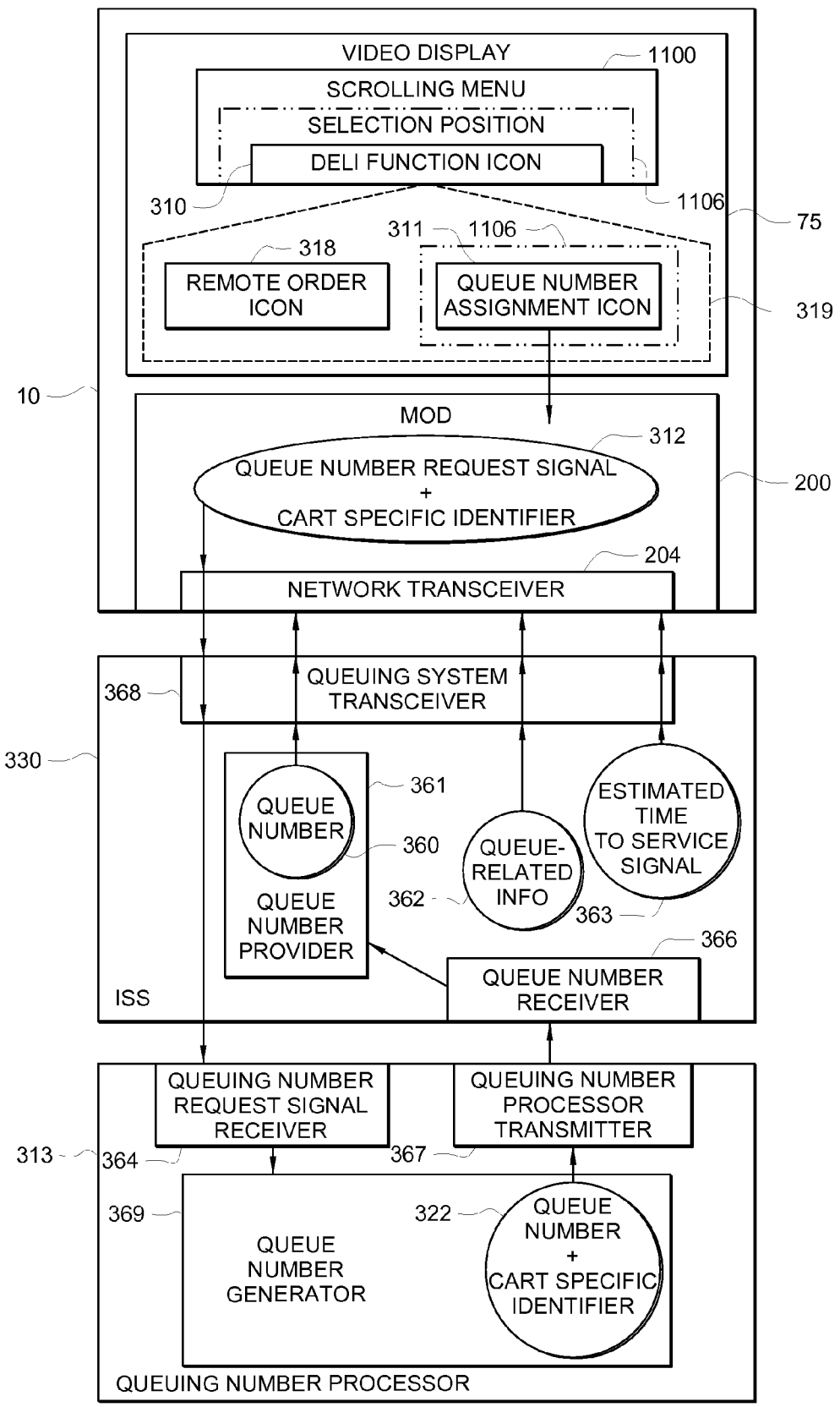
FIG. 31 illustrates still another block diagram of a cart enabled for remote queuing.

While the above details one embodiment of the remote service queuing functionality of the cart 10, FIG. 31 represents another embodiment whereby the consumer 85 activates the queue number assignment icon 311, this authorizes the ECM 200 to generate a queue number request signal with a cart specific identifier 312 that is communicated to the ISS 330 by the network transceiver 204 via the WLAN. The network transceiver 204 is one of a number of electronic queue number-related information receivers employed in this electronic queuing system. Other electronic queue number-related information receivers include a queue number request signal receiver 364, a queue number receiver 366, and a queuing system transceiver 368. The ISS 330 receives the queue number request signal with a cart specific identifier 312 by way of the queuing system transceiver 368 and utilizes the queuing system transceiver 368 to query the queuing number processor 313 for a queue number 360. The queuing number processor 313 is configured with a queue number request signal receiver 364 to receive the queue number request signal with a cart specific identifier 312. The queuing number processor 313 is also configured with a queue number generator 369 to generate successive queue numbers with cart specific identifiers 322 in response to queue number request signals 312. The queuing number processor 313 communicates a generated queue number with a cart specific identifier 322 to the ISS 330 via the queuing number processor transmitter 367. The ISS 330 receives the queue number with a cart specific identifier 322 by way of the queue number receiver 366. The ISS 330 is also configured with a queue number provider 361 that operates to communicate the assigned queue number 360 to the cart 10 via the queuing system transceiver 368 and the store's WLAN. The ISS 330 may also generate and communicate an estimated time to service signal 362 to the cart 10 via the store's WLAN which is received by the cart 10 by the network transceiver 204. The ISS 330 may also generate other queue number-related information 363, such as current queue number being served, and communicate that other queue number-related information 363 to the cart 10 via the store's WLAN which is received by the cart 10 by the network transceiver 204.

Figure 32:
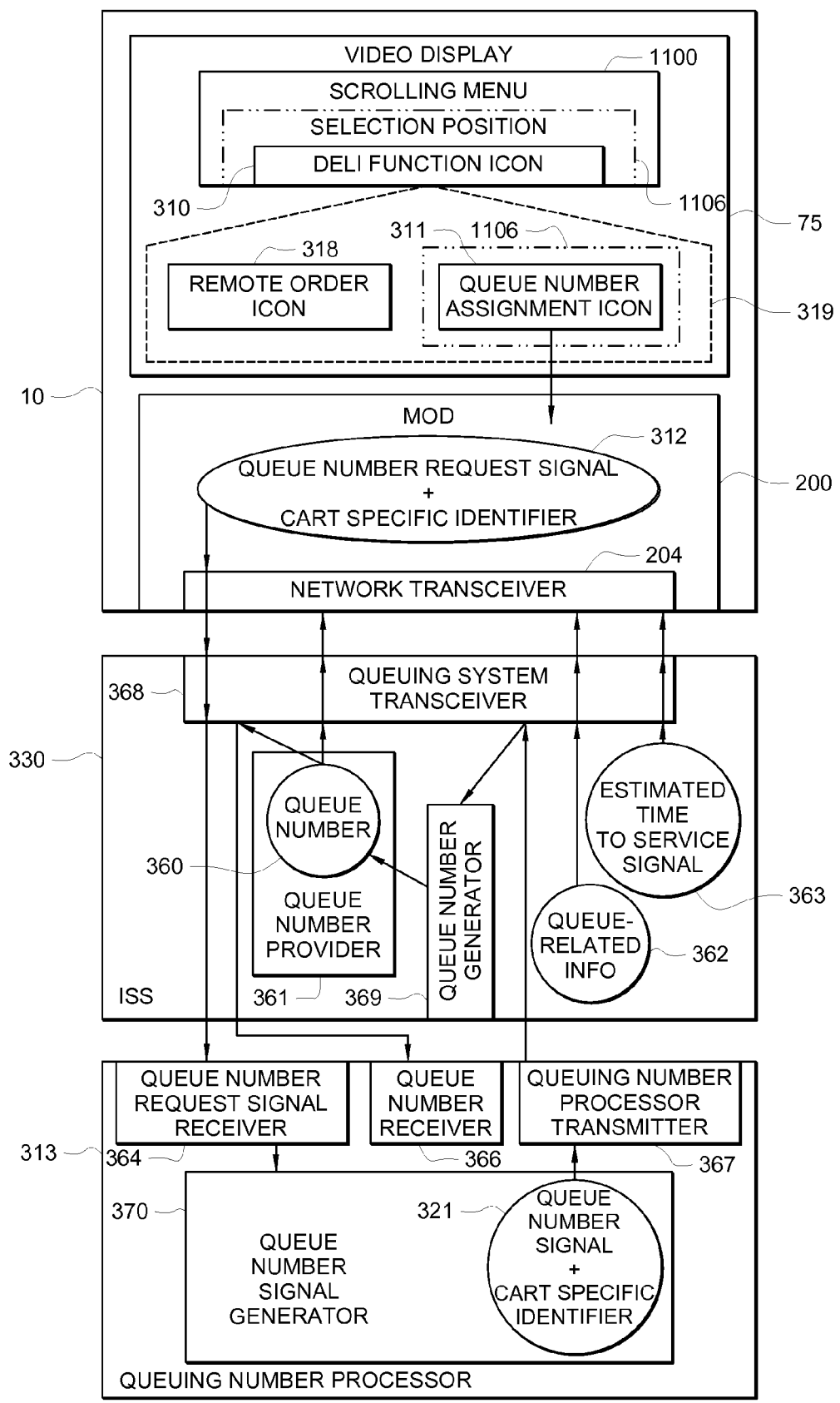
FIG. 32 illustrates yet another block diagram of a cart enabled for remote queuing.

FIG. 32 depicts another embodiment whereby the consumer 85 activates the queue number assignment icon 311, this authorizes the ECM 200 to generate a queue number request signal with a cart specific identifier 312 that is communicated to the ISS 330 via the network transceiver 204. The network transceiver 204 is one of a number of electronic queue number-related information receivers employed in this electronic queuing system. Other electronic queue number-related information receivers include a queue number request signal receiver 364, a queue number receiver 366, and a queuing system transceiver 368. The network transceiver 204 transfers the queue number request signal with a cart specific identifier 312 to the ISS 330 via a wireless link between the network transceiver 204 and the ISS 330. The ISS 330 communicates the queue number request signal with a cart specific identifier 312 to the queuing number processor 313 via the queuing system transceiver 368 and the store's WLAN. The queuing number processor 313 is configured with a queue number request signal receiver 364 to receive the queue number request signal with a cart specific identifier 312. The queuing number processor 313 is also configured with a queue number signal generator 370 to generate successive queue number signals with a cart specific identifier 321 in response to queue number request signals 312. The queuing number processor 313 communicates the queue number signal with a cart specific identifier 321 to the ISS 330 via the queuing number processor transmitter 367 and the store's WLAN. The ISS 330 receives the queue number signal with a cart specific identifier 321 by way of the queuing system transceiver 368. The ISS 330 determines where in the service queue to place the cart 10 associated with the queue number signal with a cart specific identifier 321, and utilizes the queue number generator 369 to generate a queue number 360. When determining where in the queue to place the cart 10 associated with the queue number signal with a cart specific identifier 321, the ISS 330 may consider: the distance the cart 10 has to travel to reach the service queue; the number of requests for queue numbers, both non-remote and direct over a period of time; the items contained on the consumer's 85 shopping list that has been uploaded onto the cart 10; the loyalty or preferred status of the consumer 85; allowing for the availability of sufficient and efficient queue numbers for store consumer 85s choosing to directly obtain a queue number from the service queue; and any other factors relating to placing the cart 10 associated with the queue number signal with a cart specific identifier 321 into the service queue, other than mere sequential requests for queue numbers. The ISS 330 is also configured with a queue number provider 361 that operates to communicate the assigned queue number 360, to the cart 10 and to the queuing number processor 313, via the queuing system transceiver 368 and the store's WLAN. The ISS 330 may also generate and communicate an estimated time to service signal 362 to the cart 10 via the store's WLAN which is received by the cart 10 by the network transceiver 204. The ISS 330 may also generate other queue number-related information 363, such as the current queue number being served, and communicate that other queue number-related information 363 to the cart 10 via the store's WLAN which is received by the cart 10 by the network transceiver 204.

Figure 33:
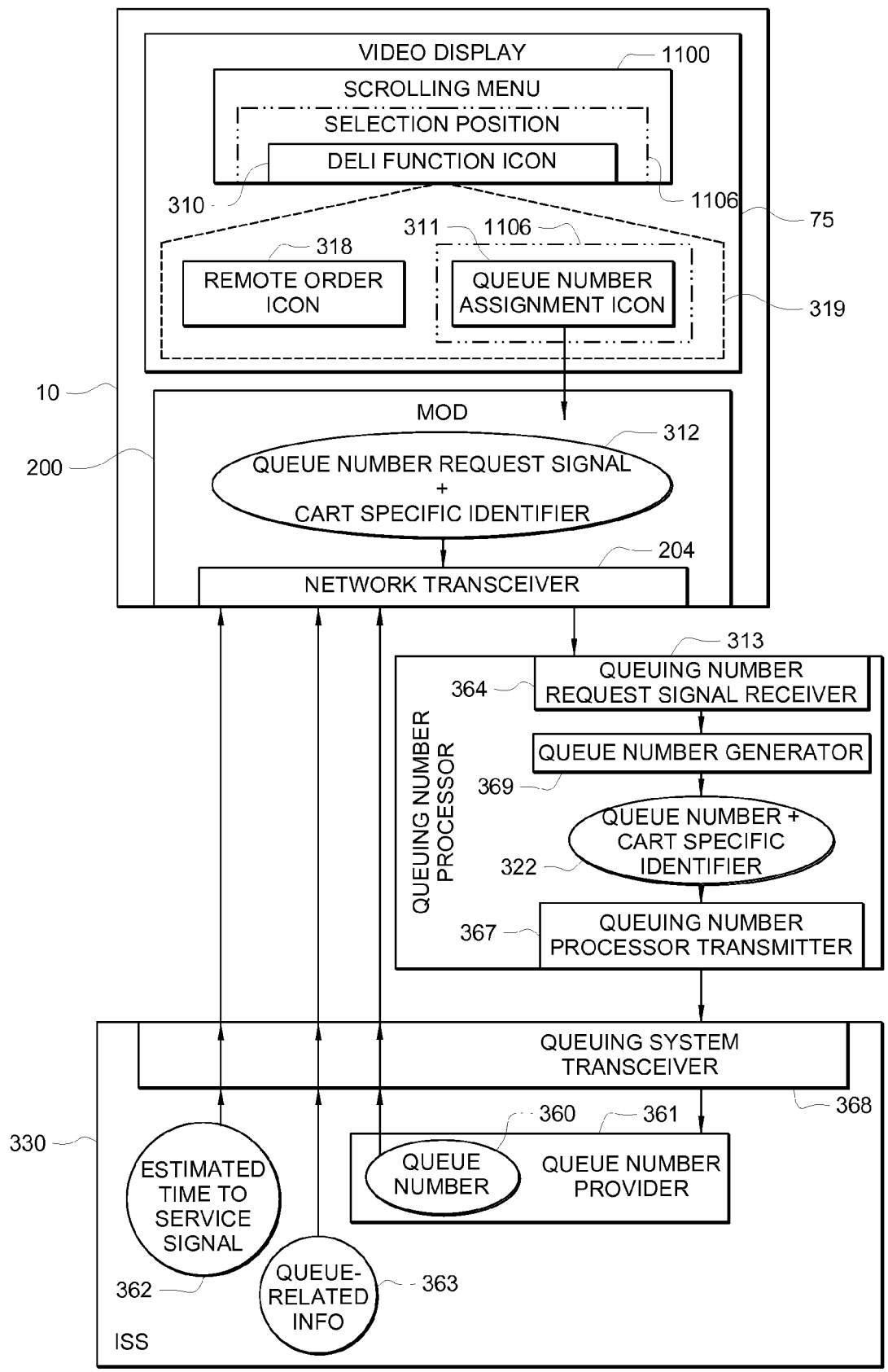
FIG. 33 illustrates still another block diagram of a cart enabled for remote queuing.

In yet another embodiment, as shown in FIG. 33, the consumer 85 activates the queue number assignment icon 311, this authorizes the ECM 200 to generate a queue number request signal with a cart specific identifier 312 that is communicated to a queuing number processor 313 via the network transceiver 204. The network transceiver 204 is one of a number of electronic queue number-related information receivers employed in this electronic queuing system. Other electronic queue number-related information receivers include a queue number request signal receiver 364 and a queuing system transceiver 368. The network transceiver 204 transfers the queue number request signal with a cart specific identifier 312 to the queuing number processor 313 via a wireless link between the network transceiver 204 and the queuing number processor 313. The queuing number processor 313 is configured with a queue number request signal receiver 364 to receive the queue number request signal with a cart specific identifier 312. The queuing number processor 313 is also configured with a queue number generator 369 to generate successive queue numbers with cart specific identifiers 322 in response to queue number request signals 312. The queuing number processor 313 communicates a queue number with a cart specific identifier 322 to the ISS 330 via the queuing number processor transmitter 367. The ISS 330 receives the queue number with cart specific identifier 322 by way of the queuing system transceiver 368. The ISS 330 is also configured with a queue number provider 361 that operates to communicate the assigned queue number 360, to the cart 10 via the queuing system transceiver 368 and the store's WLAN. The ISS 330 may also generate and communicate an estimated time to service signal 362 to the cart 10 via the store's WLAN which is received by the cart 10 by the network transceiver 204. The ISS 330 may also generate other queue number-related information 363, such as the current queue number being served, and communicate that other queue number-related information 363 to the cart 10 via the store's WLAN which is received by the cart 10 by the network transceiver 204.

Figure 34:
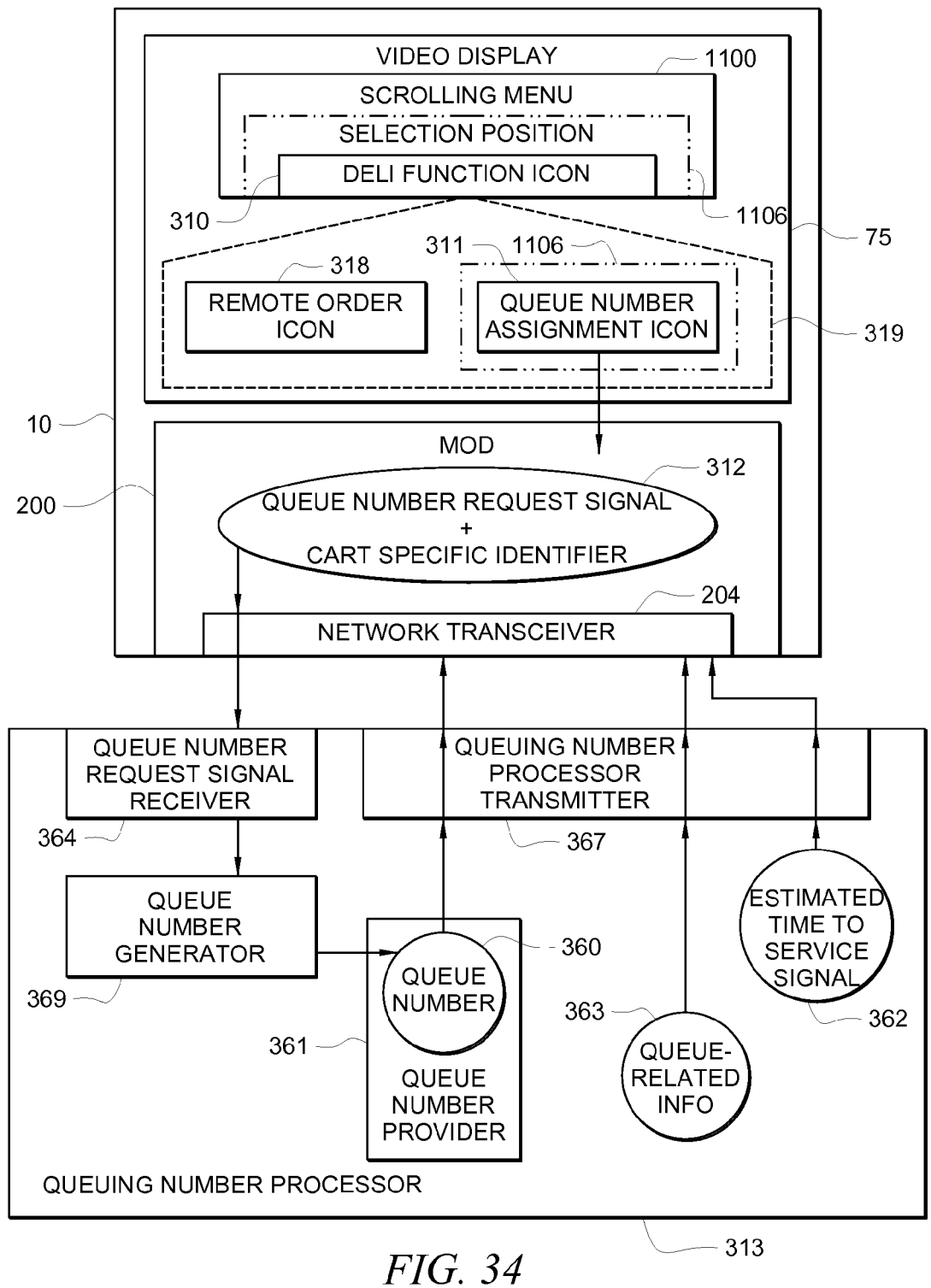
FIG. 34 illustrates again another block diagram of a cart enabled for remote queuing.

In an additional embodiment, as shown in FIG. 34, the consumer 85 activates the queue number assignment icon 311, this authorizes the ECM 200 to generate a queue number request signal with a cart specific identifier 312 that is communicated to a queuing number processor 313 via the network transceiver 204. The network transceiver 204 is one of a number of electronic queue number-related information receivers employed in this electronic queuing system. Other electronic queue number-related information receivers include a queue number request signal receiver 364. The network transceiver 204 transfers the queue number request signal with a cart specific identifier 312 to the queuing number processor 313 via a wireless link between the network transceiver 204 and the queuing number processor 313. The queuing number processor 313 is configured with a queue number request signal receiver 364 to receive the queue number request signal with a cart specific identifier 312. The queuing number processor 313 is also configured with a queue number generator 369 to generate successive queue numbers in response to queue number request signals 312. The queuing number processor 313 is also configured with a queue number provider 361 that operates to communicate the assigned queue number 360, to the cart 10 via the queuing number processor transmitter 367 and the store's WLAN. The queuing number processor 313 communicates an assigned queue number 360 to the cart 10 via the store's WLAN which is received by the cart 10 by the network transceiver 204. The queuing number processor 313 may also generate and communicate an estimated time to service signal 362, or other queue number-related information 363, such as the current queue number being served, to the cart 10 via the queuing number processor transmitter 367 and the store's WLAN, which is received by the cart 10 by the network transceiver 204. In embodiments, the queuing number processor 313 may be a stand alone component (e.g., a computer located in a service area), may be part of the ISS 330, or may otherwise be integrated or networked into a local area network within the store. In various embodiments, the queuing number processor 313 may receive the queue number request signal, generate a queue number, and provide the queue number to the cart.

Figure 35:
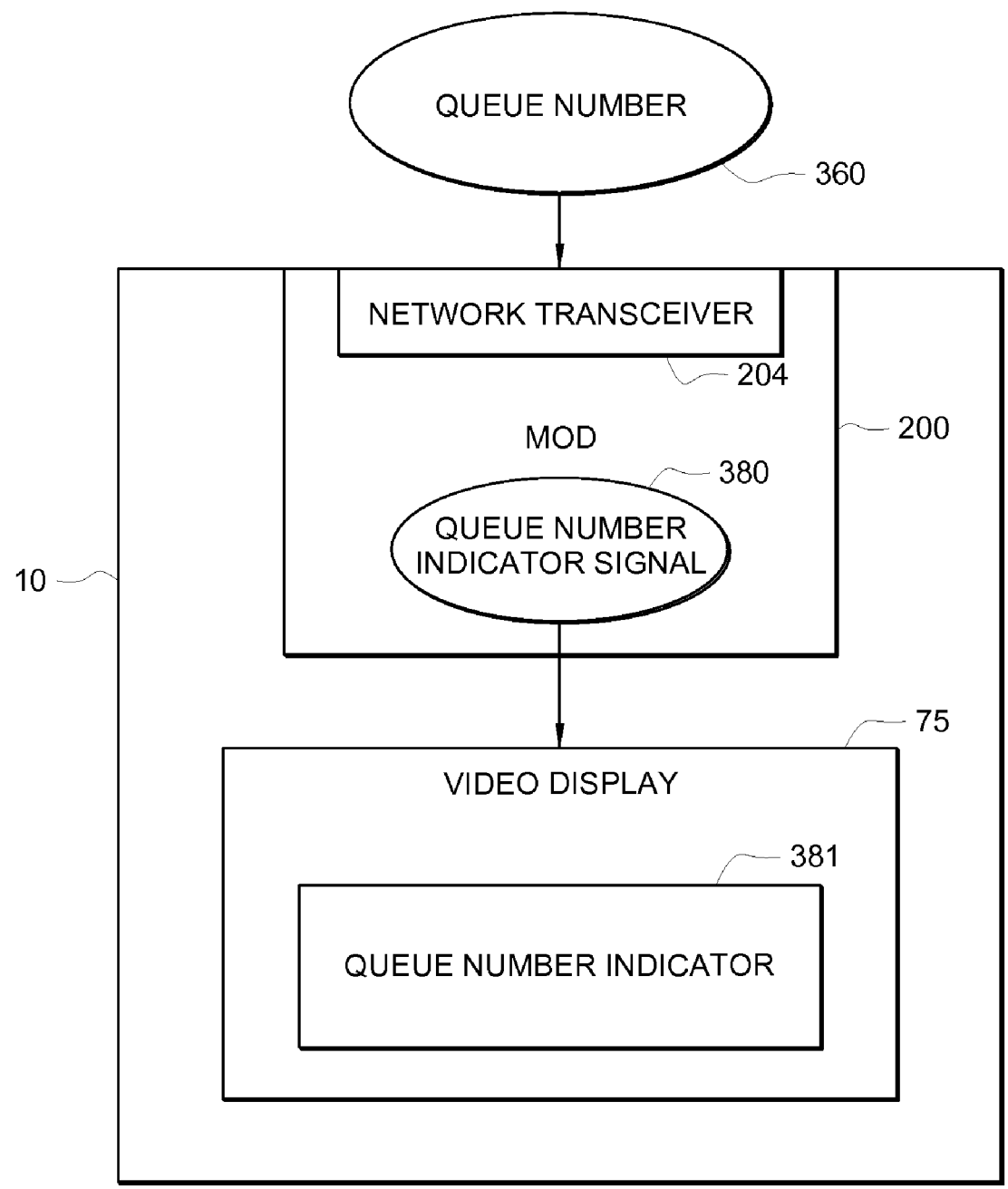
FIGS. 35-38 illustrate a series of block diagrams reflecting various embodiments of cart-based information presentations of the present disclosure.
Figure 36:
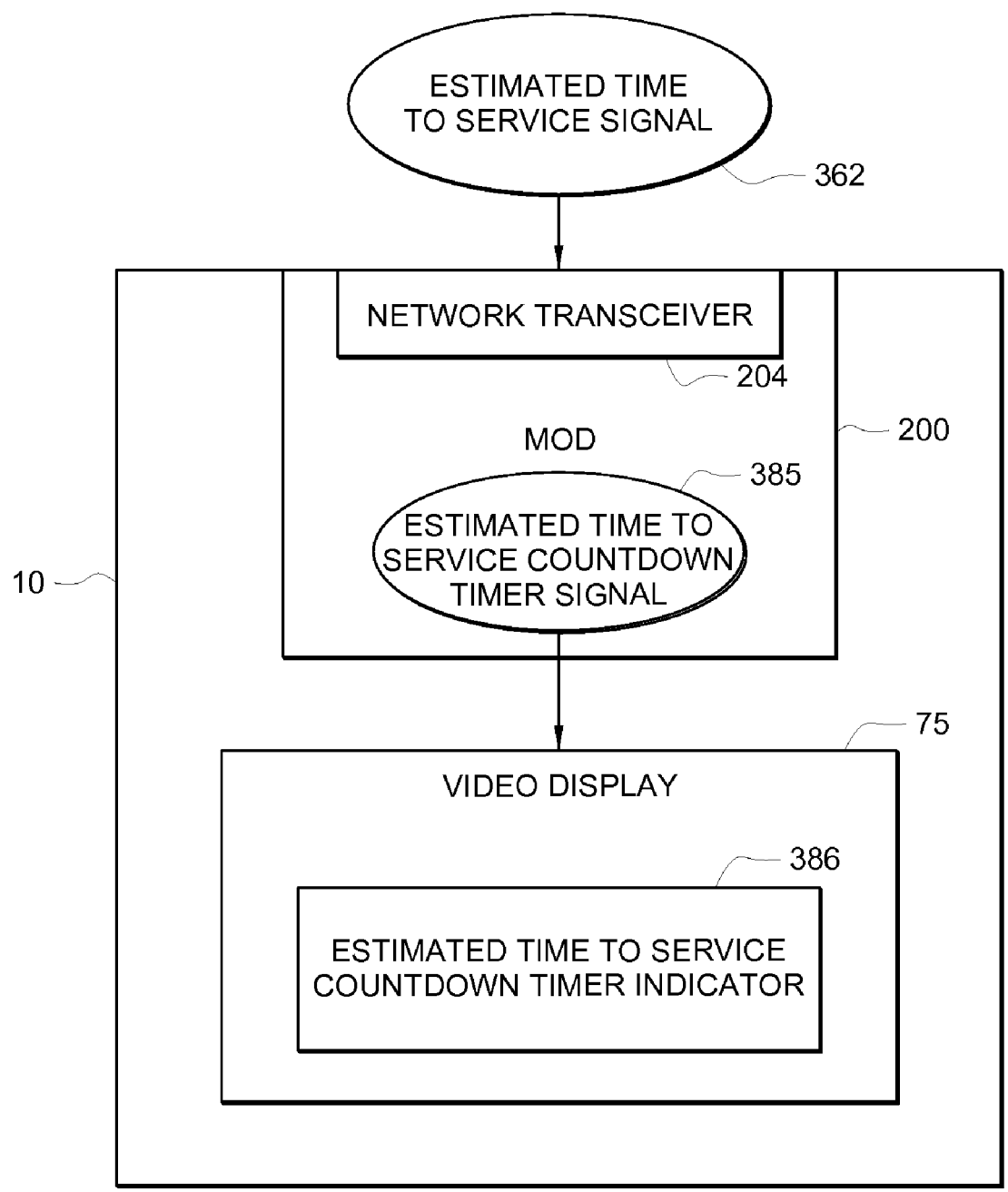
Figure 37:
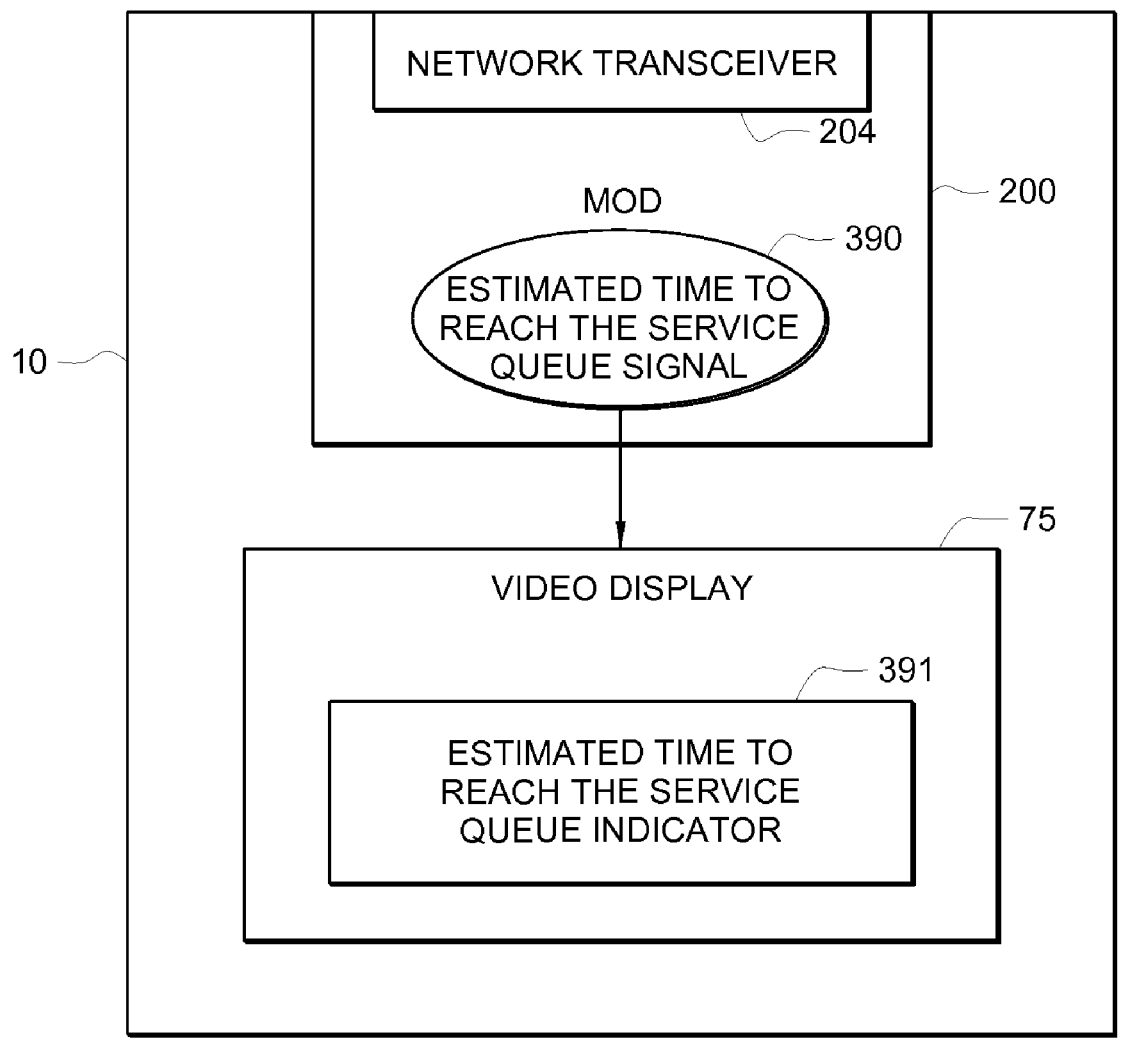
Figure 38:
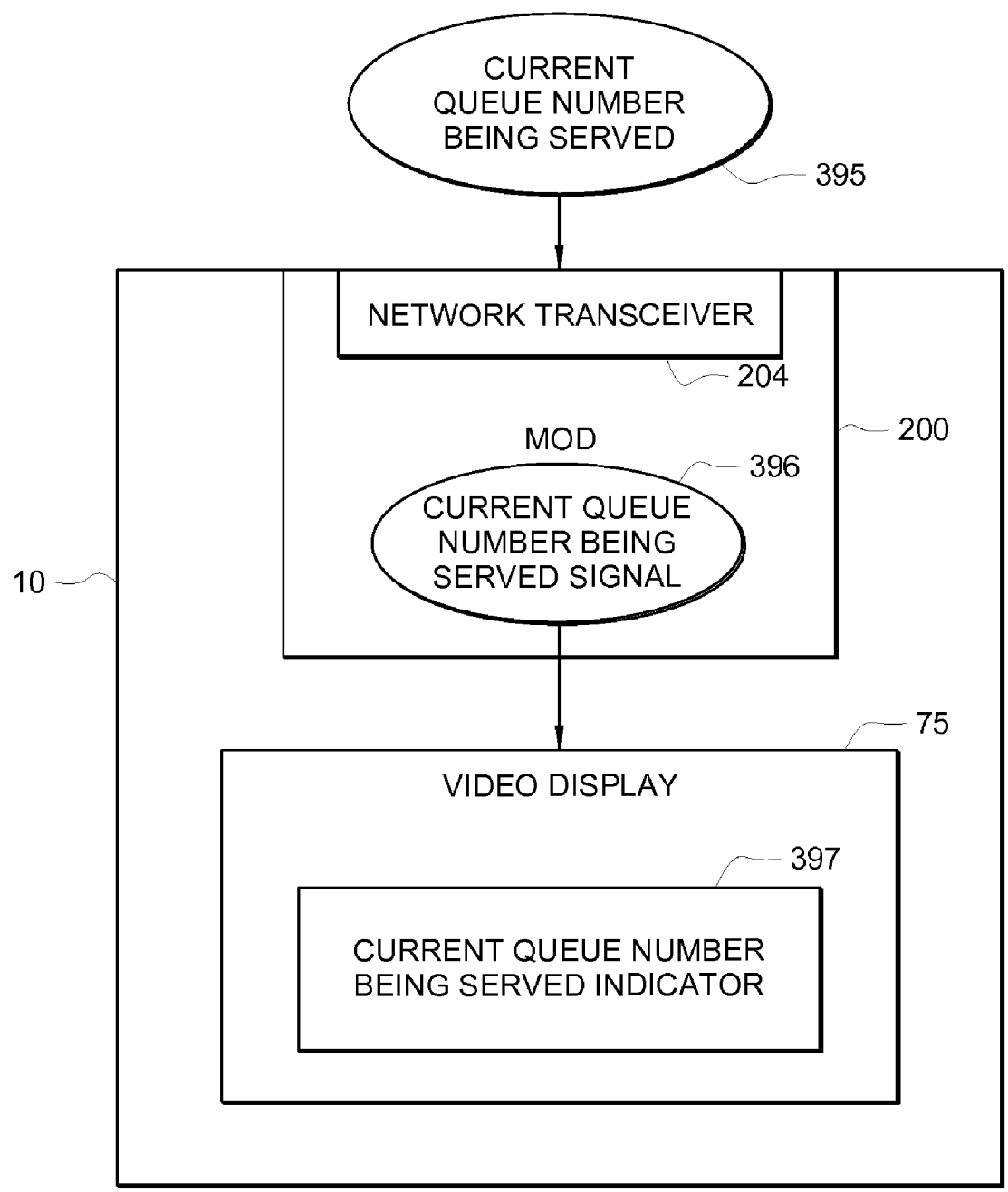

As shown in FIG. 35, upon receipt of the assigned queue number 360, the ECM 200 generates a queue number indicator signal 380 and directs the video display 75 to display a queue number indicator 381 which informs the consumer 85 of his queue number 360. As shown in FIG. 36, in response to the receipt of an estimated time to service signal 362 the ECM 200 generates an estimated time to service countdown timer 385 and directs the video display 75 to display the estimated time to service countdown timer indicator 386 which informs the consumer 85 of the estimated time to service. As shown in FIG. 37, the ECM may also generate an estimated time to reach the service queue timer and communicate an estimated time to reach the service queue signal 390 to the video display 75 directing the video display 75 to display an estimated time to reach the service queue timer indicator 391 which informs the consumer 85 of the estimated time to reach the service queue. Additionally, as shown in FIG. 38, the queuing system may provide additional information related to the service queues to the ECM 200, such as information related to the current queue number being served 395. Upon receipt of this information, the ECM 200 may a generate a current queue number being served signal 396 and direct the video display 75 to display a current queue number being served indicator 397 to inform the consumer 85 of the current queue number being served. The information shown in FIGS. 35-38 may be shown individually or in various combinations (e.g., sequentially or simultaneously).

In the same manner as a position in a deli queue may be secured, positions in a butcher queue, bakery queue, pharmacy queue, automotive services queue, photo queue, or any other service department queue maintained by a store may also be secured.

In an embodiment, the cart 10 is additionally operable for various Shelf Management activities, such as, but not limited to, taking inventory, enabling price changes, product reorganization, restocking, returning misplaced products to the proper shelf location, and the like. The shelf management features enabled by use of the cart 10 are used by the retailer to electronically manage product location and pricing in the store.

In an embodiment, the aisle RFID reader 225 with antennas 226 may also scan individual products on the shelves 301 and 302 that are labeled with individual RFID tags. In this embodiment, the aisle RFID reader 225 with antennas 226 may scan, identify, and count each individual product by means of the individual RFID tag, and convey this information via the ECM 200/network transceiver 204 to other network components to be discussed herein in greater detail below, enabling retailers to manage the store inventory to an exacting degree of accuracy on a continuous basis. Furthermore, all or a portion of the aisle tags 303 and 304 may be replaced via products labeled with individual RFID tags, and the system may otherwise function as described herein.

The aisle RFID reader 225 and antennas 226 may assist the store management with store planograms and inventory. A planogram is a diagram of fixtures and products that illustrates how and where retail products should be displayed, usually on a store shelf, bin or counter in order to influence consumer selection. Consumer packaged goods manafacturers often release a suggested planogram with their new product, to show how it relates to existing products in the same category, though stores also develop planograms of their own. Because a planogram involves the location of products within the store, the aisle RFID reader 225 and antennas 226 can detect the location of products at the Stock Keeping Unit ("SKU") level. Many inventory management systems assign a unique SKU for each product and also for its variants, and SKUs are assigned and serialized at the merchant level.

In use, when a cart 10 is moved through the store, the aisle RFID reader 225 and antennas 226 scan the SKU assigned to product lines or product bundles on the shelves 301 and 302 that are labeled with individual RFID tags, each RFID tag being associated with a SKU. In this embodiment, the aisle RFID reader 225 with antennas 226 may scan, identify, and locate each product line or bundle by means of the RFID tag, and convey this information via the ECM 200/network transceiver 204 to other network components to be discussed herein in greater detail below, enabling retailers to locate products throughout the store to manage, update and design the store planogram in an efficient and consistent manner.

The cart 10 enables re-mapping of the store. As discussed above, taking the cart 10 through various paths in the store following rearrangement of products will result in the cart 10 reading the RFID tags (e.g., SKU and/or product level tags) marking the new locations of each moved product relative to the anchor RFID tags (e.g., shelf level tags that have not moved), and convey the new locations to the system, such that the location of products in the store readily updated in relationship to the base store map.

Additionally, the cart 10 enables inventory that may be performed on an on-going basis with real-time updates for stores that sell products identified at the product level by an RFID tag. When any cart 10 reads no product level RFID tags at a location (marked by an anchor) where products are expected to be, the cart 10 may convey this information to the store system to update the inventory for the products that are no longer filling the shelves where expected. This allows real-time product inventory and restocking.

An employee is enabled by the cart 10 to quickly reshelve products that are misplaced, such as when a consumer decides not to purchase a product and leaves it at the Point of Purchase or in a location other than where the product is shelved. By using the shelf management system of the cart 10, the employee may scan the misplaced product, and according the map, be directed to the location in the store where the scanned product is supposed to be shelved. The employee may even confirm that he or she is putting the product back in the appropriate location by scanning the sticker located on the shelf, because the sticker, usually with a price indicated, is associated with a specific location for a specific product.

When the store implements price changes for a list of products, an employee or group of employees usually must go around the store, find all the products with changed prices, and swap out signs and labels, which can be a time consuming task that occurs at regular intervals (e.g., weekly specials). The cart 10 enables an efficient process for dynamically changing prices for products accurately and quickly.

Figure 22:
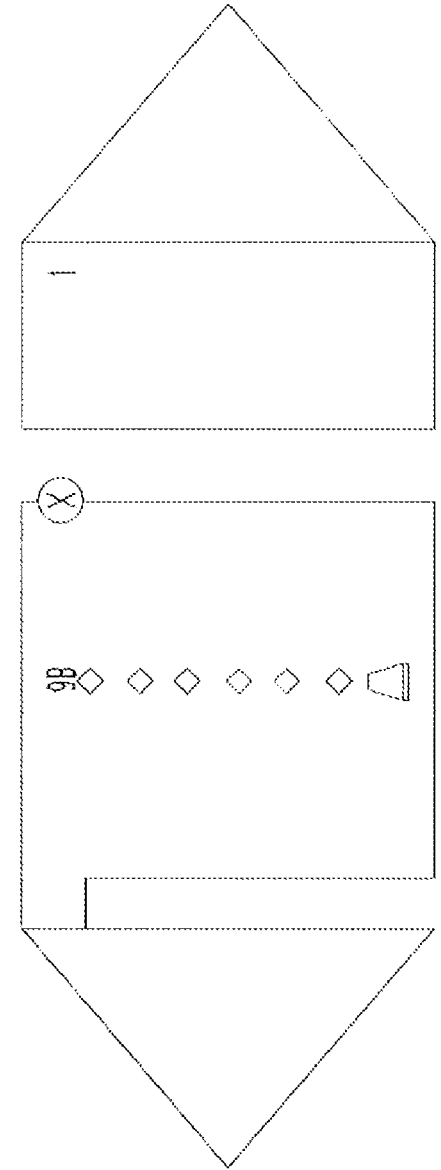
FIG. 22 illustrates a graphical user interfaces (GUI) to be presented via a video display to an employee user of the media enabled shopping cart.

Specifically, for the price change process enabled by the cart 10, price changes, such as for weekly specials and the like, are entered in a database of prices in the store system. An employee may then use a cart in shelf management mode to go throughout the store to change labels. A battery powered, wireless printer may be placed in the cart 10, such as in the child seat 60, and operably coupled (e.g., wired or wireless, such as Bluetooth, wi-fi, or infra red) to the ECM 200 for printing new price labels when the cart is located in the right location for a given product. The employee identifies himself or herself to the cart 10 by scanning an employee badge, much like scanning a loyalty card, that enables access to the shelf management features unavailable to consumers. The price changes entered into the database are conveyed to the cart's ECM 200 from the store system. Based on known locations of the products listed, the cart 10 displays to the employee a map, as shown in the view of FIG. 22. The view of FIG. 22 shows the list of products for which a price change is being implemented, a location of each product on the list, the old price, the new price, and permits the employee to check a product off the list once the price has been changed.

The employee moves the cart to the location of a product on the list, and when the employee has found the location of the product, he or she may scan one item of the product to confirm that the shelf location is actually the right shelf location for the product on the list. Once the location is confirmed as correct for the product, the employee prints a new label on the wireless printer placed in the cart, and places the new label with the new price over the old label with the old price on the shelf. Once the new label is in place, the employee checks the product off the list, and the cart 10 conveys to the store system that the price change has been implemented at the shelf level. The store system may then charge the new price at the Point of Purchase, thereby allow real-time pricing updates.

In a large store, or in a store holding many specials such as for a holiday weekend, the process of updating for price changes is greatly sped up using one or more carts 10 as discussed herein. Additionally, the price changes are dynamic, in that they take effect as soon as a new price label is in place on the shelf. With the scanning ability of the cart 10 to confirm that the new price label is being placed in the proper location, price changes are also more accurate than relying on any given employee's knowledge of product placement within the store.

As the consumer checks out (i.e. renders payment) at the Point of Sale 300, the POS computer 326 (e.g., computerized register) or POS server 325 may record the purchases made by that consumer 85 using that particular cart 10. The POS computer 326, the POS server 325, and other systems such as security systems or consumer loyalty systems may be referred to generically as retailer systems. Retailer systems provide automated, computerized services with respect to consumer or store needs. In an embodiment, retailer systems may comprise components of the overall store network. In an embodiment, retailer systems may be stand-alone functional units operating separately from the store network. In an embodiment, a retailer system may comprise a point of sale system to interact with individual carts or consumers for processing payment at the conclusion of a shopping trip. In an embodiment, a retailer system may comprise a consumer loyalty system for rewarding consumer loyalty with discounts and other advantages, while tracking shopping history for advertising purpose. In an embodiment, a retailer system may comprise a security system for tracking the location of carts within the store or areas outside the store, such as, for example, alerting the store management to the location of carts when abandoned or broken, whether carts have left the store premises or when carts remain in the parking lot to be returned to the store.

In an embodiment, the cart 10 includes a cart RFID tag that may be read by a POS RFID reader coupled to the POS server computer 326 or POS server 325. The cart RFID tag may be located anywhere on the cart, and in an embodiment is located on or in video display 75, for example in the screen housing 92, 93. In an embodiment, the cart RFID tag is located on or in the video display 75 along with the network transceiver 204. The POS RFID reader may read the cart RFID tag, thereby identifying a specific cart, for example via the cart RFID tag associated with a serial or identification number. Alternatively, the POS system may use a bar code scanner to scan a bar code on the particular cart that uniquely identifies the cart and correlate the bar code with the serial or identification number. Alternatively, the particular cart may be identified and correlated manually at the POS, for example via entry of the serial or identification number labeled on the cart into the POS computer 326. The information obtained, both by checkout (e.g., via bar code and/or basket RFID scanning) and/or by the cart 10 during shopping (e.g., via bar code and/or basket RFID scanning), may be correlated to a particular cart (based on the cart's unique identity) and/or transferred to the ISS 330 and the Host Central Server 340. Such correlation may occur anonymously, for example, without reference to the identity of the consumer. Such information may further be correlated with a specific consumer, for example via scan or entry of a loyalty card, a pin code, a telephone number, or other consumer identifier. Such information may further be correlated with specific advertising displayed during the particular use of the shopping cart.

The basket RFID reader 227 in conjunction with the ECM 200 may have identified and stored the identity of each product placed in the cart 10 during shopping, such that upon approaching the Point of Sale 300, the POS computer 326 may initiate checkout services based on the products for purchase known to be in the cart 10 by the ECM 200, as communicated to the POS computer 326 via the network transceiver 204. Thus, the RFID enablement of the shopping cart and the application of RFID tags at the individual product level will facilitate the shopper's Point of Sale checkout efficiency. Alternatively, the consumer 85 may use the scanner 215 to scan each product placed in the basket, such that upon approaching the Point of Sale 300, the POS computer 326 may initiate checkout services based on the products for purchase known the be in the cart 10 by the ECM 200, as communicated to the POS computer 326 via the network transceiver 204.

In various embodiments, certain features may be additionally available at the Point of Sale. In one embodiment, the cart maintains a running total for items for purchase by the consumer 85 (i.e., the inventory of the cart). The total may be conveyed from the cart to the Point of Sale computer, and confirmed by the consumer 85 for completing the purchase transaction without requiring the inventory of the cart to be scanned over again at the Point of Sale. Upon displaying the cart total from the cart on the Point of Sale computer, the consumer 85 verifies that the amount is accurate, and completes the transaction (i.e., swipes a credit or debit card, completes her check, or provides a sufficient amount of cash).

In other embodiments, at the Point of Sale, the actual cart weight for the inventory of the cart is measured and compared for example to the known, expected weight for the inventory of the cart. Specifically, the cart and the contents are weight and compared to the weight for the cart that is known, and the weight for the contents, known based on the inventory of the cart. A difference between the actual cart weight for the inventory and the known, expected weight indicates a potential problem of theft, and may generate an alert to the store server and/or an employee.

Implementing the improvements described herein, an assisted self-checkout may be performed at a "regular" checkout lane (i.e., a Point of Sale computer equipped for purchase transaction). The consumer 85 proceeds with a shopping trip, scanning items for purchase as she goes, and placing the items in her cart. Upon her approach to the Point of Sale, the ECM 200 on her cart communicates the cart inventory and total from the cart to the Point of Sale computer. When consumer's 85 turn comes to complete the purchase transaction, the consumer's 85 cart 10 and its contents are weighed. In various embodiments, the cart or an employee may instruct the consumer 85 to remove personal items such as a handbag, as well as any child present in the child seat, in order for an accurate measurement of the weight of the cart and its contents. The actual weight of the cart and its contents are compared to the known, expected weight for the cart and the contents: the weight of the contents is calculated based on known weights for each item sold in the store and the inventory of the cart communicated when the consumer 85 approached the Point of Sale. If the actual weight exceeds the known, expected weight, an alert may be generated to notify store security or a store employee to assist the consumer 85 with removing personal items that should not have been included in the actual weight. In various embodiments, the alert is only generated if the weight difference exceeds a predetermined threshold amount.

Upon confirmation of the actual weight relative to the known, expected weight, the Point of Sale computer displays the cart total to the consumer 85 for verification. In an embodiment, the Point of Sale computer asks the consumer 85 "Does the total below equal the total for your cart? If so, press 1, and if not, press 2 for assistance." When the consumer 85 selects "2" if the total does not equal the cart total, a store employee may assist in finalizing the purchase, while when the consumer 85 selects "1," the Point of Sale computer further prompts the consumer 85 to complete the purchase transaction using her preferred method of payment (i.e., a credit card, check, cash, or debit account associated with consumer). The Point of Sale computer accepts the consumer 85's payment, provides any cash back requested by the consumer 85, and the transaction is complete. In embodiments, the entire purchase transaction from the time the consumer 85 enters the Point of Sale transaction is limited only to the amount of time necessary for the consumer 85 to carry out her payment option, with only negligible time used to weigh the cart and contents for comparison and verify the cart total.

In use, the consumer 85 may also use the cart for services that in the related art would require the consumer to find a store employee. Via voice commands delivered to the voice activated interface 120 operably coupled to the ECM 200 and the in-store network, the consumer 85 may request the location of a specific product or request information pertaining to a particular product such as nutritional information, whether any specials for that product are available, and recipes that may incorporate a product. By activating the voice activated interface 120 by way of the five way navigation device 123, the consumer 85 may also contact various in-store services, such as a pharmacy, deli counter, or automotive service station to initiate an order or check on the status of their order. The consumer 85 may additionally contact customer services within the store without waiting in line at a counter, by calling the customer service desk from the voice activated interface, enabling activities such as requesting a rain check or reporting a safety hazard in the store. In other embodiments, the consumer 85 may use the voice activated interface as a means of calling a person or service outside of the store, by using the ECM 200's communication abilities to connect to the Internet, enabling Voice Over Internet Protocol ("VoIP") technology. For example, a consumer 85 may wish to check with their spouse regarding which product to buy or for shopping list products, and may use the VoIP enablement and voice activated interface 120 to call home.

Another in-store use is the bar-code scanning. A consumer 85 may choose to scan their own products with the scanner 215 inset into the handle 22 or pod 150, enabling him to view a running total for the products in the cart 10 for purchase. By scanning the products during the shopping trip using the scanner 215, the scanner 215 enables the consumer 85 to avoid waiting in the checkout lanes, as the ECM 200 may communicate the products being purchased, the price of each product, and the running total, as well as the value of any coupons used and scanned by the consumer 85 to the POS computer 326 upon arriving at the Point of Sale 300. Bar-code scanning during shopping, in conjunction with the cart 10 communicating the scanned inventory to the Point of Sale 300, facilitates more efficient check out services for consumers.

In addition to the voice activated interface 120, the consumer 85 may use a number of the media enhancements of the cart 10 via the five way navigation device inset in the handle 22 or pod 150. The consumer may press the voice activation button 122 (which preferably is a center button of the five way navigation device 123) to activate the voice recognition system as well as to navigate other applications to access certain functions and information on the cart 10 such as product location and other product information. The five way navigation device 123 may be used to maneuver through the menu of options 124 displayed on the video display 75.

As the cart supports voice recognition and additionally connects to the store server wirelessly (and thereby a connection to the Internet is provided to the cart), the cart may be enabled for communication via VoIP. VoIP on the cart offers the ability to call, for example, customer service within the store (for example, to report a spill or ask for assistance), store personnel (i.e. to reach the store manager for a complaint or compliment), and between carts (e.g., for store employees to use in set up, inventory, and the like). In one embodiment, a "call" icon may be provided on the screen of the cart. The user may select the icon either by a voice command or using the five way navigation device, and communicate via VoIP using the wireless internet to the store server, which is tied in turn to the customer service desk or the Internet generally to communicate by VoIP with individuals outside of the store (e.g., call home to check for an ingredient).

With the media enhancements, a consumer 85 will have the capability to formulate a shopping list at home on the Internet, forward the list to the store via email, and upon registering with a cart 10 with a loyalty card or other consumer identifier in the store, have their shopping list displayed on the video display 75 and be guided through the store in aisle and product order, showing specials, promotions, and product location for products on their shopping list.

In various embodiments, the cart provides the consumer 85 with shopper features to enhance the shopping experience. In one shopper feature, the consumer 85 is enabled to save and name shopping lists. In one embodiment, saving and naming shopping lists may be performed from a web site, while in other embodiments, saving and naming shopping lists may be performed directly on the cart. In further embodiments, saving and naming shopping lists may be performed on a mobile device, such as a handheld computer, a Blackberry™, or a mobile telephone, and transferred to the cart wirelessly, by infrared, or by Bluetooth™ enabled technology. Saved shopping lists may be tied to a user identifier, and retrieved upon scanning a loyalty card or other identifying card.

In some embodiments, an additional shopper feature provides a course directing the consumer 85 to each item on the shopping list. A shopping list that comprises, for example, a wedding or baby registry, may include a course providing directions for the consumer 85 to find each item on the list within the store, enabling faster and easier identification of list items for purchase. In various embodiments, the course may be displayed in a graphical representation of the store. In various other embodiments, the course may be generated by displaying at the top of the shopping list the items from the list closest in proximity and in the direction in which the cart is moving, constantly updated as the cart moves.

In another shopper feature, the consumer 85 is enabled to email a recipe or a link to a vendor's web site with a recipe to an email address. The email address may include an email address on file or an email address entered on the cart. In various embodiments, the email address is verified before sending.

In another shopper feature, the consumer 85 is enabled to scan and use coupons at the cart, such that the cart total accurately reflects the price discount provided by the coupons during the shopping trip. In such embodiments, the amount of savings for coupons, and identity of coupons and products for which the coupons are used are conveyed to the Point of Sale computer.

In another shopper feature, a folder of personalized reminders for the consumer 85 is stored. As with the shopping lists, the folder of personalized reminders may be tied to a user identifier, and retrieved upon scanning a loyalty card or other identifying card. Personalized reminders may include greeting card reminders for birthdays, anniversaries, and other holidays. Personalized reminders may additionally include prescription reminders for an in-store pharmacy. In various embodiments, when a reminder is generated by the cart to alert the consumer 85 with a prescription reminder, the consumer 85 may select the reminder to automatically place the prescription order (i.e., refill) with the in-store pharmacy, and another alert may be provided to the consumer 85 via the cart when the prescription order is ready to be picked up. Other personalized reminders may also be available, such as monthly refills for standard pantry items, pet items, and the like.

In various embodiments, any saved personalized items, such as lists or reminders, may be uploaded to the enterprise server, enabling the consumer 85 to access the items in the premises of any retailer that employs the overall system, making the items portable from retailer to retailer, assisting with comparison shopping and easier use of lists without the consumer 85 having to maintain different lists for the various stores where she shops. Furthermore, stored items may be automatically updated in real time when the consumer 85 makes additions or changes.

The cart 10, by way of the media enhancements discussed above captures real-time purchasing behavior at the individual consumer level and provides back end data mining and analytical reporting. The cart 10 captures information that is specific down to the second about the cart 10 and a consumer's movement and interactions with the cart, and records it for use by retailers and advertisers. For example, consumer shopping patterns may be collected, anonymously if preferred by the consumer, for analysis and use by advertisers, consumer goods manufacturers, and retailers. Retailers may use the cart information for store operations, as discussed herein with respect to shelf management. Additionally, service and maintenance information provides timely information to cart maintenance personnel regarding cart usage and problems.

In an embodiment, when the consumer 85 brings the cart 10 to the Point of Sale 300 at the conclusion of the shopping trip, the ECM 200 may communicate data to the ISS 330, a POS server 325, a POS computer 326, or combinations thereof. In an embodiment, the ECM 200 communicates with ISS 330, which in turn communicates with POS server 325, which in turn communicates with POS computer 326, and vice-versa. Typically, the POS server 325 and the POS computer 326 are part of an existing local area network in a given store, and the ISS 330 typically would be added as a new component to the existing local area network upon implementation of the media enabled shopping cart at a particular location. While not required, communication with the ECM 200 may be facilitated by directing such communication through the ISS 330, rather than directly with ECM 200.

In an embodiment, the cart 10 communicates the identity of the products being purchased to the POS computer 326 or POS server 325 via the ISS 330, as the identity of each product was obtained during shopping when the consumer 85 scanned the product with the scanner 215 or the basket RFID reader 227 identified the product when it was placed in the cart 10. Alternatively, the POS computer 326 or POS server 325 may obtain the identity of the products being purchased by the consumer 85 or a store employee scanning the bar code on each product at the Point of Sale 300.

As the consumer checks out (i.e. renders payment) at the Point of Sale 300, the POS computer 326 or POS server 325 may record the purchases made by that consumer 85 using that particular cart 10 as described herein. The information obtained, both by checkout and by the cart 10 during shopping, may be transferred to/from the ISS 330 and/or the Host Central Server 340. Using data mining advances enabled by the cart 10 and its media enhancements, advertisers can individually track the effectiveness of advertising and pricing campaigns without compromising the personal identity of the consumer, alleviating privacy concerns of consumer groups. Alternatively, the information can be correlated to a specific consumer, for example via a loyalty card program, where the consumer is agreeable to such.

The data communicated by the ECM 200 may include data programmed to its memory, or data collected and stored in the memory over the course of the consumer's 85 shopping trips (initiated when the consumer 85 first moved the cart 10). In an embodiment, such data may include any of the following: 1) the identity of the cart, 2) where in the store the cart has been, 3) which advertisements have been displayed to the consumer using the cart, 4) the length of time spent with each advertisement displayed and the length of time spent in specific areas or aisles of the store, 5) what products are in the cart 10 for purchase, 6) if known (such as from a loyalty card), consumer statistical or demographic data (gender, age, spending and purchasing habits), 7) store traffic patterns such as time, day, period, duration, etc., and 8) cart usage patterns (e.g., number used, typical user, functions accessed, etc.). Such data may be correlated to determine the effectiveness of advertising presented via the media enable cart to the consumer at the point of purchase (i.e., proximate the point in time when the consumer is selecting a particular product to be placed in the basket and purchased).

In another embodiment, data includes (I) information captured by the media cart system such as (1) cart specific data such as (a) cart identification, (b) date and time of shopping episode and each activity therein, (c) media cart/retailer user card UPC scanned by a greeter at the time the cart is handed to the shopper and scanned again by the shopper at checkout, at which time the card is returned to the store for use by another consumer 85, which helps to link information captured by the media cart system with POS data, (d) cart tracking such as location and duration, and (e) cart activities such as product locator, price checks, shopping lists, basket views such as totals, UPC, number of items, etc; and (2) consumer campaigns, ads, promotions such as description of ad/promo, ad/promo reference number, campaign name and reference number, ad/promo start/stop time, ad/promo trigger variables (e.g., location, time, loyalty, non-loyalty), and location in store; (2) Point of Sale (POS) data such as (a) media cart/retailer user card UPC scanned by a greeter at the time the cart is handed to the shopper and scanned again by the shopper at checkout, at which time the card is returned to the store for use by another consumer 85, which helps to link information captured by the media cart system with POS data, (b) product description including UPC code and manufacturer code, (c) regular product price, (d) purchased product price, (e) basket total, (f) number of items in basket, and (g) check-out lane number with time and date of check-out and transaction log number; (3) Loyalty club data such as (a) loyalty card number, (b) zip code, (c) loyalty shopper purchasing data such as items in basket and size of basket in dollars; and (4) store data such as (a) store address, (b) TDLinx code, (c) latitude and longitude coordinates, and (d) store demographic data such as number of adults/children in household, income bracket, age bracket, ethnic group, home owner or renter, education level, etc.

Such data may be used to product a variety of reports such as (1) shopper segmentation data such as (a) trip size, (b) trip duration, (c) day of week, and (d) time of day; (2) consumer campaign studies such as (a) item purchased, including display location and shelf location, (b) cross-purchase studies, including whether usage idea resulted in brand purchased or other brand purchased, (c) recipe ideas, including whether same resulted in brand purchased or other brand purchased, (d) basket analysis, including trip size impact, category linkage of basket, categories absent from basket, (e) cart tracking of anonymous shopper including types of shopping patterns (day of week, time of day, and duration of shopping episode), perimeter areas visited (duration at perimeter department and items scanned), aisles shopped (duration within aisle and items scanned), displays shopped (duration at display and items scanned), location data inquiries by shopper, nutrition information inquiries by shopper, product pricing inquires made by shopper, replacement of product entries, out of store coupons used, in store coupons used; and (f) loyalty card shopper tracking including types of shopping patterns (day of week, time of day, and duration of shopping episode), perimeter areas visited (duration at perimeter department and items scanned), aisles shopped (duration within aisle and items scanned), displays shopped (duration at display and items scanned), location data inquiries by shopper, nutrition information inquiries by shopper, product pricing inquires made by shopper, replacement of product entries, out of store coupons used, in store coupons used.

Such data may also be used for analytical analysis such as (1) location of cart including (a) verification of scanned items, (b) verification of cart after ad stimulus such as whether the cart moved after the ad, whether the shopper purchased the product, and if so when, whether shopper purchased a competing product, and if so comparative data such as price, brand quality, etc., (2) ad viewed in product display location, including verification of scanned item, quantity purchased, and duration of time at display prior to cart moving, (3) ad viewed in cross-usage category including (a) verification of scanned complimentary usage item and (b) verification of promoted brand in ad with usage occasion, for example whether cart moved to featured product location, and (4) whether shopper used product locator feature to find a product in the store, for example a complimentary or featured item.

In particular advertising data may be correlated or integrated with sales data to determine the effectiveness of the ad on an anonymous purchaser, or alternatively on an identifiable consumer such as via further correlation of data provided via a loyalty program. Where the consumer is identified, purchasing data may be tracked over time to determine the effectiveness of advertising and to determine whether additional and/or modified advertising is desired. Such correlations may further provide a wealth of useful data such purchasing patterns based upon consumer demographics; geographic or regional preferences or variations; product placement; ad content, style, timing, etc. For example, reports could be generated indicating store traffic patterns; ad impact; product volume, market share by consumer 85/household/group/store/region, repeat purchases, etc.; consumer purchasing trends (products, dollar amounts, etc.); average size and content of total purchase per time, day, season, etc.; purchases by product category or segment, household, store, region, etc.; consumer survey results; etc.

The data mining capabilities of the media enhanced cart 10 described herein enable access to metrics unique to advertising as used in conjunction with the media enhanced cart 10. The communications features of the cart 10 enable advertisers to remotely download to the ISS 330 (and subsequently to each cart 10, in some embodiments) changes in advertising. Changes in advertising may be made in response to information obtained through data mining, as discussed herein. The media enhancements described herein enable advertisers to test advertisements in various demographic or geographic groups, and see the effectiveness in an immediate fashion, in that new statistical data is continuously being generated and reported. Such advertising may then be modified as needed and/or rolled out on in a large scale campaign.

The media enabled shopping cart system described herein provides a number of advantageous features including the ability to (a) target anonymous consumers with specific product promotions and information at the exact point of purchase and product selection in a retail store aisle; (b) provide specific promotions to loyalty card consumer 85s who have opted into the program; (c) provide shopping enhancement tools to the shopper such as store specials, electronic shopping lists, in-store product locator, recipes, nutritional information, and the ability to self scan products to speed checkout; (d) capture cart traffic patterns, cart purchases, interactions with the cart, (e) capture loyalty card consumer shopping and purchasing behavior who have opted into the program, (f) provide precise data mining and analytical reporting, (g) provide retailers with shelf management system to electronically manage product location and pricing in the store, and (h) modify shopper traffic patterns, for example redirecting consumers to low traffic aisles and/or to high margin products.

Referring to FIGS. 4 and 17, the cart 10 may receive Wireless Local Area Network ("WLAN") signals including video streams in 802.11x format. In an embodiment, a plurality of wireless access points 320 may be located throughout the store to provide network coverage to each cart 10 located in the store, communicating by way of the network transceiver 204 (e.g., a wireless modem) in ECM 200. The network transceiver 204 may be located anywhere on cart 10 and is operably coupled to ECM 200. In an embodiment, the network transceiver is integrated with display 75, or alternatively is integrated with ECM 200. Data may be transferred to and from the cart 10 via the wireless link between the network transceiver 204 and the POS Server 325. Data may be transferred to and from the cart 10 via the wireless link between the network transceiver 204 and the ISS 330. The ISS 330 may store cart 10 data and act as an intermediary between the retailer's store systems and each cart 10. The ISS 330 may also connect over a firewall 332 through a broadband modem/router 333 via a network (in an embodiment, the Internet or VPN 335) to a Host Central Server ("HCS") 340 located at a host company's hosting facility. Advertising data and media may be transferred at regular intervals, such as daily, between each store's ISS 330 and the HCS 340. Data transferred from each store's ISS 330 may be processed by the host company. In an embodiment, both the ISS 330 and HCS 340 utilize standard Microsoft server configurations or equivalents thereof along with supporting database management tools.

The Cart Explorer is an application that runs on the store server that is responsible for keeping track of all of the carts in the store. The Cart Explorer functions similar to Windows Explorer for keeping track of computers in a network or other system browser technology. The Cart Explorer maintains a status of each cart (e.g. systems, processes, etc.) in the fleet via the wireless connection to each cart: the health of each cart, the software version running on each cart, disk space cart has available, the location of each cart, the charging status, and the like. The Cart Explorer enables an individual (such as a trouble shooting employee or an employee trained in the setup and use of the overall system) to find and control each cart remotely, thereby keeping a store running while performing preventative and proactive maintenance. The individual may employ the Cart Explorer to display a selectable icon representing each cart in the fleet, such that when selected, a detailed cart status is magnified. The cart status may include an indication of battery life remaining, an indication of damage detected, and an indication of data corruption. The cart status may also include an indication of a present operating system, an indication of present displayable content, and an indication of a version of each supplemental executable program. The cart status may further include a graphical representation of the location of the cart in a store map.

In various embodiments, the Cart Explorer further includes a Cart Pager system. The Cart Pager system allows a particular cart or group of carts to be identified or notified from within an entire pool or fleet of carts. In one embodiment, when a cart is paged from the Cart Explorer, the cart issues an audible page alert, such as a beep. In another embodiment, when a cart is paged from the Cart Explorer, the cart displays a visible page alert, such as a message appearing on the cart screen to notify a user. In various embodiments, the Cart Explorer Cart Pager system may be used to issue a page to just one cart, or all carts in the store. In various embodiments, the Cart Explorer Cart Pager system may be used to issue a page to the computer interface, or to the human interface (i.e., the screen). In various embodiments, the Cart Explorer Cart Pager system may include one way paging or two way paging.

In an embodiment, the host company is a parent company for a plurality of retail merchant stores which are networked as described herein. An advertising company or product manufacturer may be granted access to the HCS such that product advertising may be remotely and centrally downloaded to the host company for further dissemination to the various individual stores. Likewise, information such as product information, inventory, advertising effectiveness, etc. may be accessed from the HSC and uploaded by the advertising company or product manufacturer. In this way, an advertising company or product manufacturer may have a centralized access point for the upload and download of advertising or other product data, thereby allowing real-time access and adjustment to business activities based upon the effectiveness of a particular activity. For example, a new advertising campaign can be downloaded remotely to the HCS, disseminated on a large scale or small scale (e.g., a pilot run), and the results of the advertising campaign can be closely monitored in real or about real-time to determine if any adjustments need to be made.

The HCS server is operable to coordinate activity between all the various stores, keeping track of all the data from between stores. In various embodiments, a plurality of HCS servers may be implemented. In various embodiments, an HCS server may be dedicated to a particular chain of stores that are commonly controlled. The HCS server manages all data going to the carts (i.e., digital content management, passing ads, recipes, nutritional information, and the like to carts through stores) as well as all the data coming back from the carts (i.e., coordination of shop events). The HCS server keeps track of campaigns, banners, and subcategories for product placement and advertising, as well as the placement of ads and/or content according to Neilson-like categories or retailer defined categories.

In an embodiment, the operating system software of the ISS 330 may be based primarily on the Windows Server 2003 Operating System, IIS 6.0 utilizing the .NET Compact Framework, COM+. In an embodiment, the operating system software of the POS Server 325 may be based primarily on the Windows Server 2003 Operating System, IIS 6.0 utilizing the .NET Compact Framework, COM+. It should be understood that specific computing equipment and software are disclosed herein as non-limiting examples, and that equivalent or improved components may be substituted as such become available.

In an embodiment, the HCS 340 may comprise one or more of each of the following: a media server, a web server, and a database server. In an embodiment, the one or more media servers may operate on operating system software based primarily on Windows Server 2003 with a DivX Encoder, Media Windows Server, Flash Communications Server, and FTP Service. In an embodiment, the one or more web servers may operate on the operating system software based primarily on the Windows Server 2003 Operating System, IIS 6.0 utilizing the .NET Compact Framework, COM+. In an embodiment, the one or more database servers may operate on the operating system software based primarily on the Windows Server 2003, IIS 6.0 .NET Framework, COM+, SQL Server 2003 (cluster), MS SQLServer 2003, and MS SQLServer 2005. It should be understood that specific computing equipment and software are disclosed herein as non-limiting examples, and that equivalent or improved components may be substituted as such become available.

In an embodiment, various components of the system described herein may be located commonly, for example affixed to or integrated with the cart 10. In an embodiment, various components of the system described herein may be distributed or dispersed over the system as a whole while operably coupled to one another to achieve the functions described herein, for example with one or more components located on the cart and one or more components located on a computing system such as a retailer's POS system, a LAN, a WAN, etc. Likewise, various components, subsystems, and the like as described herein may be implemented in software, hardware, or both and operable coupled within the system as a whole to perform their intended function as will be readily apparent to those skilled in the art.

Methods enabled by the present disclosure include mounting a display on a shopping cart basket as well as performing steps to make or carry out all other attachments, configurations, and embodiments described herein. Further, methods of use of a shopping cart having a basket mounted video display will be readily apparent from the present disclosure. Methods enabled by the present disclosure further include adding or retrofitting media enhancing hardware and software to a shopping cart (e.g., plastic and/or metal), as well as performing steps to make or carry out all other attachments, configurations, and embodiments described herein. Further, methods of use of a media enhanced shopping cart, including data mining, will be readily apparent from the present disclosure.

Figure 19:
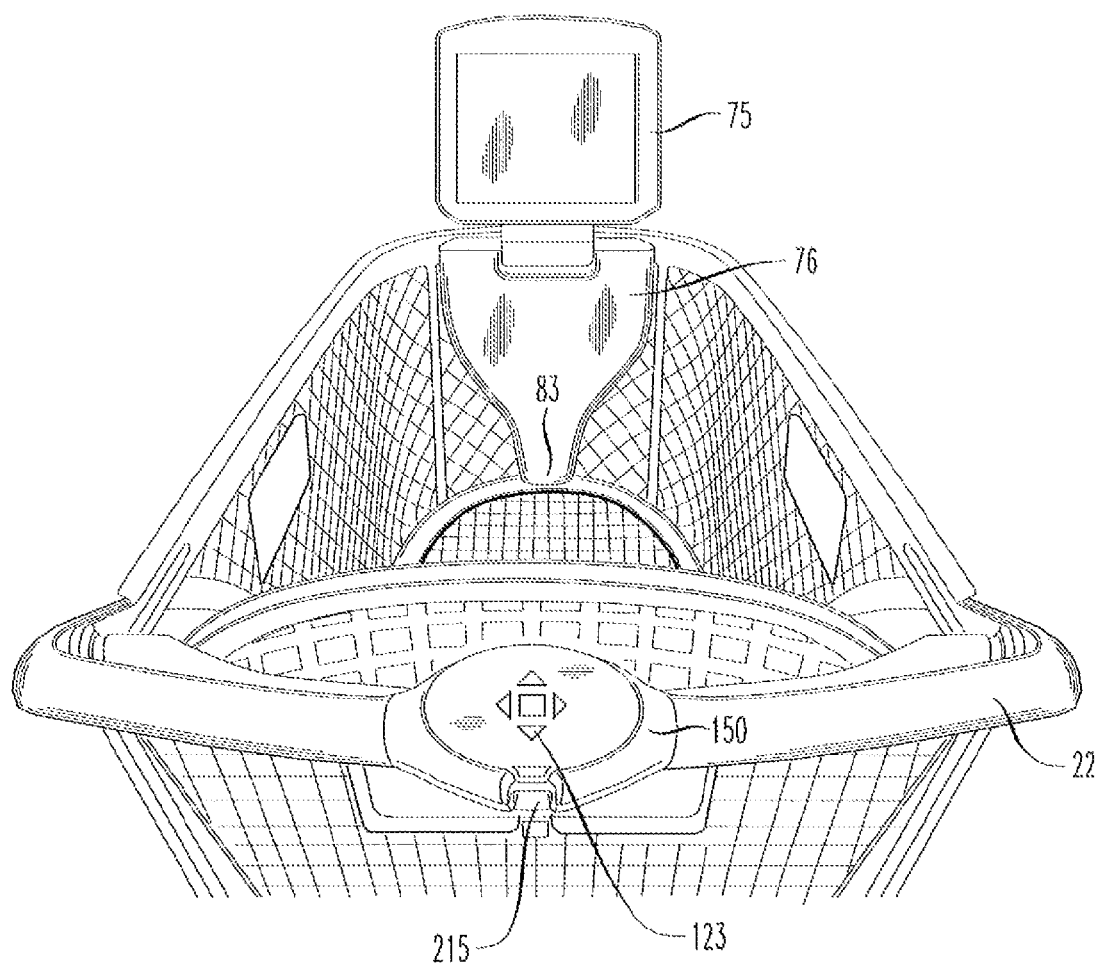
FIG. 19 shows a user interface including a voice activated interface, a five-way navigation device, and a bar code scanner grouped in a pod according to an embodiment of the present disclosure.

In embodiment as shown in the Figures, a cart 10 is provided having a video display 75 mounted on the nose 45 of the cart 10. The cart 10 is further enhanced by the addition of a ECM 200, a voice activated interface 120, a scanner 215, a five-way navigation device, 123, a nose bumper handle 100, an aisle RFID reader 225 with antennas 226 (looking outward from the cart 10), optionally a basket RFID reader 227 with antennas 228 (looking inward on the contents of the basket 20), and battery charger contact plates 105 or 230, 231. The voice activated interface 120, the five-way navigation device 123, and the scanner 215 are grouped in a pod 150 near the center of the handle 22, as shown in FIG. 19. In an embodiment, the voice activated interface 120 further comprises a push to talk voice activated interface having a hard or soft button on the pod 150 or handle 22 to push to activate the voice recognition feature. The push to talk button may be a dedicated button or may be one or a combination/sequence of buttons, for example on the five-way navigation device 123. The pod 150 and/or handle 22 may further comprise a price check button, which may be a hard or soft button. Likewise, the price check button may be a dedicated button or may be one or a combination/sequence of buttons, for example on the five-way navigation device 123. Pushing the price check button allows a consumer 85 to scan an item to determine its price, whereby the item is not added to the basket inventory or shopping total for the consumer 85. It should be understood that any components described herein as residing in or on the handle 22 can likewise be integrated into the pod 150, and in an embodiment all functional components positioned on the handle 22 are incorporated into the pod 150. The aisle RFID reader 225 is integrated with the ECM 200 and antennas 226 are located on either side of the housing 199 of the ECM 200. The basket RFID reader 227 may be part of ECM 200 with antennas 228 located in the base 76. The battery charger contact plates are positioned and configured as shown in FIGS. 6, 7, and/or 12.

More specifically, the base 76 is mounted to the inside of front side wall 28 and conforms to the shape of the nose, for example slightly curved as shown. As shown in FIG. 19, the base 76 may extend downward from the front edge 29 along the inside of front side wall 28 and taper downward with the lower edge 83 of the base contacting or about contacting the upper portion of the bottom 21 of basket 20. A base 76 as shown in FIG. 19 forms a conduit for communication cables, power cords, etc. from the ECM 200 and/or battery. Such conduit may further extend under the lower edge of the bottom 21 of basket 20, and may connect with the ECM 200 housing 199. In an embodiment the conduit and/or base 76 may be integral with the basket 20, for example molded in plastic.

Figure 5:
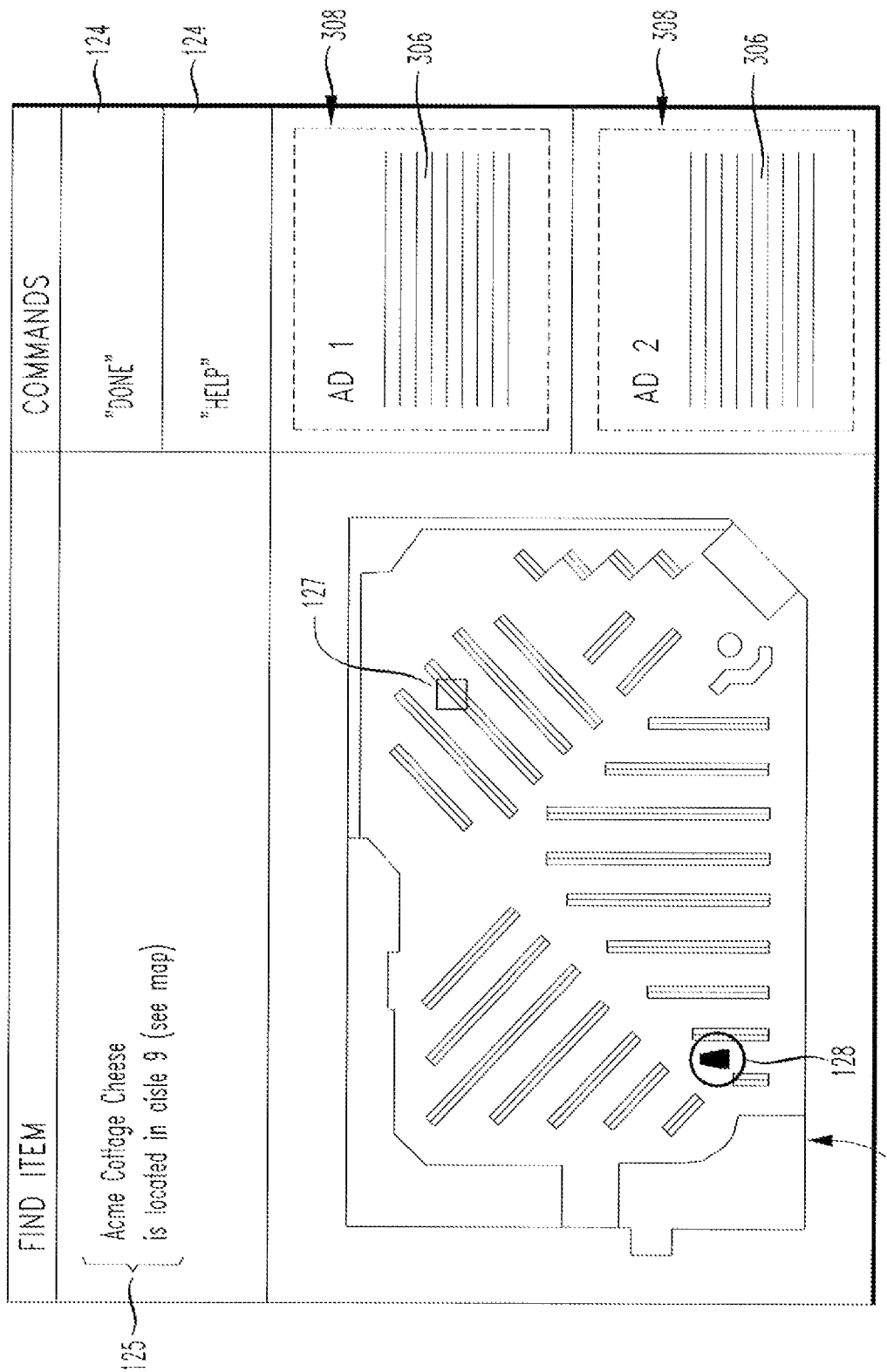
FIG. 5 shows an exemplary display according to an embodiment of the present disclosure.

The video display 75 is attached to the basket 20 such that the viewable area 78 is above the interior 54 of the basket. Likewise, the video display 75 is attached to the basket 20 such that the viewable area 78 is in a field of vision 84 of a consumer 85 pushing the cart 10 via the handle 22. The video display 75 is foldable, and the hinge 79 is positioned about equal to the front edge 29 of the basket 20. The bottom edge 82 of the screen 77 is positioned about equal to the front edge 29, and in some embodiments may rest upon the front edge 29 to provide additional support to the screen 77. For example, the outer bottom edges 98, 99 may rest on the front or side upper edges for additional support. As shown in FIG. 2, the nose 45 and upper edges may be slightly curved and the bottom edge 82 of screen 77 may be less curved such that the outer bottom edges 98, 99 engage one or more of the upper edges in an unfolded position. In a folded position as shown in FIGS. 5 and 6, the screen extends at about a 90 degree angle with respect to the base 76 (or alternatively extends within the plane defining the upper edges of the cart), which clears the nose and exterior of the cart for nesting with a second cart while also keeping the interior 54 of the cart clear such that the rear side wall 31 may swing upward into the interior 54 of the basket to receive the front side wall 28 of a third cart.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc. The various embodiments and components thereof disclosed herein may be used singularly or in combination with any other embodiment disclosed herein. Throughout the figures, like numbers correspond to like parts.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A bi-directional recharge corral system for recharging a battery while storing a media enhanced shopping cart, comprising:
   one or more corral sections each comprising a cart guiding portion and one or more charge rails extending from the cart guiding portion;
   a power supply operably coupled to the charge rails of the one or more corral sections, wherein the power supply supplies current through the charge rails based on a direction of a shopping cart in the corral sections; and
   a power management unit, wherein the power management unit determines at least one of voltage and temperature, and based on at least one of voltage and temperature, calculates a charging algorithm by which to supply current through the charge rails.

2. The bi-directional recharge corral system of claim 1, further comprising a sensor for detecting the direction of the shopping cart in the corral sections relative to the corral sections.

3. The bi-directional recharge corral system of claim 1, wherein the charge rails are positioned to engage a battery charging contact plate positioned on or proximate to one or more wheels on the shopping cart in one of at least two directions.

4. The bi-directional recharge corral system of claim 3, wherein for a first direction, the power supply conducts current from positive to negative.

5. The bi-directional recharge corral system of claim 3, wherein for a first direction, the power supply conducts current from negative to positive.

6. The bi-directional recharge corral system of claim 1, wherein the Power Management Unit is further operable to detect an error condition, and upon detection of an error condition, initiate remedial action.

7. The bi-directional recharge corral system of claim 6, wherein the remedial action comprises performing a system reset, altering a charging algorithm applied, or combinations thereof.

8. The bi-directional recharge corral system of claim 6, wherein the error condition comprises a failure of communication with a host computer of the shopping cart in the corral sections.

9. The bi-directional recharge corral system of claim 6, wherein the error condition comprises a voltage across a battery of the shopping cart that is lower than a predetermined threshold voltage.

10. The bi-directional recharge corral system of claim 6, wherein the error condition comprises a voltage across a battery of the shopping cart that is higher than a predetermined threshold voltage.

11. A method of charging a plurality of media enhanced shopping carts, comprising:
    providing a conductive charge plate on a cart that is electrically coupled to a battery affixed to the cart, the battery operable to power one or more media enhancements of the cart;
    providing a charging unit comprising a conductive charge rail electrically coupled to a power supply and a cart guiding segment comprising one or more guide grooves for positioning the cart in the modular charging unit;
    positioning the cart in the guide grooves such that the conductive charge plate of the cart is in contact with the conductive charge rail of the modular charging unit;
    forming an electrical connection between the conductive charge plate of the cart and the conductive charge rail;
    determining at least one of voltage and temperature, and based on at least one of voltage and temperature, calculating a charging algorithm by which to conduct current through the charge rails;
    detecting a direction of the cart in the charging unit; and
    based on the direction of the cart in the charging unit, supplying current from the power supply through the conductive charge rail and the conductive charge plate of the cart, thereby charging the battery of the cart in a bi-directional fashion.

12. The method according to claim 11, wherein for a first direction, current is supplied from the power supply from positive to negative.

13. The method according to claim 11, wherein for a second direction, current is supplied from the power supply from negative to positive.

14. A method of charging a plurality of media enhanced shopping carts, comprising:
    providing a conductive charge plate on a cart that is electrically coupled to a battery affixed to the cart, the battery operable to power one or more media enhancements of the cart;
    providing a charging unit comprising a conductive charge rail electrically coupled to a power supply and a cart guiding segment comprising one or more guide grooves for positioning the cart in the modular charging unit;
    positioning the cart in the guide grooves such that the conductive charge plate of the cart is in contact with the conductive charge rail of the modular charging unit;
    forming an electrical connection between the conductive charge plate of the cart and the conductive charge rail;
    detecting a direction of the cart in the charging unit;
    based on the direction of the cart in the charging unit, supplying current from the power supply through the conductive charge rail and the conductive charge plate of the cart, thereby charging the battery of the cart in a bi-directional fashion; and
    detecting an error condition, and upon detection of an error condition, initiating remedial action.

15. The method according to claim 14, wherein the remedial action comprises performing a system reset, altering a charging algorithm applied, or combinations thereof.

16. The method according to claim 14, wherein the error condition comprises a failure of communication with a host computer of the shopping cart in the corral sections.

17. The method according to claim 14, wherein the error condition comprises a voltage across a battery of the shopping cart that is lower than a predetermined threshold voltage.

18. The method according to claim 14, wherein the error condition comprises a voltage across a battery of the shopping cart that is higher than a predetermined threshold voltage.

* * * * *